United States Patent
Shua

(10) Patent No.: US 11,616,803 B2
(45) Date of Patent: Mar. 28, 2023

(54) HYBRID DEPLOYMENT OF EPHEMERAL SCANNERS

(71) Applicant: Orca Security LTD., Tel Aviv-Jaffa (IL)

(72) Inventor: Avi Shua, Tel Aviv-Jaffa (IL)

(73) Assignee: Orca Security Ltd., Tel Aviv-Jaffa (IL)

( * ) Notice: Subject to any disclaimer, the term of this patent is extended or adjusted under 35 U.S.C. 154(b) by 0 days.

(21) Appl. No.: 17/716,583

(22) Filed: Apr. 8, 2022

(65) Prior Publication Data

US 2022/0350931 A1    Nov. 3, 2022

Related U.S. Application Data

(63) Continuation of application No. PCT/IB2022/052670, filed on Mar. 23, 2022.
(Continued)

(51) Int. Cl.
*H04L 9/40* (2022.01)
*H04L 67/1008* (2022.01)
(Continued)

(52) U.S. Cl.
CPC ...... *H04L 63/1433* (2013.01); *G06F 9/45558* (2013.01); *G06F 9/5072* (2013.01);
(Continued)

(58) Field of Classification Search
CPC ........ G06F 21/78; G06F 21/54; G06F 21/554; G06F 21/568
See application file for complete search history.

(56) References Cited

U.S. PATENT DOCUMENTS

| 7,013,395 B1 | 3/2006 | Swiler et al. |
| 7,143,143 B1 | 11/2006 | Thompson |

(Continued)

FOREIGN PATENT DOCUMENTS

| CN | 109995722 A | 7/2019 |
| CN | 110708315 A | 1/2020 |

(Continued)

OTHER PUBLICATIONS

International Search Report and Written Opinion for PCT International Application No. PCT/IB2022/52670 filed Mar. 23, 2022; pp. 1-14; dated Jul. 26, 2022.
(Continued)

*Primary Examiner* — Paul E Callahan
(74) *Attorney, Agent, or Firm* — Finnegan, Henderson, Farabow, Garrett & Dunner, LLP

(57) ABSTRACT

A cybersecurity scanner deployment system, comprising: at least one processor configured to: access a primary account maintained in a cloud environment; receive information defining a structure of the primary account, the structure including a plurality of assets, and the information excluding raw data of the primary account; deploy, inside the primary account or a secondary account for which trust is established with the primary account, at least one ephemeral scanner configured to scan at least one block storage volume and output metadata defining the at least one block storage volume, the output excluding raw data of the primary account; receive a transmission of the metadata from the at least one ephemeral scanner, excluding raw data of the primary account; analyze the metadata to identify cybersecurity vulnerabilities; correlate each of the cybersecurity vulnerabilities with one of the assets; and generate a report correlating the cybersecurity vulnerabilities with the assets.

20 Claims, 16 Drawing Sheets

Related U.S. Application Data

(60) Provisional application No. 63/180,048, filed on Apr. 26, 2021.

(51) Int. Cl.
| | | |
|---|---|---|
| *H04L 67/101* | (2022.01) | |
| *G06F 9/455* | (2018.01) | |
| *G06F 9/50* | (2006.01) | |
| *G06F 21/54* | (2013.01) | |
| *G06F 21/55* | (2013.01) | |
| *G06F 21/56* | (2013.01) | |
| *G06F 21/78* | (2013.01) | |

(52) U.S. Cl.
CPC ............ *G06F 21/54* (2013.01); *G06F 21/554* (2013.01); *G06F 21/568* (2013.01); *G06F 21/78* (2013.01); *H04L 63/10* (2013.01); *H04L 63/145* (2013.01); *H04L 63/1441* (2013.01); *H04L 67/101* (2013.01); *H04L 67/1008* (2013.01); *G06F 2009/4557* (2013.01); *G06F 2009/45595* (2013.01)

(56) References Cited

U.S. PATENT DOCUMENTS

| | | |
|---|---|---|
| 8,006,285 B1 | 8/2011 | Perlman |
| 8,272,061 B1 | 9/2012 | Lotem et al. |
| 8,479,294 B1 | 7/2013 | Li et al. |
| 8,621,073 B2 | 12/2013 | McClure et al. |
| 9,069,983 B1 | 6/2015 | Nijjar |
| 9,229,758 B2 | 1/2016 | Ammons et al. |
| 9,268,689 B1 | 2/2016 | Chen et al. |
| 9,294,498 B1 | 3/2016 | Yampolskiy et al. |
| 9,356,942 B1 | 5/2016 | Joffe |
| 9,413,774 B1 | 8/2016 | Liu et al. |
| 9,569,201 B1 | 2/2017 | Lotem et al. |
| 9,686,296 B1 | 6/2017 | Murchison et al. |
| 9,734,325 B1 | 8/2017 | Neumann et al. |
| 9,749,349 B1 | 8/2017 | Czarny et al. |
| 9,756,070 B1 | 9/2017 | Crowell et al. |
| 9,794,289 B1 | 10/2017 | Banerjee et al. |
| 9,858,105 B1 | 1/2018 | Upadhyay et al. |
| 10,079,842 B1 | 9/2018 | Brandwine et al. |
| 10,152,487 B1 | 12/2018 | Patwardhan et al. |
| 10,402,560 B2 | 9/2019 | Gilbert |
| 10,534,915 B2 | 1/2020 | Cherny et al. |
| 10,782,952 B1 | 9/2020 | Doring et al. |
| 10,868,825 B1 | 12/2020 | Dominessy et al. |
| 10,956,484 B1 | 3/2021 | Kulkarni et al. |
| 11,036,856 B2 | 6/2021 | Graun et al. |
| 11,075,923 B1 | 7/2021 | Srinivasan et al. |
| 11,120,124 B2 | 9/2021 | Fusenig et al. |
| 11,216,563 B1 | 1/2022 | Veselov et al. |
| 2004/0078384 A1 | 4/2004 | Keir et al. |
| 2005/0055558 A1 | 3/2005 | Carmona |
| 2008/0263658 A1 | 10/2008 | Michael et al. |
| 2009/0007100 A1 | 1/2009 | Field et al. |
| 2009/0187989 A1 | 7/2009 | Kim et al. |
| 2010/0017512 A1 | 1/2010 | Ciano et al. |
| 2012/0323853 A1 | 12/2012 | Fries et al. |
| 2013/0262801 A1 | 10/2013 | Sancheti et al. |
| 2014/0007239 A1 | 1/2014 | Sharpe et al. |
| 2014/0096135 A1 | 4/2014 | Kundu et al. |
| 2014/0259168 A1 | 9/2014 | McNamee et al. |
| 2014/0366118 A1 | 12/2014 | Yin |
| 2015/0020203 A1 | 1/2015 | Xie et al. |
| 2016/0063251 A1 | 3/2016 | Spernow et al. |
| 2016/0330237 A1 | 11/2016 | Edlabadkar |
| 2017/0012998 A1 | 1/2017 | Thornbury et al. |
| 2018/0198610 A1 | 7/2018 | Mullins et al. |
| 2018/0205755 A1 | 7/2018 | Kavi et al. |
| 2018/0288087 A1 | 10/2018 | Hittel et al. |
| 2018/0367515 A1 | 12/2018 | Anandam et al. |
| 2019/0116199 A1 | 4/2019 | Stopel et al. |
| 2019/0250857 A1 | 8/2019 | Reddy et al. |
| 2019/0281115 A1 | 9/2019 | Swallow et al. |
| 2019/0327272 A1* | 10/2019 | Narayanaswamy .. H04L 63/104 |
| 2020/0042707 A1 | 2/2020 | Kucherov et al. |
| 2020/0059481 A1 | 2/2020 | Sekar et al. |
| 2020/0097662 A1* | 3/2020 | Hufsmith .............. H04L 9/0643 |
| 2020/0137097 A1 | 4/2020 | Zimmerman et al. |
| 2020/0220887 A1 | 7/2020 | A.K. |
| 2020/0228560 A1 | 7/2020 | Murthy et al. |
| 2020/0244692 A1 | 7/2020 | Shua |
| 2020/0344256 A1 | 10/2020 | Alabdulhadi |
| 2020/0389483 A1 | 12/2020 | Dye et al. |
| 2020/0396254 A1 | 12/2020 | Crabtree et al. |
| 2021/0019404 A1 | 1/2021 | Strogov et al. |
| 2021/0044563 A1 | 2/2021 | Reyes et al. |
| 2021/0099478 A1 | 4/2021 | Seetharamaiah et al. |
| 2021/0112091 A1 | 4/2021 | Compton |
| 2021/0342297 A1 | 11/2021 | Gupta et al. |
| 2021/0365564 A1 | 11/2021 | Ewaida et al. |
| 2021/0377287 A1 | 12/2021 | Shua |
| 2021/0409438 A1 | 12/2021 | Sundaram et al. |
| 2022/0046051 A1 | 2/2022 | Stopel et al. |
| 2022/0100869 A1 | 3/2022 | Berger et al. |
| 2022/0124110 A1 | 4/2022 | Chhabra et al. |
| 2022/0141247 A1 | 5/2022 | Shakarian et al. |
| 2022/0182294 A1 | 6/2022 | Li et al. |
| 2022/0191250 A1 | 6/2022 | Laliberte |
| 2022/0210195 A1 | 6/2022 | Parekh et al. |
| 2022/0239681 A1 | 7/2022 | Newman et al. |
| 2022/0294817 A1 | 9/2022 | Parekh et al. |

FOREIGN PATENT DOCUMENTS

| | | |
|---|---|---|
| CN | 114584359 A | 6/2022 |
| WO | WO-03060717 A1 | 7/2003 |
| WO | WO 2017/153983 A1 | 9/2017 |
| WO | WO 2019/051507 A1 | 3/2019 |
| WO | WO 2020/106973 A1 | 5/2020 |
| WO | WO 2021/072877 A1 | 4/2021 |
| WO | WO-2021108569 A1 | 6/2021 |

OTHER PUBLICATIONS

Non-Final Office Action U.S. Appl. No. 17/716,491 dated Aug. 3, 2022, in the United States Patent and Trademark Office.
Non-Final Office Action U.S. Appl. No. 17/657,986 dated Aug. 17, 2022, in the United States Patent and Trademark Office.
Non-Final Office Action U.S. Appl. No. 17/658,156 dated Jul. 18, 2022, in the United States Patent and Trademark Office.
Non-Final Office Action U.S. Appl. No. 17/657,972 dated Jun. 21, 2022, in the United States Patent and Trademark Office.
Non-Final Office Action U.S. Appl. No. 17/657,972 dated Sep. 1, 2022, in the United States Patent and Trademark Office.
Ex Parte Quayle Action U.S. Appl. No. 17/716,231 dated Jun. 26, 2022, in the United States Patent and Trademark Office.
Notice of Allowance U.S. Appl. No. 17/716,231 dated Sep. 6, 2022, in the United States Patent and Trademark Office.
Ex parte Quayle Action U.S. Appl. No. 17/657,981 dated Oct. 31, 2022, in the United States Patent and Trademark Office.
Advisory Action U.S. Appl. No. 17/657,972 dated Oct. 31, 2022, in the United States Patent and Trademark Office.
Final Office Action U.S. Appl. No. 17/658,156 dated Sep. 13, 2022, in the United States Patent and Trademark Office.
Notice of Allowance No. U.S. Appl. No. 17/716,491 dated Oct. 11, 2022, in the United States Patent and Trademark Office.
Notice of Allowance No. U.S. Appl. No. 17/716,231 dated Sep. 6, 2022, in the United States Patent and Trademark Office.
Notice of Allowance, U.S. Appl. No. 17/657,981 dated Dec. 7, 2022, in the United States Patent and Trademark Office.
Rani et al.; "An Efficient Approach to Forensic Investigation in Cloud using VM Snapshots", 2015 International Conference on Pervasive Computing (ICPC), 5 pages, (2015).
Wei et al., "Managing Security of Virtual Machine Images in a Cloud Environment", CCSW'09, pp. 91-96, Nov. 13, 2009.

(56) References Cited

OTHER PUBLICATIONS

Almulla et al., "Digital Forensic of a Cloud Based Snapshot", The Sixth International Conference on Innovative Computing Technology (INTECH 2016), pp. 724-729, (2016).

Pandey et al., "An Approach for Virtual Machine Image Security", Computer Science and Engineering MNNIT, Allahabad, 2014 International Conference on Signal Propagation and Computer Technology (ICSPCT), pp. 616-623, (2014).

Rajasekaran et al., "Scalable Cloud Security via Asynchronous Virtual Machine Introspection", 8th USENIX Workshop on Hot Topics in Cloud Computing, Cover page and pp. 1-6, (2016).

Kaur et al., "Secure VM Backup and Vulnerability Removal in Infrastructure Clouds", 2014 International Conference on Advances in Computing, Communications and Informatics (ICACCI), pp. 1217-1226, (2014).

Fernandez et al., "Two patterns for cloud computing: Secure Virtual Machine Image Repository and Cloud Policy Management Point", PLoP '13: Proceedings of the 20th Conference on Pattern Languages of Programs Oct. 2013 Article No. 15, Association for Computing Machinery (ACM), Cover sheet and pp. 1-11, (2013).

Fernandez et al. "Building a security reference architecture for cloud systems", Springer, Requirements Eng, vol. 21, pp. 225-249, (2016).

Ammons et al., "Virtual machine images as structured data: the Mirage image library", IBM Research, Cover sheet 2 pages and pp. 1-6, (2011).

"IBM Point of View Security and Cloud Computing", IBM SmartCloud Enterprise, Cloud Computing White Paper, 13 sheets of cover pages and pp. 1-20, (2009).

Cui et al., "A Less Resource-Consumed Security Architecture on Cloud Platform", Wuhan University Journal of Natural Sciences, vol. 21, No. 5, pp. 407-414, (2016).

Bugiel et al., "AmazonIA: When Elasticity Snaps Back", CCS' 11, ACM, pp. 389-400, (2011)

Non-Final Office Action U.S. Appl. No. 17/658,149 dated Dec. 30, 2022, in the United States Patent and Trademark Office.

Non-Final Office Action U.S. Appl. No. 17/658,156 dated Jan. 3, 2023, in the United States Patent and Trademark Office.

Final Office Action U.S. Appl. No. 17/657,986 dated Nov. 23, 2022, in the United States Patent and Trademark Office.

Notice of Allowance U.S. Appl. No. 17/657,972 dated Feb. 1, 2023, in the United States Patent and Trademark Office.

* cited by examiner

HYBRID DEPLOYMENT OF EPHEMERAL SCANNERS

CROSS REFERENCES TO RELATED APPLICATIONS

This application is a continuation of PCT International Application No. PCT/IB2022/052670, filed Mar. 23, 2022, which claims the benefit of U.S. Provisional Application No. 63/180,048 filed Apr. 26, 2021, the contents of each of which are hereby incorporated by reference in their entireties.

TECHNICAL FIELD

Disclosed embodiments include new systems and methods for securing cloud infrastructure to help meet compliance mandates, without disrupting business operations in live environments.

BACKGROUND

Modern organizations typically depend on cloud infrastructure for data storage and processing. Data storage and processing nodes, among other things, power today's electronic infrastructure. In contrast to early network-centric days, an organization may have little in the way of "on-prem" (on-premises) systems and may run its entire business through systems having shared resources. Such an infrastructure may be the entire inventory of cloud assets for an organization, including running and stopped workloads of all types: virtual machines, containers, storage objects, load balancers, IAM (Identity and Access Management) configurations, and more. Organizations are searching for effective ways to scan their entire cloud estate to look for risks stemming from vulnerabilities, misconfigurations, malware, lateral movement risk, weak and leaked passwords, and improperly secured PII.

The infrastructure of these organizations are plainly different than '90s-style physical servers running on bare metal. Existing agents and scanners from the on-prem days have been simply reused in cloud environments without reconfiguration. Before the cloud, it was required to secure physical hosts. That meant spending time installing multiple security agents—one for each server. IP addresses were assigned to physical assets and they seldom changed. Even then, however, agent integration was tedious and coverage rarely reached 100% of assets. In a cloud environment, scaling up and down is a frequent occurrence—possibly thousands of times per hour across multiple clouds—and all within a CI/CD pipeline that builds an organization's infrastructure. There are containers and virtual machines to contend with, and agents carry high operational costs.

This causes problems of inefficiency and overuse of resources, including excess processor cycles on regular scans. In turn, such problems and inefficiencies can lead to a higher monetary cost for hosted resources as some cloud providers charge per processing cycle.

Relying on agents for security visibility in the cloud also has drawbacks. Visibility is limited to only those assets that are already known and accessible to an agent, requiring that such assets are capable of having the agent installed and maintained in the first place. The assets also must have ongoing network connectivity to the backend, something that makes the development cycle inefficient as developers tend not to be inclined to deploy agents on virtual machines, in containers, and in serverless configurations—let alone dealing with their never-ending maintenance—thus leading to insecure implementations.

An authenticated scan allows for direct host access using remote protocols such as SSH or RDP. The scanner uses a privileged account to log in and determine how secure each host is from an inside vantage point. While authenticated scans can successfully discover potential vulnerabilities, they are limited as they require a privileged account on each scanned host. Furthermore, scans use significant system resources during the test procedures and require opening ports that by themselves pose a security risk.

An unauthenticated scan can only examine publicly visible information and is not able to provide detailed information about assets. It essentially acts as a friendly attacker. An unauthenticated scan can easily miss identifying some assets and vulnerabilities, making it much less effective. For example, a website at mydomain.com/email campaign not linked from a main website will not be scanned unless the scanner is manually configured. This can leave organizations exposed to vulnerabilities in areas where the scanner cannot reach.

While unauthenticated scanners act like an attacker, they often get stuck where a real attacker would not. For example, a CAPTCHA can easily prevent automatic mechanisms (such as scanners) from registering. But such techniques would not have any effect on a human attacker.

Cloud security posture managers (CSPMs) are scanning tools developed specifically for the cloud. Rather than going inside the machine, a CSPM analyzes the cloud configuration itself for weaknesses. CSPMs are used to discover, assess, and solve cloud misconfigurations but provide shallow coverage where cloud security is concerned because CSPMs have difficulty detecting critical risks such as vulnerabilities, malware, and misconfigurations within the workloads themselves. Organizations choosing to combine agent-based solutions with a CSPM end up getting flooded with separate alerts that lack context which results in alert fatigue on behalf of security analysts.

Therefore, there is a need for improved security scanning systems that solve the problem with existing systems and are more adapted for use in cloud infrastructures.

The foregoing background is for illustrative purposes and is not intended as a discussion of the scope of the prior art or an admission of prior art.

SUMMARY

This summary is provided for the convenience of the reader to present a basic understanding of a few exemplary embodiments of this disclosure, and does not wholly define the breadth of the disclosure. This summary is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "embodiments" may be used herein to refer to one or more features or combinations of features described herein. A description associated with an embodiment does not necessarily apply to all embodiments.

Embodiments of the present disclosure may deliver instant-on, workload level visibility across cloud infrastructure assets without running opcodes on the target scanned workloads, helping organizations to: (1) Detect risks such as vulnerabilities, malware, misconfigurations, lateral movement risk, and unsecured sensitive data; (2) See cloud inventory at every layer: infrastructure, operating system, applications, and data; (3) Discover and see previously missed assets.

Embodiments of the present disclosure may further use an out-of-band process to reach cloud workloads through the runtime storage layer, combining this with information gathered from cloud provider APIs, including but not limited to K8S APIs.

DRAWINGS

The drawings and figures contained herein are a part of this specification, illustrate several embodiments consistent with the disclosure and, together with the description, serve to explain principles of the disclosure.

Figure 5:
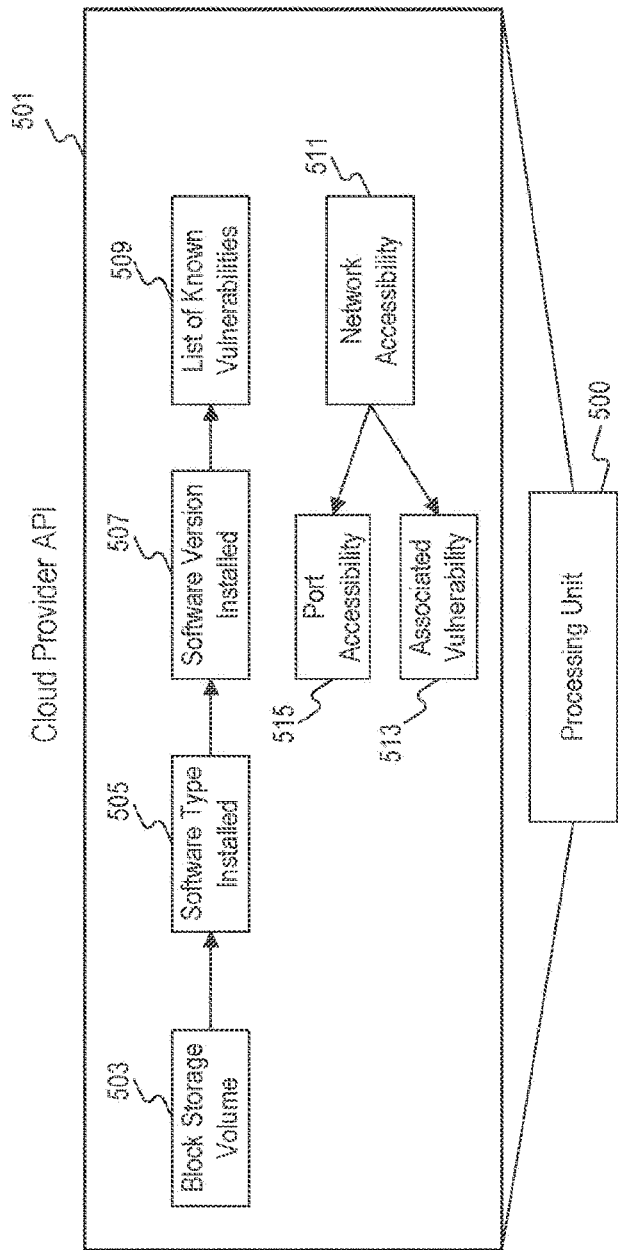

FIG. 5 of the disclosed embodiments describes a method of operating a cybersecurity system performing a side scanning function to protect against potential vulnerabilities, consistent with disclosed embodiments.

Figure 6:
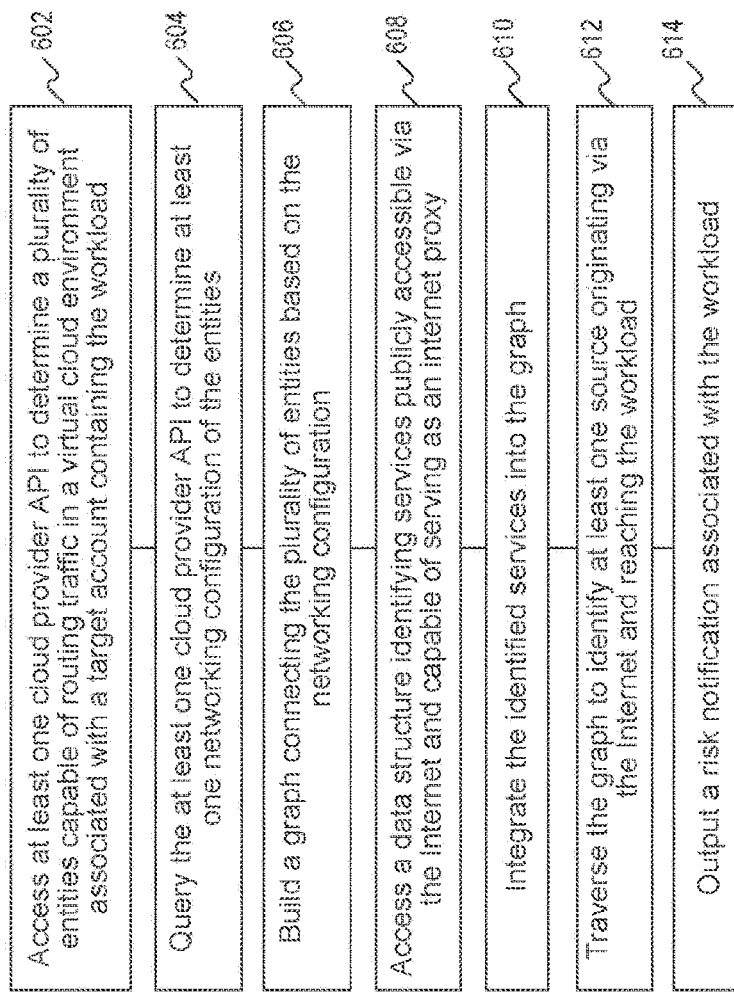

FIG. 6 is a block diagram of method for risk prioritization, consistent with disclosed embodiments.

Figure 7:
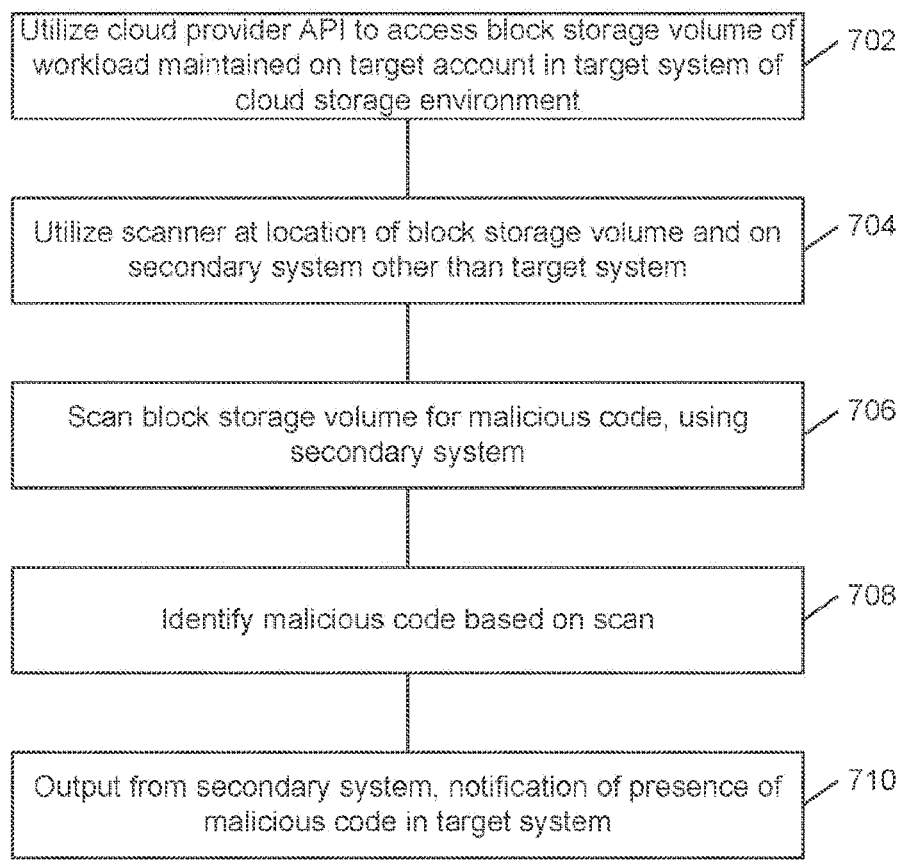

FIG. 7 is a block diagram illustrating an exemplary process of cyber security scanning for a cloud environment, consistent with the disclosed embodiments.

Figure 8:
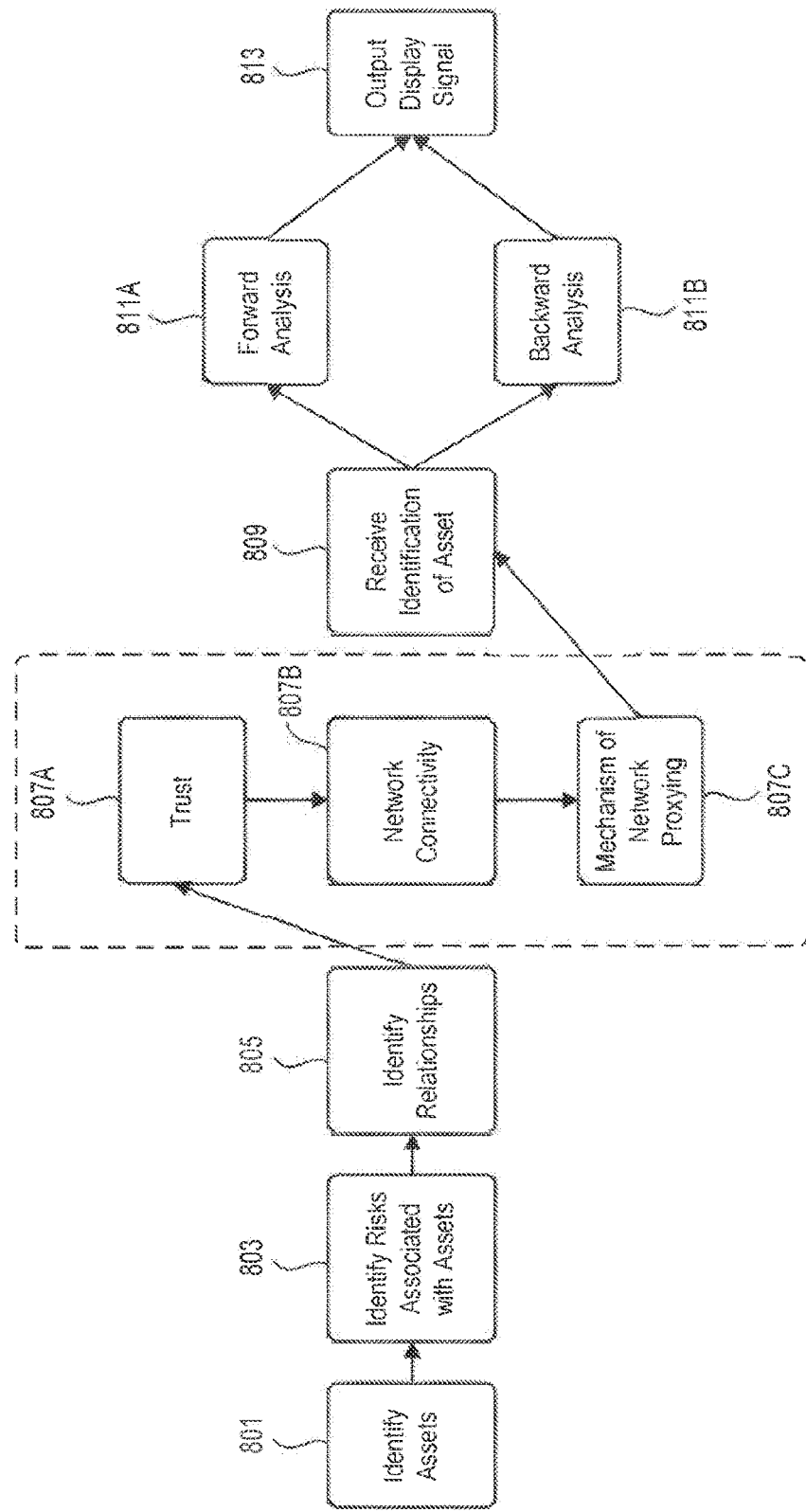

FIG. 8 is a schematic block diagram illustrating an exemplary embodiment of a system for performing visualization of forward and backward facing threats, consistent with the disclosed embodiments.

Figure 9:
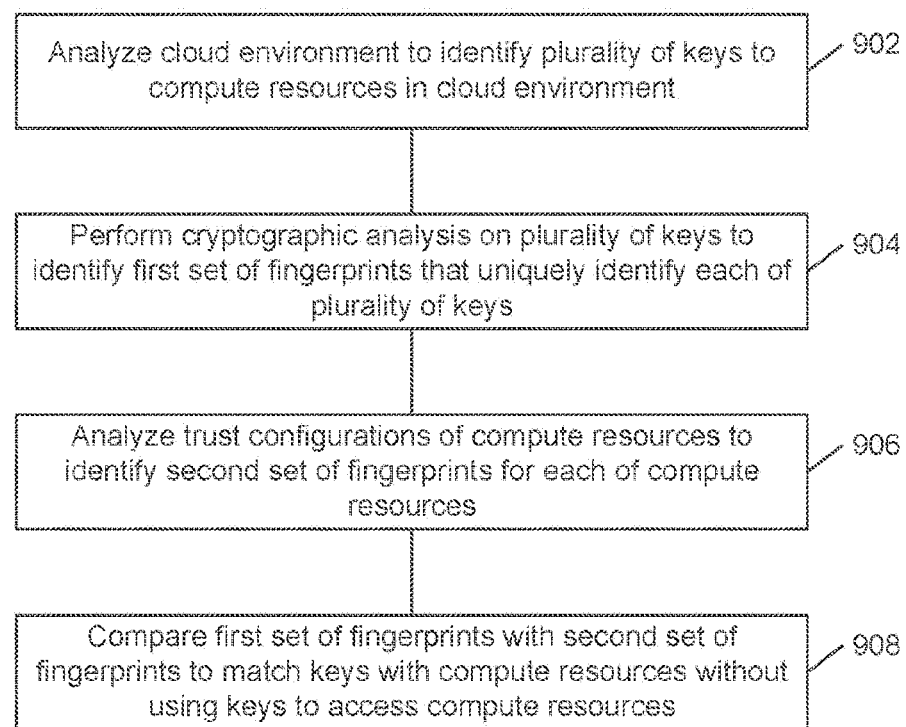

FIG. 9 is a block diagram illustrating an exemplary process of matching keys with compute resources in a cloud environment, consistent with the disclosed embodiments.

Figure 10:
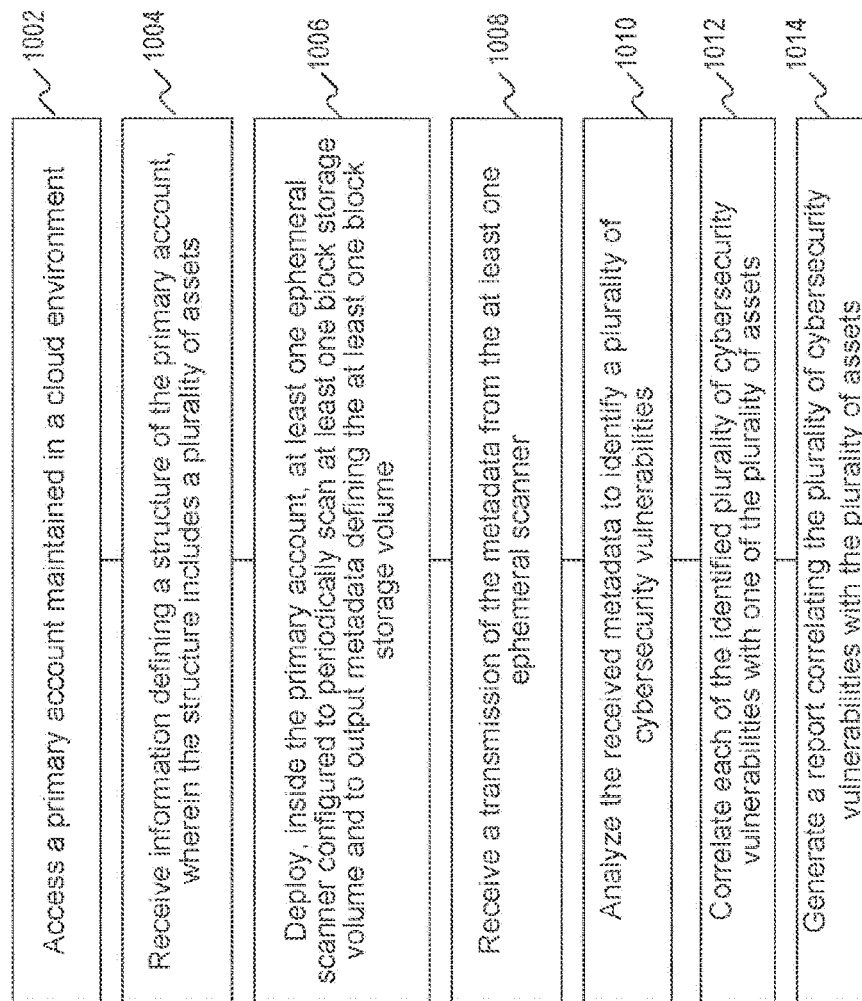

FIG. 10 is a block diagram of a method for deployment of ephemeral scanners, consistent with disclosed embodiments.

Figure 11:
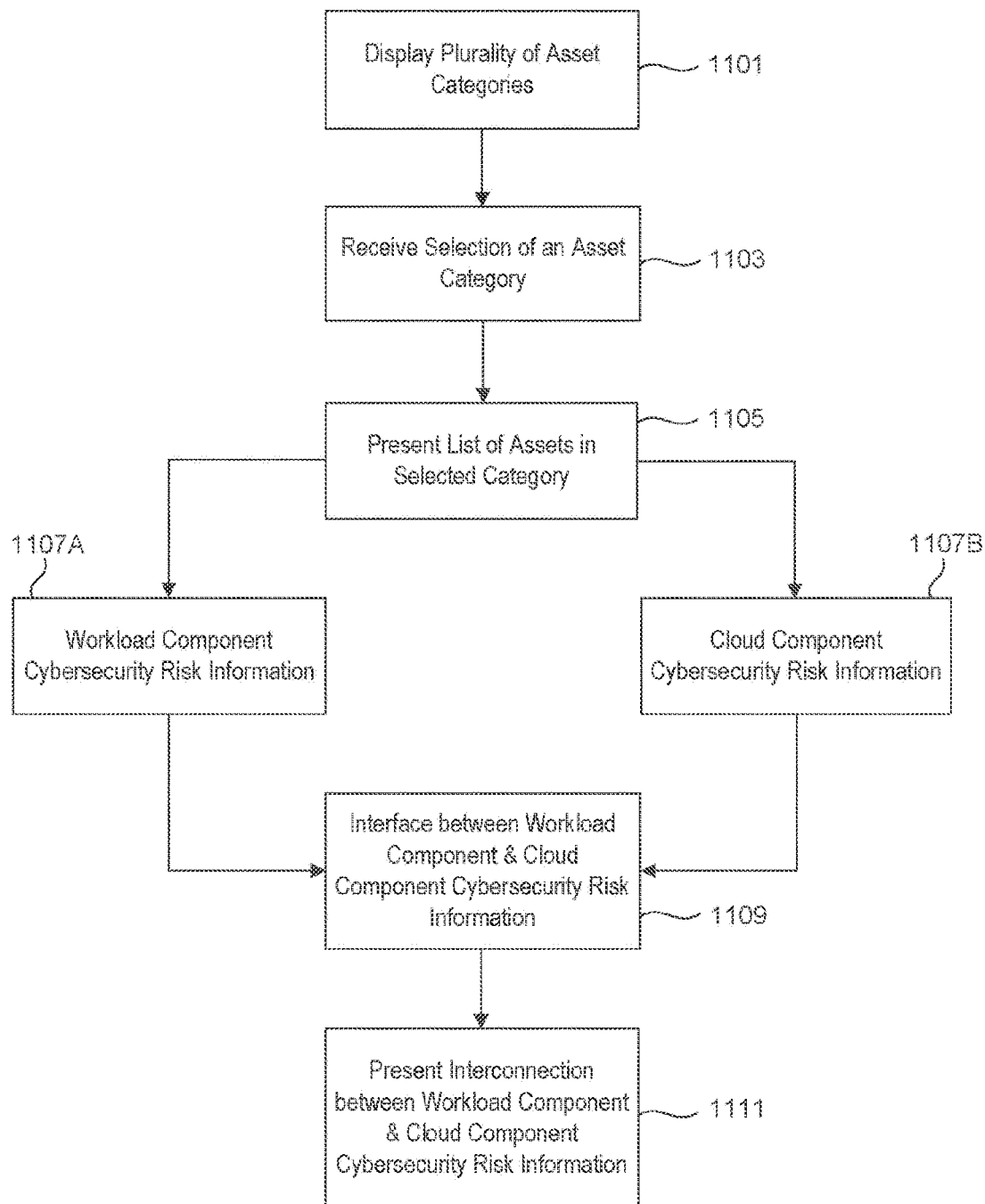

FIG. 11 represents a schematic block diagram illustrating an exemplary embodiment of a method for providing a dashboard aggregating risk information, consistent with disclosed embodiments.

Figure 12:
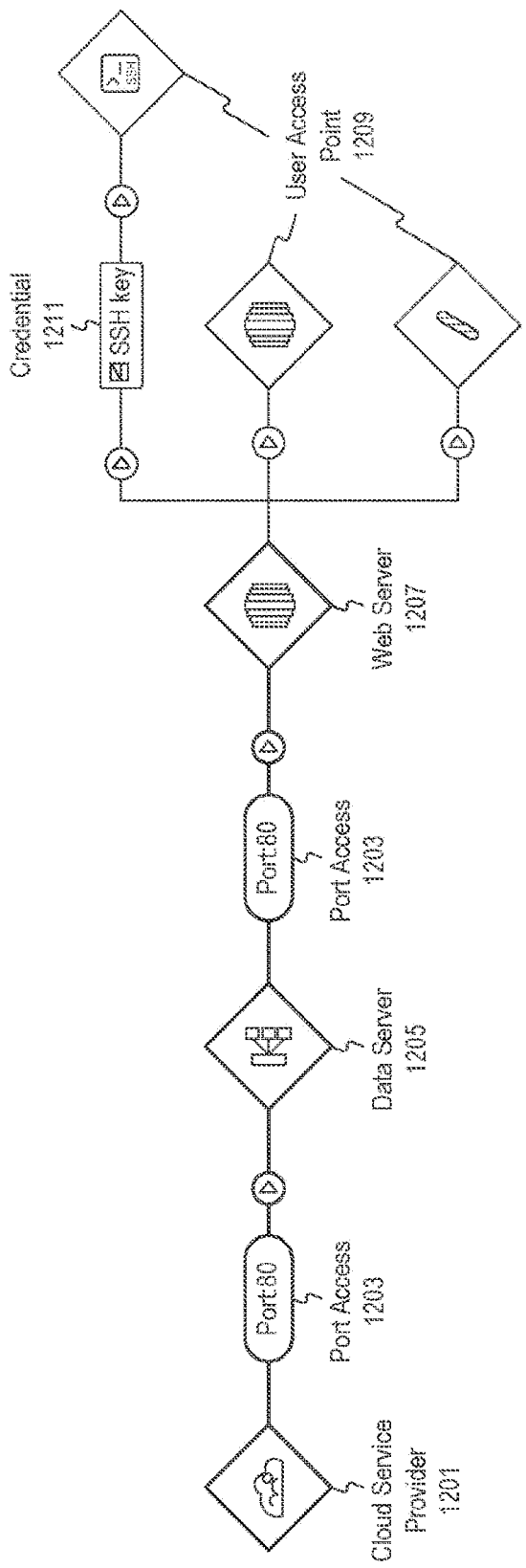

FIG. 12 is a schematic block diagram illustrating an exemplary embodiment of a visual representation of displaying aggregated cybersecurity risk information, consistent with disclosed embodiments.

Figure 13:
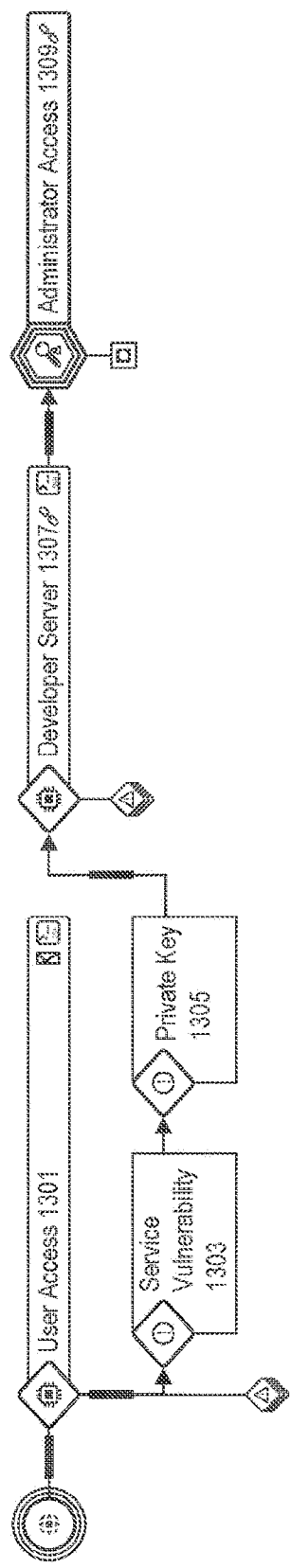

FIG. 13 is a schematic block diagram illustrating an exemplary embodiment of a visual representation of a flow path for aggregated risk information, consistent with disclosed embodiments.

DETAILED DESCRIPTION

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. For example, with this detailed description provides a few examples, these implementations are provided as examples only and are not restrictive of the claim concepts that follow or any of the descriptions herein. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, it is to be understood that the present disclosure may be practiced without one or more of these details.

It is intended that one or more aspects of any mechanism may be combined with one or more aspect of any other mechanisms, and such combinations are within the scope of this disclosure.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable medium may include any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine having any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

Memory employed herein may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for cloud cybersecurity, the computing device may include processing circuitry communicatively connected to a network interface and to a memory, wherein the memory contains instructions to be executed. The computing devices may be devices such as mobile devices, desktops, laptops, tablets, or any other devices capable of processing data. Such computing devices may include a display such as an LED display, augmented reality (AR), virtual reality (VR) display.

"Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Aspects of this disclosure may provide technical solutions to challenges associated with cloud cybersecurity. Disclosed embodiments include methods, systems, devices, and computer-readable media. For ease of discussion, a system is described below with the understanding that the disclosed details may equally apply to methods, devices, and computer-readable media.

Embodiments of the present disclosure include technology referred to as "SideScanning." In contrast to some existing systems and techniques, these embodiments may provide a distinct advantage because the technology does not necessarily require entering into each workload to inspect data. Rather, some embodiments use an out-of-band process to reach cloud workloads through a runtime storage layer, combining this with metadata gathered from API provided through a cloud service provider's system, thus providing visibility of cloud environments both at a low level and with context, without the requirement for an agent or network scanner.

Figure 1:
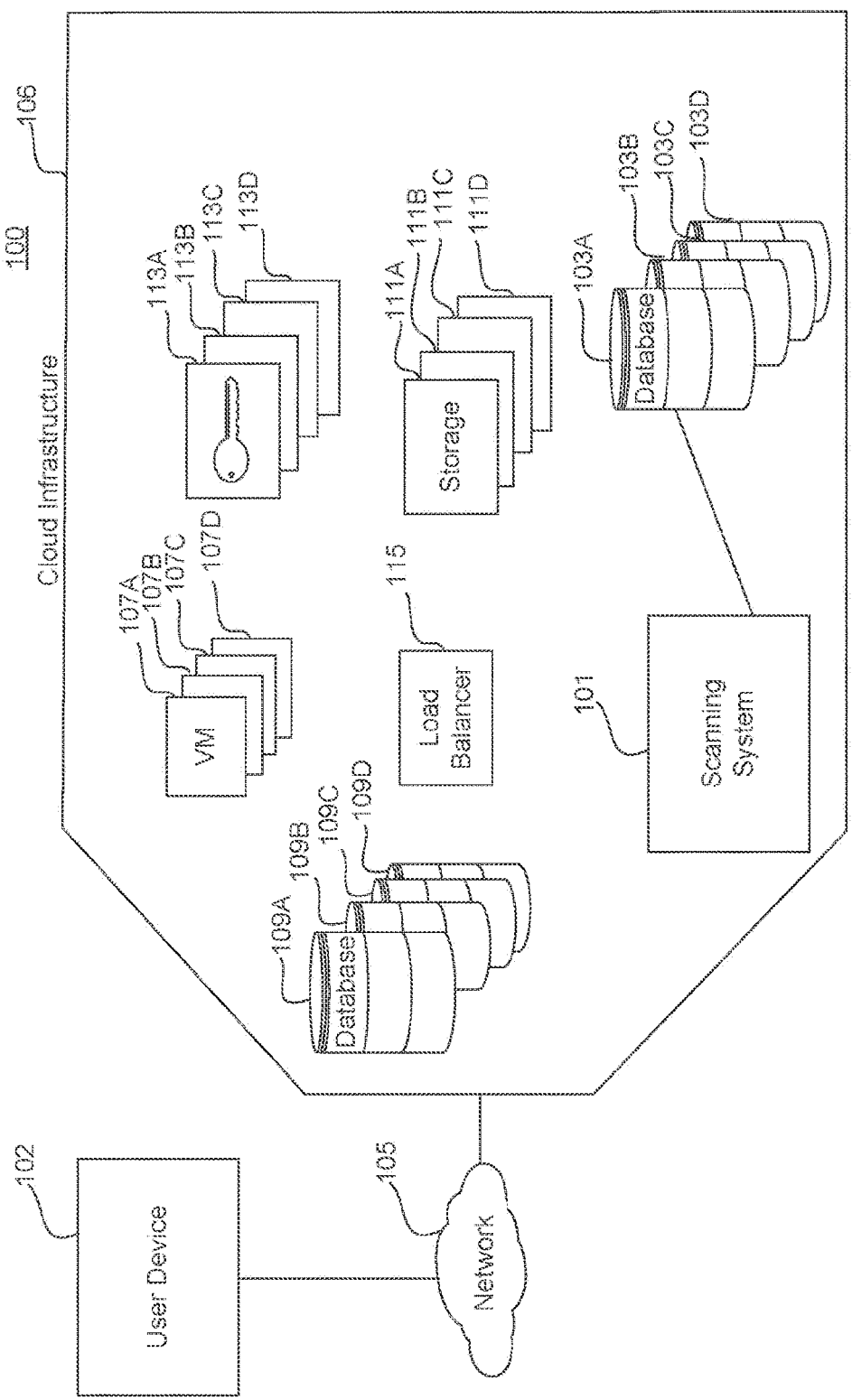
FIG. 1 is a schematic block diagram illustrating an exemplary embodiment of a network including computerized systems, consistent with disclosed embodiments.

FIG. 1 is a schematic block diagram 100 illustrating an exemplary embodiment of a network including computerized systems, consistent with the disclosed embodiments. Diagram 100 includes user device 102, network 105, and cloud infrastructure 106.

Cloud infrastructure 106 includes scanning system 101, databases 103A-103D, virtual machines 107A-107D, databases 109A-109D, storage 111A-111D, keystores 113A-113D, and load balancer 115. While particular numbers and arrangements of devices, systems, and connections, are depicted in exemplary FIG. 1, in some embodiments, each of the devices, systems, or connections may be omitted, duplicated, or modified. For example, in some embodiments, databases 109A-109D may exist as only a single database; in other embodiments, cloud infrastructure 106 may exist as one or more distinct or combined infrastructures (e.g., operated by the same or different cloud services). In some embodiments, scanning system 101 and/or databases 103A-103D may be part of cloud infrastructure 106 (and may be connected to the various other systems and devices in cloud infrastructure 106); in other embodiments, scanning system 101 and/or databases 103A-103D may be separate from cloud infrastructure 106 (e.g., connected to the systems and devices in cloud infrastructure 106 through network 105).

Scanning system 101, in some embodiments, may include one or more computer systems. Each of the one or more computer systems may include memory storing instructions and at least one CPU configured to execute those instructions to perform operations as discussed herein. In some embodiments, the instructions cause the CPU to perform scanning operations. In some embodiments, scanning system 101 may perform a scanning operation on one or more workloads (e.g., systems, devices, resources, etc.) in cloud infrastructure 106.

User device 102, in some embodiments, may include a mechanism operated by a user to control scanning system 101. For example, in some embodiments, user device 102 may be any of a personal computer, a server, a thin client, a tablet, a personal digital assistant, a smartphone, a kiosk, or any other mechanism enabling data input. User device 102 may be operated to instantiate functionality, access data, or otherwise interact with scanning system 101 via network 105, as described herein.

Databases 103A-103D include data stores for use by scanning system 101. In some embodiments, one or more of databases 103A-103D may be implemented as a NoSQL database, a relational database, a cloud database, a columnar database, a wide column database, a key-value database, an object-oriented database, a hierarchical database, or any other kind of database. In some embodiments, one or more of databases 103A-103D may be implemented as flat file stores, data stores, or other non-database storage systems. In some embodiments, databases 103A-103D may be implemented using one or more of ElasticCache, ElasticSearch, DocumentDb, DynamoDB, Neptune, RDS, Aurora, Redshift clusters, Kafka clusters, or EC2 instances.

Network 105 may be implemented as one or more interconnected data networks. For example, network 105 may include one or more of any type of network (including infrastructure) that provides communications, exchanges information, and/or facilitates the exchange of information, such as the Internet, a Local Area Network, a near field communication (NFC) network, or other suitable connection(s) that enables the sending and receiving of information between the components of system 100. Network 105 may be implemented using wireless connections, wired connections, or both. In some embodiments, one or more components of system 100 can communicate through network 105. In some embodiments, one or more components of system 100 may communicate directly through one or more dedicated communication links. While particular devices and systems are shown as connected to network 105, in some embodiments, more or fewer devices and systems may be connected to network 105.

Cloud infrastructure 106 may be implemented as a set of devices and systems offered by a single cloud service provider. For example, cloud infrastructure 106 may comprise devices and systems that are part of Amazon Web Services, Microsoft Azure, Google Cloud Platform, IBM Cloud, Alibaba Cloud, or any other cloud platform provider. In some embodiments, one or more of the devices and systems in cloud infrastructure may require authentication or other identity validation for access. For example, to access virtual machine 107A, a user may be required to enter a password or provide a key. Systems (e.g., scanning system 101 or user device 102) may administer or interact with cloud infrastructure 106 using a cloud service provider's system (not pictured).

Virtual machines 107A-107D may include one or more devices and systems that implement a virtualized/emulated version of a computer. A virtual machine may be implemented as an emulated version of a computer—including an operating system, memory, storage, graphics processing—such that it can be indistinguishable from a standard (non-virtual) machine to a running program. A computer system, referred to as a "host," may operate virtual machines 107A-107D, referred to as "guests," by dividing the resources of the host between the virtual machines such that each virtual machine is isolated from one another. This means that in some embodiments, one virtual machine, and the operating system(s) and application(s) running thereon, is only able to access the resources that are allocated to that virtual machine and cannot access resources allocated to other virtual machines. For example, if a host has 32 gigabytes of random access memory (RAM), and is hosting three virtual machines, the host may segment 8 gigabytes of RAM to each virtual machine such that each virtual machine may only access data in that 8 gigabytes of RAM and not any of the other 24 gigabytes. Examples of commercial virtual machine software and services include VMWare Workstation, VMWare Server, VMWare ESXi, VirtualBox, Parallels Desktop, Parallels RAS, Amazon Machine Image, Amazon ECS, Kubernetes, Microsoft Hyper-V, and Xen.

Databases 109A-109D may include data stores for use by devices and systems in cloud infrastructure 106. In some embodiments, one or more of databases 109A-109D may be implemented as a NoSQL database, a relational database, a cloud database, a columnar database, a wide column database, a key-value database, an object-oriented database, a hierarchical database, or any other kind of database. In some embodiments, one or more of databases 109A-109D may be implemented as flat file stores, data stores, or other non-database storage systems. In some embodiments, databases 109A-109D may be implemented using one or more of ElasticCache, ElasticSearch, DocumentDb, DynamoDB, Neptune, RDS, Aurora, Redshift clusters, Kafka clusters, or EC2 instances. Databases 109A-109D may store data usable by devices or systems in cloud infrastructure 106. The data, in some embodiments, may include e-commerce data (e.g., shipments, orders, inventory), media data (e.g., pictures, movies, streaming data), financial data (e.g., banking data, investment data), or other data.

Storage 111A-111D may include storage systems for use by devices and systems in cloud infrastructure 106. In some embodiments, one or more of storage 111A-111D may be implemented as a hard drive, a RAID array, flash memory, optical storage, or any other kind of storage. Each of 111A-111D may include one or more filesystems (e.g., Amazon Elastic File System, GlusterFS, Google File System, Hadoop Distributed File System, OpenZFS, S3, Elastic Block Storage).

In some embodiments, systems and devices of cloud infrastructure 106 may use databases 109A-109D to store data that is accessed frequently (where, for example, access is required within a few milliseconds), and may use storage 111A-111D to store data that is accessed less frequently (where, for example, access is required within a few minutes or hours).

Keystores 113A-113D may include systems storing keys for accessing data and functionality. For example, to access certain data or systems, a system may require the use of passwords or keys in keystores 113A-113D for authentication. The data and functionality that the keys grant access to may be part of cloud infrastructure 106 or may be separate from cloud infrastructure 106. For example, keystores 113A-113D may include systems that store public and private keys (e.g., for use via SSH), may store passwords (e.g., login information for websites or programs), may store tokens (e.g., one-time passcodes), or the like. In some embodiments, keystores 113A-113D may be implemented as one or more of Amazon Web Services KMS, Azure Key Vault, or Google KMS.

Load balancer 115 may include one or more systems that balance incoming requests between the different systems and devices of cloud infrastructure 106. For example, load balancer 115 may be configured to determine usage (e.g., processor load, used storage capacity) of systems or devices in cloud infrastructure 106 to assist in determining where to route an incoming request from network 105 to store data, perform processing, or retrieve data.

Load balancer 115 may be configured to receive an incoming request from user device 102. Upon receipt of the request, load balancer 115 may consult a data store (part of or separate from load balancer 115; not pictured) to determine usage or forecasted usage of various systems or devices in cloud infrastructure 106, and may forward the request to the systems or devices having the lowest usage or forecasted usage.

Figure 2A:
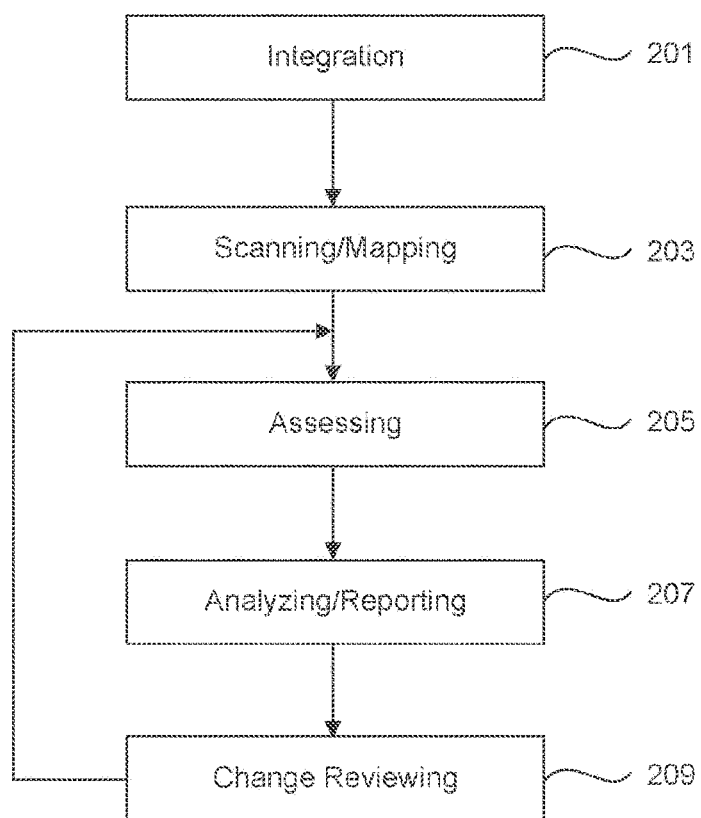
FIG. 2A is a schematic block diagram illustrating an exemplary embodiment of a process for integration, scanning, assessment, analyzing/reporting, and change reviewing, consistent with disclosed embodiments.

FIG. 2A is a schematic block diagram illustrating an exemplary embodiment of a process 200 for integration, scanning, assessment, and review, consistent with the disclosed embodiments. In some embodiments, the steps in FIG. 2A are executed using software and hardware of scanning system 101. In some embodiments, the steps in FIG. 2A may be performed in an order other than those depicted in FIG. 2A. In some embodiments, steps may also be omitted, repeated, or modified. In some embodiments, information gathered in one step of FIG. 2A may be used to provide context or other information for use in another step of FIG. 2A. In other embodiments, the steps in FIG. 2A may be executed by other devices.

Process 200 begins with step 201. In step 201, scanning system 101 may execute a process of integration. The integration process may be performed by scanning system 101 with cloud infrastructure 106. In some embodiments, the integration process includes creating a connection between an account on scanning system 101 and an account on cloud infrastructure 106. The process of integration in step 201 may, in some embodiments, be implemented as described below with respect to FIG. 2B.

In step 203, scanning system 101 may execute a process of scanning/mapping. The scanning/mapping process may be performed by scanning system 101 with cloud infrastructure 106. In some embodiments, the scanning and mapping process may include analyzing data relating to cloud infrastructure 106 using scanning system 101, by reading cloud infrastructure 106 through the connection made in step 201 and generate a "map" (e.g., a data structure or data collection) representing systems and devices in cloud infrastructure 106. The process of scanning and mapping in step 203 may, in some embodiments, be implemented as described below with respect to FIG. 2C.

In step 205, scanning system 101 may execute a process of assessing. The assessing process may be performed by scanning system 101. In some embodiments, the assessing process may include reviewing vulnerabilities, infrastructure, interconnections, data, and other information, using scanning system 101. The process of assessing in step 205 may, in some embodiments, be implemented as described below with respect to FIG. 2D.

In step 207, scanning system 101 may execute a process of analyzing/reporting. The analyzing/reporting may be performed by scanning system 101. In some embodiments, the change reviewing process comprises scanning system 101 scanning cloud infrastructure 106 again to determine the differences between an earlier observed snapshot of cloud infrastructure 106 and the current state thereof. In some embodiments, scanning system 101 may analyze information (e.g., steps 203 and/or 205) to generate reports. The reports may list what each vulnerability is, where it is located, and its priority. In this way, security engineers and DevOps teams may be able to easily assess how to best allocate their time and attention.

In some embodiments, analyzing/reporting in step 207 may include scanning system 101 combining conclusions from different environmental perspectives (e.g., metadata) into a single model. For example, scanning system 101 may map the running services on cloud infrastructure 106 and consider collected vulnerability data. Scanning system 101, in some embodiments, may generate a visualization of the map for review, listing where the vulnerabilities are on a two-dimensional graphical representation of cloud infrastructure 106.

In some embodiments, scanning system 101 may indicate in the map whether an asset (e.g., a system or device) is Internet-facing and easily accessible to attackers, exposed only to internal assets or if it is private altogether (and may be less critical). For example, based on the contextual map, scanning system 101 may perform a "forward" analysis of the specific asset under identification to identify at least one possible Internet-originating attack vector to the asset. Alternatively or additionally, scanning system 101 may perform a "backward" analysis of the specific asset to identify exposure risk to assets downstream of the specific asset, wherein the downstream exposure risk includes an identification of an exposed asset, an entry point to the exposed asset, and lateral movement risks associated with the exposed asset. Both backward and forward analysis can be recursively, for one or more hops, Scanning system 101 may present these analyses to a user via graphical user interface or expose them via an API.

As one example, scanning system 101 may determine a vulnerability in a web service. In some embodiments, scanning system 101 may score the vulnerability as: high risk if the web service is connected to the Internet (e.g., has at least one public port forwarded through a firewall to the web service, is able to be accessed through a load balancer, is able to be accessed via reverse proxy); medium risk if the web service is only accessible internally (e.g., because of firewall configuration); and low risk if access to the web server is blocked by a configuration of cloud infrastructure 106. As another example, if a machine is stopped (e.g., turned off, not running, not connected), a vulnerability, but one that is less likely to be exploited because the machine isn't running. This affects its risk score and other mitigating factors.

In step 209, scanning system 101 may execute a process of change reviewing. The change reviewing may be performed by scanning system 101. In some embodiments, the change reviewing process may include scanning system 101 scanning cloud infrastructure 106 again to determine the differences between an earlier observed snapshot of cloud infrastructure 106 and the current state thereof.

In some embodiments, scanning system 101 may monitor cloud change, or "delta," logs (e.g., Cloud event logs such as AWS CloudTrail, monitoring a network-related change in state, a trust-related change in state, or a disk configuration-related change in state in at least one of the primary asset group or a secondary asset group) and contextualize associated risks discovered within a customer cloud account. In some embodiments, scanning system 101 may generate a new map of assets based on a review of all systems or devices in cloud infrastructure 106 (e.g., as described above with respect to step 203), and compare the new map to the map generated earlier in step 203 to determine which assets have changed. In some embodiments, this comparison may require comparing data, metadata, network connections, software configurations, firewall configurations, or any other aspects related to cloud infrastructure 106, including, for example, determining new assets that are created or assets for which their configuration has changed.

After step 209, as depicted in FIG. 2A, process 200 may return to step 205. Scanning system 101 may then perform step 205 again. In some embodiments, steps 205, and 207 may be performed only on the devices or systems that have experienced a change that was detected by step 209. In some embodiments, process 200 may return to step 203 after step 209.

Figure 2B:
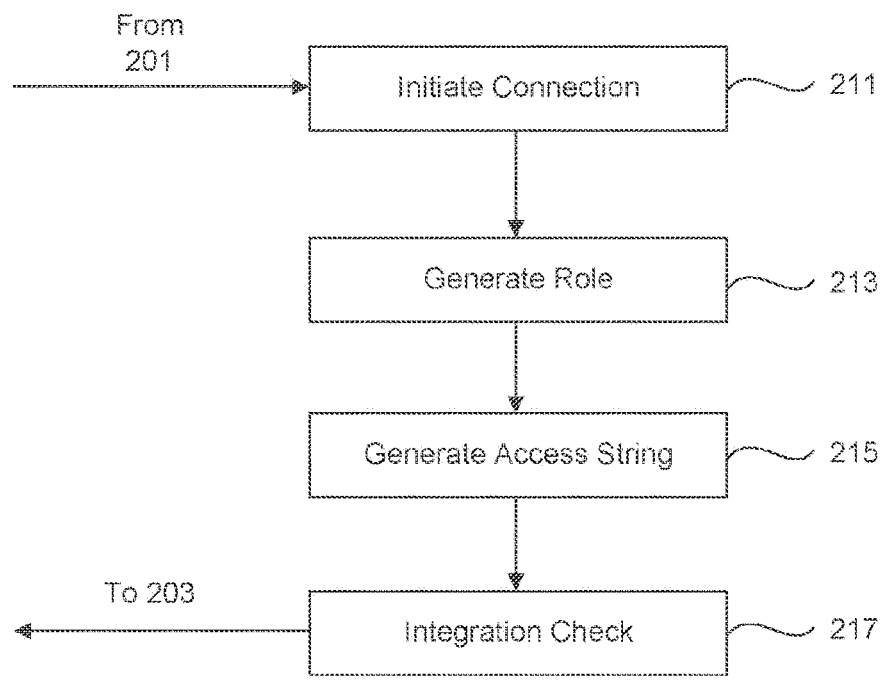
FIG. 2B is a schematic block diagram illustrating an exemplary embodiment of a process for integration, consistent with disclosed embodiments.

FIG. 2B is a schematic block diagram illustrating an exemplary embodiment of a process 210 for integration, consistent with the disclosed embodiments. In some embodiments, the steps in FIG. 2B are executed using software and hardware of scanning system 101. Integration, in some embodiments, is a process for creating a trust relationship between scanning system 101 and cloud infrastructure 106.

In some embodiments, the steps in FIG. 2B may be performed in an order other than those depicted in FIG. 2B. In some embodiments, steps may also be omitted, repeated, or modified. In some embodiments, information gathered in one step of FIG. 2B may be used to provide context or other information for use in another step of FIG. 2B. In other embodiments, the steps in FIG. 2B may be executed by other devices.

Process 210 may begin with step 211 to initiate a connection to cloud infrastructure 106. In step 211, scanning system 101 may send a message to user device 102 instructing a user to authenticate, or log in, to a cloud service provider's system operating cloud infrastructure 106. For example, the user may use a username, password, one-time password, two-factor authentication, or any other authentication mechanism to gain access to a cloud service provider's system.

Concurrently with or after the first message, scanning system 101 may send a second message to user device 102, instructing the user to generate a role. The second message may include instructions for the user to follow to generate the role. In step 213, a user may provide (e.g., via a keyboard at user device 102) a role definition to the cloud service provider's system. In some embodiments, the role definition includes read-only permissions and permissions to read a block storage layer (containing block storage volumes). In some embodiments, scanning system 101 provides a role formation template (e.g., an Amazon Web Services Cloud-Formation Template) for use with cloud infrastructure 106 to create the necessary role. In step 213, the user may utilize user device 102, for example, by copying and pasting a URL of the template, downloading and uploading the template to the cloud service provider's system, or selecting the template from a list of templates.

In step 215, the cloud service provider's system may generate a string (e.g., a "key" or "resource name") for use by scanning system 101. In some embodiments, this string may be used to enable access by scanning system 101 to the workload of cloud infrastructure as permitted by the generated role. A user using user device 102 may copy the string and paste it into a user interface presented by scanning system 101 on user device 102. Other aspects of transmitting this string to scanning system 101 are possible as well.

In step 217, scanning system 101 determines that it is able to access cloud infrastructure 106. For example, scanning system 101 may attempt to perform a command such as authenticating to cloud infrastructure 106 using the string received in step 215 or attempting to perform a command using cloud infrastructure (e.g., requesting a listing of files stored on storage 111A). Once scanning system 101 determines that it is able to access cloud infrastructure 106, the process may return to FIG. 2A and step 203.

Figure 2C:
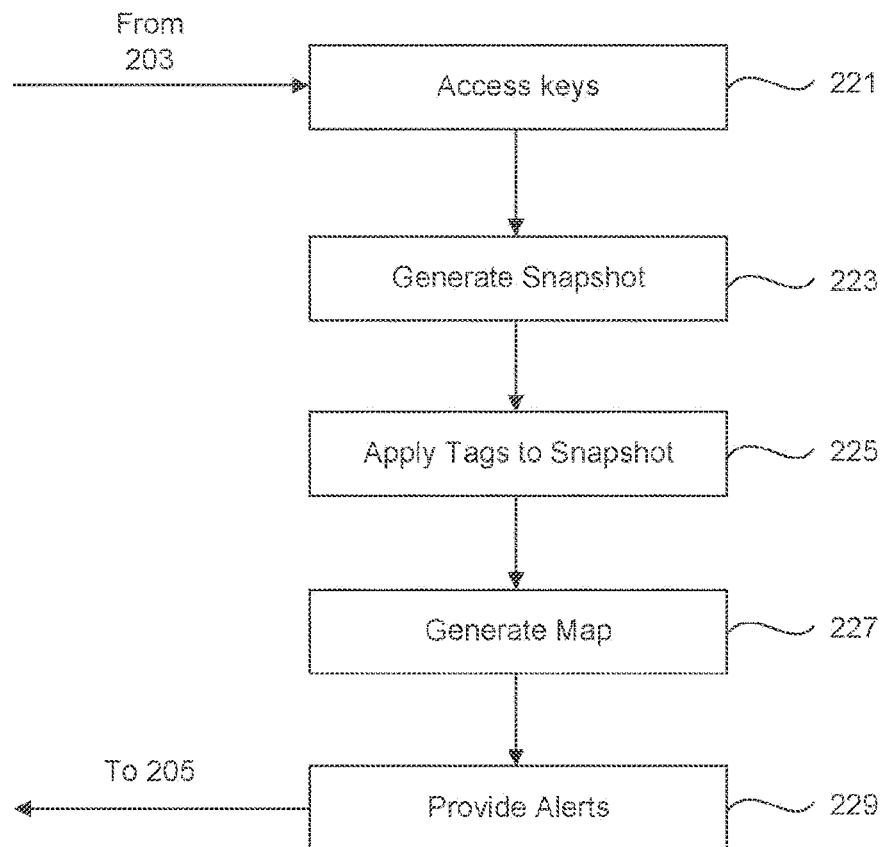
FIG. 2C is a schematic block diagram illustrating an exemplary embodiment of a process for scanning/mapping, consistent with disclosed embodiments.

FIG. 2C is a schematic block diagram illustrating an exemplary embodiment of a process 220 for scanning/mapping, consistent with the disclosed embodiments. In some embodiments, the steps in FIG. 2C are executed using software and hardware of scanning system 101. In some embodiments, the steps in FIG. 2C may be performed in an order other than those depicted in FIG. 2C. In some embodiments, steps may also be omitted, repeated, or modified. In some embodiments, information gathered in one step of FIG. 2C may be used to provide context or other information for use in another step of FIG. 2C. In other embodiments, the steps in FIG. 2C may be executed by other devices.

Process 220 may begin with step 221 where scanning system 101 initiates a process to access keys, such as those keys stored in keystores 113A-113D. Scanning system 101 may utilize the string (e.g., a key or resource name) received in process 210 to authenticate in order to retrieve keys stored in keystores 113A-113D. Once authenticated, scanning system 101 may access one, some, or all keys stored in keystores 113A-113D. In some embodiments, step 221 may comprise utilizing pre-established trust relationships, such as AWS trust policies, instead of creating a new relationship.

In step 223, scanning system 101 may generate a "snapshot" of devices and systems in cloud infrastructure 106. In some embodiments, generating a snapshot may include reading devices and systems in cloud infrastructure, such as storage 111A-111D, databases 109A-109D, and virtual machines 107A-107D, and copying the information read from those devices and systems to storage at scanning system 101. Generating a snapshot, in some embodiments, may include recording a reference count to data blocks in one or more of storage 111A-111D, databases 109A-109D, and virtual machines 107A-107D, and copying each block them like a copy and write operation. In some embodiments, scanning system 101 may generate an Elastic Block Storage snapshot in step 223.

In some embodiments, scanning system 101 uses one or more keys retrieved from keystores 113A-113D to encrypt "snapshots" of cloud infrastructure.

In step 225, scanning system 101 may apply "tags" to the snapshot. This process may include, in some embodiments, adding information to the snapshot to identify the snapshot as being associated with scanning system 101. Scanning system 101, in some embodiments, may be configured to delete only snapshots with the associated tags.

In step 227, scanning system 101 may generate a map of cloud infrastructure 106. In some embodiments, this map may be in a form of graph: a plurality of interconnected vectors connecting the plurality of systems and devices, based on the networking configuration. Scanning system 101, or other devices, may traverse the map to identify vectors originating in the Internet and reaching the devices and systems in cloud infrastructure 106. In some embodiments, generating the map may include enumerating Internet-accessible services that are capable of serving as an Internet proxy. In some embodiments, a user may control scanning system 101 (e.g., via user device 102) to display the map on a graphical user interface.

In some embodiments, generating the map may include enumerating properties of all assets, including: virtual machines 107A-107D, databases 109A-109D, storage 111A-111D, keystores 113A-113D, load balancer 115, log files or databases, API gateway resources, API gateway REST APIs, Autoscaling groups, CloudTrail logs, CloudFront services, volumes, snapshots, VPCs, subnets, route tables, network ACLs, VPC endpoints, NAT gateways, ELB and ALB, ECR repositories, ECS clusters, services, and tasks, EKS, S3 bucket and Glacier storage, SNS topics, IAM roles, policies, groups, users, KMS keys, and Lambda functions. In some embodiments, generating the map in step 227 may further include analyzing devices or systems for a subset of risk related situations, including determinations of compromise situations (e.g., where an attacker has already gained access), imminent compromise situations (e.g., a known attack vector exists and can be used, such as a data store that is exposed to the public Internet without authentication), hazardous situations (e.g., a serious security implication, but no full attack vector exists), or informational situations (e.g., when storage 111A-111D has a limited amount of free space, or an unexploitable vulnerability exists).

Generating the map in step 227 may include recording information such a region identifier, site identifier, datacenter identifier, physical address, network address, workload name, or any other identifier which may be acquired via an API provided through a cloud service provider's system.

In step 229, scanning system 101 may provide alerts, e.g., to user device 102, indicating any situations found during the process of generating the map. For example, scanning system 101 may send one or more of an email, a popup alert, a text message, or other notification to user device 102.

After performing step 229, the process may return to FIG. 2A and step 205.

Figure 2D:
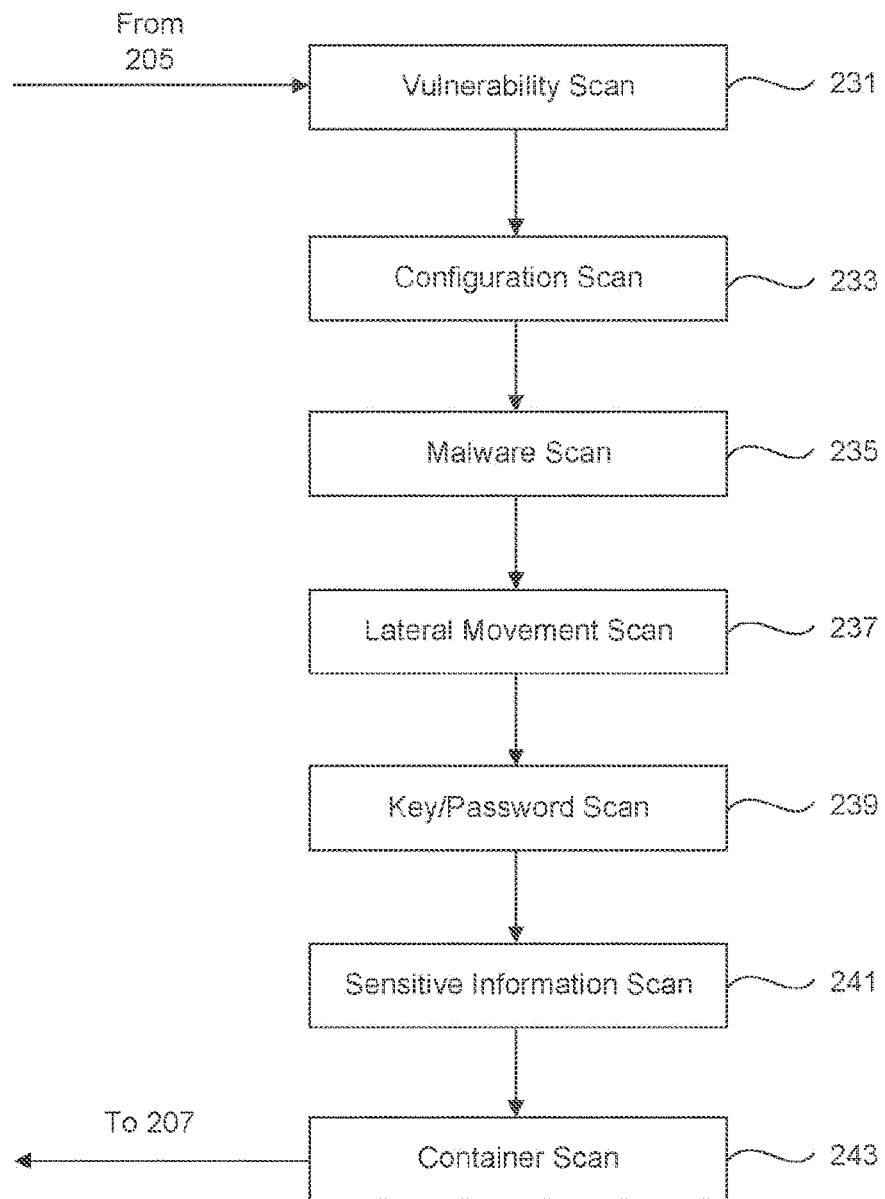
FIG. 2D is a schematic block diagram illustrating an exemplary embodiment of a process for assessment, consistent with disclosed embodiments.

FIG. 2D is a schematic block diagram illustrating an exemplary embodiment of a process 230 for assessing, consistent with the disclosed embodiments. In some embodiments, the steps in FIG. 2D are executed using software and hardware of scanning system 101. In other embodiments, the steps in FIG. 2D may be executed by other devices. In some embodiments, scanning system 101 may execute the steps in FIG. 2D against a snapshot created in step 223 of FIG. 2C and stored at scanning system 101. In some embodiments, the steps in FIG. 2D may be performed in an order other than those depicted in FIG. 2D. In some embodiments, steps may also be omitted, repeated, or modified. In some embodiments, information gathered in one step of FIG. 2D may be used to provide context or other information for use in another step of FIG. 2D.

Process 230 begins with step 231. In step 231, scanning system 101 may perform a step of vulnerability scanning. In some embodiments, step 231 comprises extracting everything in the snapshot, including operating system packages, installed software applications, libraries, and program language libraries such as Java archives, Python packages, Go modules, Ruby gems, PHP packages, and Node.js modules, or other software applications.

In some embodiments, step 231 may determine library versions, software versions, and other identifying characteristics of software and operating systems in the snapshot.

Scanning system 101 may then try to match them to known vulnerabilities stored in a vulnerability database (e.g., one of databases 103A-103D). The vulnerability database, in some embodiments, may include vulnerability data from: NVD, WPVulnDB, US-CERT, Node.js Security Working Group, OVAL—Red Hat, Oracle Linux, Debian, Ubuntu, SUSE, Ruby Advisory Database, JVN, Safety DB(Python), Alpine secdb, PHP Security Advisories Database, Amazon ALAS, RustSec Advisory Database, Red Hat Security Advisories, Microsoft MSRC, KB, Debian Security Bug Tracker, Kubernetes security announcements, Exploit Database, Drupal security advisories, JPCERT. The vulnerability database may also include other vulnerability data (including, e.g., manually-added vulnerability data or vulnerability sources not listed above).

In step 233, scanning system 101 may perform a step of configuration scanning. In step 233, scanning system 101 may gather configuration information—such as a list of users of each system or device (e.g., virtual machines 107A-D), each system's or device's services, password hashes, and application-specific configurations for software/services such as Apache, Nginx, SSH, and other services. In some embodiments, scanning system 101 may perform a first analysis on all information collected in step 233 to remove sensitive information (e.g., social security numbers, passwords, birthdates) before proceeding to review the configuration information. In some embodiments, step 233 may comprise verifying adherence of the systems or devices in cloud infrastructure 106 to standards or benchmarks established by an external entity, such as the Center for Internet Security.

In some embodiments, scanning system 101 may perform a benchmarking process to detect misconfigurations of any services based on the information gathered in step 233. For example, scanning system 101 may determine the software version of each service and examine it against known vulnerabilities (e.g., stored in database 103A).

In some embodiments, scanning system 101 may determine bugs or other configuration risks that might only be exploitable from internal machines, because such bugs and risks can facilitate an attacker's lateral movement.

In some embodiments, scanning system 101 may evaluate network misconfigurations and their implications. Scanning system 101 may query devices and systems capable of routing traffic (e.g., load balancer 115, routers, switches, firewalls, and proxies) using an API provided through a cloud service provider's system to determine network configurations, and may evaluate them against known problematic configurations or other configurations.

In step 235, scanning system 101 may perform a step of malware scanning. In some embodiments, scanning system 101 may perform malware scanning across all filesystems in the snapshot (e.g., gathered from virtual machines 107A-107D or storage 111A-111D). Scanning system 101 may use multiple malware scanning software solutions to perform a malware scan against the filesystems, including one sourced from another vendor, such as bucketAV, Trend Micro Cloud One, Sophos Cloud Optix, Crowdstrike Falcon CWP, or others. In some embodiments, malware scanning in step 235 comprises utilizing signatures, heuristics, or sandboxing capabilities to deduce whether there is an infection on the machine.

In step 237, scanning system 101 may perform a step of lateral movement scanning. An attacker who establishes a network foothold usually attempts to move laterally from one resource to another in search of rich targets such as valuable data. Stolen passwords and keys unlock access to servers, files, and privileged accounts. In some embodiments, scanning system 101 may gather keys from each scanned system or device (e.g., virtual machines 107A-107D or storage 111A-111D). In some embodiments, scanning system 101 searches for passwords, scripts, shell history, repositories, or other data that may contain passwords, cloud access keys, SSH keys, or other key/password/access information that provide unchecked access to important resources. In some embodiments, scanning system 101 searches for such keys/passwords/access information and calculates a "hash" (a mathematical fingerprint) of each string. Scanning system 101 then attempts to match the hashed strings to hashes of strings that that are stored on different systems or devices. This will be used to detect the potential lateral movement between assets.

In step 239, scanning system 101 may perform a step of key/password scanning. As one example situation, suppose there is a weak or unprotected password stored (in plain text) in storage 111A. For example, if a personal email account has been compromised, the passwords may be known about in advance. Scanning system 101 may search the snapshot for similar usernames or login names, and, either using known dictionaries or the account owner's previously leaked passwords (stored in, e.g., database 103A), may attempt to login to one or more systems or devices in cloud infrastructure 106, and may record the result thereof.

In some embodiments, scanning system 101 may perform a "fuzzy search" on any usernames found in a password database (e.g., database 103A) to determine existing targets for password testing. In some embodiments, the fuzzy search uses the Damerau-Levenshtein edit distance algorithm.

As one example, scanning system 101 may determine that a leaked username includes the email address johndoe@acme.com. Scanning system 101 may try to match passwords from john.doe@acme.net, johndoe@gmail.com, and other variations. Scanning system 101 may perform a similar process against leaked passwords (e.g., if a leaked password is "Victory@19," scanning system may attempt to log in using "Victory@20."

In step 241, scanning system 101 may perform a step of sensitive information scanning. In some embodiments, scanning system 101 may search the snapshot for sensitive information, such as personally identifiable information (PII), Social Security numbers, healthcare information, or credit card numbers. In some embodiments, scanning system 101 may search data repository history as well. This is because it is not uncommon for an entire production environment repository to be cloned, with no one remembering the copy contains sensitive information. In some situations, detecting sensitive data not secured is critical in adherence to data privacy regulations.

To be certain that such alerts do not constitute false positives, in some embodiments, scanning system 101 may perform statistical scans against the data. For example, it is possible for a random number to resemble a Social Security number, yet it is extremely unlikely for the majority of a file with thousands of numbers to be valid Social Security Number by pure chance.

In step 243, scanning system 101 may perform a step of container scanning. In some embodiments, scanning system 101 may apply one or more of the preceding steps of FIG. 2D against containerized environments. In some embodiments, in order to do so, scanning system 101 reconstructs a container runtime layered file system (LFS) before recursively running one or more of steps 231-241 on the reconstructed file system.

Scanning system 101 may read network information from the snapshot in order to determine which services within which containers are exposed externally and within which ports they are accessible. For example, scanning system 101 may identify a port on which a vulnerable application is accessible based on known software vulnerabilities for a versions of software application. Scanning system 101 may query network accessibility information via an API provided through a cloud service provider's system and may use it to identify specific vulnerabilities susceptible to attack.

After performing step 243 on one or more containers, the process may return to FIG. 2A and step 207 (as discussed above).

Foundational Techniques

Aspects of this disclosure may include establishing a trusted relationship between a source account in a cloud environment and a scanner account. A trusted relationship, as used herein, may refer to a secure communication channel between at least two accounts (e.g., domains). The secure communications channel may include, for example, an administration link, communication link, a connection or communication network configured with security protocols, or any other secure relationship between two networked entities. A trusted relationship between two accounts may enable user accounts and global groups to be used in a domain other than the domain where the accounts are defined. A source account, as used herein, may refer to a domain, a location on a network server, or anything used to access system resources. A cloud environment, as used herein, may refer to a platform implemented on, hosted on, and/or accessing servers that may be reached via the Internet or other shared network. A scanner account, as used herein, may refer to any type of account associated with a scanner. A scanner, as used herein, may refer to a device for examining, reading, or monitoring electronically accessible information. FIG. 1 illustrates one example of a scanner, which is depicted in an exemplary manner as scanning system 101.

By way of example, establishing a trusted relationship between a source account in a cloud environment and a scanner account may include an integration process (creating a connection between an account on scanning system 101 and an account on cloud infrastructure 106) discussed with reference to FIG. 2A. By way of one example, scanning system 101 of FIG. 1 may create a trusted relationship between a source account in a cloud environment and a scanner account.

Aspects of this disclosure may include using the established trust relationship, utilizing at least one cloud provider API to identify workloads in the source account. A cloud provider API, as used herein, may refer to any application program interface that allows an end user to interact with a cloud providers service. A cloud provider, may include any entity through whom information is accessible over the Internet or other shared network. Workloads, as used herein, may refer to systems, devices, or resources in a network (or available via a network) such as a cloud infrastructure. By way of example, FIG. 1 illustrates examples of a workload: virtual machines 107A-107D, databases 109A-109D, storage 111A-111D, keystores 113A-113D, and load balancer 115. In some embodiments, scanning system 101 of FIG. 1 may perform a scanning operation on workload (e.g., systems, devices, resources, etc.) in cloud infrastructure 106.

In some embodiments, scanning system 101 of FIG. 1 may use an API to detect workloads such as virtual machines 107A-107D, databases 109A-109D, storage 111A-111D, keystores 113A-113D, and load balancer 115 in the source account.

Aspects of this disclosure may involve using the at least one cloud provider API to query a geographical location of at least one of the identified workloads. Querying, as used herein, may refer to a request for data or information from a resource. A geographical location, as used herein, may refer to the data center where this workload is served, a position on Earth, a location in a network, an address of a server or other hardware, or any other information capable of identifying a locus, region, or position. Internet geolocation involves software capable of deducing a geographic position of a device connected to the Internet. For example, the device's IP address may be used to determine the country, city, or ZIP code, determining its geographical location. By way of example, scanning system 101 of FIG. 1 may query any of workloads virtual machines 107A-107D, databases 109A-109D, storage 111A-111D, keystores 113A-113D of cloud infrastructure 106 for their geographical location using a cloud provider API.

In some embodiments, the geographic location may include an identifier of a physical site. An identifier, as used herein, may refer to anything that allows for recognition of an object, location, or resource. A physical site, as used herein, may refer to an actual location. By way of example, scanning system 101 of FIG. 1 may query any of workloads virtual machines 107A-107D, databases 109A-109D, storage 111A-111D, keystores 113A-113D of cloud infrastructure 106 for an identifier of their physical site (e.g., address, postal code, or any other physical descriptor) using a cloud provider API.

In some embodiments, scanning system 101 of FIG. 1 may use an out-of-band process to reach cloud workloads through a runtime storage layer, in combination with information gathered from cloud provider APIs.

Aspects of this disclosure may include receive an identification of the geographic location. An identification of the geographic location, as used herein, may refer to a recognition, association, or classification of the geographic location. By way of example, scanning system 101 of FIG. 1 may receive a geographical location, after querying for it, by interrogating one or more workloads, such as virtual machines 107A-107D, databases 109A-109D, storage 111A-111D, or keystores 113A-113D of cloud infrastructure 106. For example, the scanning system 101 of FIG. 1 may receive address, postal code, or any other physical descriptor of any workloads in cloud infrastructure 106. In some embodiments, scanning system 101 of FIG. 1 may receive a listing locating the workloads of cloud infrastructure 106 on a two-dimensional graphical representation.

In some embodiments, the identification of the geographic location may include an identification of a data center, at least one of a data center name, an Internet Protocol (IP) address, a name of the cloud provider, or a unique identity. A data center, as used herein, may refer to a facility that centralizes an organization's shared IT operations and equipment for the purposes of storing, processing, and/or disseminating data and applications. A data center, for example, may include a dedicated space within a building, or a group of buildings used to house computer systems and associated components, such as telecommunications and storage systems. An identification of a data center, as used herein, may refer to a recognition, association, or classification of a data center. A data center name, as used herein, may refer to a series of letters or numbers, a word, or set of words or numbers, an address, or a code identifying the data center. An Internet Protocol (IP) address, as used herein, may refer to a unique string of characters that identifies a computer using the Internet Protocol to communicate over a network. A cloud provider, as used herein, may refer to a company that offers any components of cloud computing (e.g., infrastructure as a service (IaaS), software as a service (SaaS) or platform as a service (PaaS)). A unique identity, as used herein, may refer to a distinctive numeric or alphanumeric string that is associated with a single entity within a given system.

By way of example, scanning system 101 of FIG. 1 may query for and receive a geographical location such as a data center name/city and state, data center address, IP address/specific cloud identifier of the workload, name of cloud provider (e.g., Amazon Web Services), or a specific identifier of information of any of workloads such as virtual machines 107A-107D, databases 109A-109D, storage 111A-111D, keystores 113A-113D of cloud infrastructure 106.

In some embodiments, scanning system 101 of FIG. 1 may receive a listing indicating locations of the workloads of cloud infrastructure 106 on a two-dimensional graphical representation.

In some other embodiments, scanning system 101 may receive additional information (in addition to geographic location information) such as whether the workload is Internet-facing and easily accessible to attackers, or if it is private (and may be less critical).

Aspects of this disclosure may include using the cloud provider APIs to access block storage volumes of the at least one workload. Block storage volumes, as used herein, may refer to data files maintained on Storage Area Networks (SANs) or in cloud-based storage environments. Each storage volume may act as an individual hard drive configured by a storage administrator. Accessing block storage volumes, as used herein, may refer to obtaining, examining, or retrieving data.

As described with relation to process 210 of FIG. 2B (beginning with step 211 to initiate a connection to cloud infrastructure 106), scanning system 101 may send a second message to user device 102, instructing the user to generate a role. A role may refer to a type associated with a node that may be assigned or defined. The second message may include instructions for the user to follow to generate the role. In step 213, a user may provide (e.g., via a keyboard at user device 102) a role definition to the cloud service provider's system. In some embodiments, the role definition includes read-only permissions and permissions to read a block storage layer (containing block storage volumes). In some embodiments, scanning system 101 provides a role formation template (e.g., an Amazon Web Services Cloud-Formation Template) for use with cloud infrastructure 106 to create the necessary role. In step 213, the user may utilize user device 102, for example, by copying and pasting a URL of the template, downloading and uploading the template to the cloud service provider's system, or selecting the template from a list of templates.

By way of example, scanning system 101 of FIG. 1 may access the block storage volume of any of workloads virtual machines 107A-107D, databases 109A-109D, storage 111A-111D, keystores 113A-113D of cloud infrastructure 106.

Aspects of this disclosure may include determining a file-system of the at least one workload. A file-system, as used herein, may refer to a method and/or a data structure that the operating system uses to control how data is stored and retrieved.

By way of example, scanning system 101 of FIG. 1 may identify the type of file-system of any of workloads virtual machines 107A-107D, databases 109A-109D, storage 111A-111D, keystores 113A-113D of cloud infrastructure 106.

Some file systems may include NTFS, FAT32, ext3, exFAT, HFS, HFS+, HPFC, UFS, ZFS.

Aspects of this disclosure may include mounting the block storage volumes on a scanner based on the determined file-system. Mounting the block storage volumes, as used herein, may refer to a process by which the operating system makes files and directories (such as block storage volumes) on a storage device available for users to access via the computers file system. A scanner, as used herein, may refer to a device for examining, reading, or monitoring electronically accessible information. By way of example, FIG. 1 illustrates one example of a scanner, scanning system 101 of FIG. 1. In some embodiments, mounting may include selecting a driver corresponding to the determined file system. In some embodiments, to mount the block storage volumes on the scanner, may include creating a snapshot of the block storage volumes; and mounting the snapshot of the block storage volumes on the scanner. A snapshot of the block storage volumes, as used herein, may refer to a current state or earlier state of the block storage volumes.

In some embodiments, the at least one processor may be further configured to encrypt the snapshot of the block storage volumes and mount the encrypted snapshot of the block storage volumes on the scanner. Encrypting a snapshot, as used herein, may refer to a process of encoding information (such as a snapshot). This process may convert the original representation of the information, known as plaintext, into an alternative form known as ciphertext.

In some embodiments, the scanner may use a privileged account to log in and determine how secure each host is from an inside vantage point. While authenticated scans can successfully discover potential vulnerabilities, they may be limited to the extent they require a privileged account on each scanned host. Furthermore, scans use significant system resources during the test procedures and require opening ports that by themselves pose a security risk.

Aspects of this disclosure may include activating a scanner at the geographic location. Activating a scanner, as used herein, may refer to starting up or initiating a device for examining, reading, or monitoring data. By way of example, scanning system 101 of FIG. 1 may start up a scanner (a different scanner than scanning system 101) at the geographic location identified by scanning system 101.

Aspects of this disclosure may include reconstructing from the block storage volumes a state of the workload. Reconstructing, as used herein, may refer to rebuilding or reforming a state of the workload. A state of the workload, as used herein, may refer to a condition of a workload at a certain time. By way of example, scanning system 101 of FIG. 1 may rebuild the block storage volumes as an earlier version of any of workloads such as virtual machines 107A-107D, databases 109A-109D, storage 111A-111D, keystores 113A-113D of cloud infrastructure 106.

In some embodiments, the reconstructed state of the workload may include at least two of an indication of an installed application, a version of an installed application, an operating system configuration, an application configuration, a profile configuration, a log, or a database content. An indication of an installed application, as used herein, may refer to an identifier of a software. A version of an installed application, as used herein, may refer to a particular form, variant, edition, or revision of a piece or pieces of software. An operating system configuration, as used herein, may refer to a manner in which components are arranged to make up an operating system or a computer system. An application configuration, as used herein, may refer to a manner in which components are arranged to make up an application or a computer system. A profile configuration, as used herein, may refer to a manner in which components are arranged to make up a profile or a computer system. A log, as used herein, may refer to a detailed list of an application information, system performance, or user activities. Database content, as used herein, may refer to any collection of data, or information, that is specially organized for rapid search and retrieval by a computer. In some embodiments, scanning system 101 of FIG. 1 may reconstruct any workload, such as virtual machines 107A-107D, databases 109A-109D, storage 111A-111D, keystores 113A-113D of cloud infrastructure 106 from the block storage volumes to an indication of an installed application, a version of an installed application, an operating system configuration, an application configuration, a profile configuration, a log, or a database content.

Aspects of this disclosure may include assessing the reconstructed state of the workload to extract insights. Assessing the reconstructed state of the workload, as used herein, may refer viewing, utilizing, or evaluating the reconstructed state of the workload. Insights, as used herein, may refer to information or knowledge attained based on an analysis of some data. Extracting insights, as used herein, may refer to pulling information or data about, for example, a vulnerability associated with the workload or a composition of installed applications associated with the workload. By way of example, scanning system 101 of FIG. 1 may evaluate the reconstructed state of any of workloads, such as virtual machines 107A-107D, databases 109A-109D, storage 111A-111D, keystores 113A-113D of cloud infrastructure 106 to pull valuable data and information.

In some embodiments, insights may include at least one of a vulnerability associated with the workload or a composition of installed applications associated with the workload. A vulnerability, as used herein, may refer to any weakness within an organization's information systems, internal controls, or system processes that can be exploited. A composition of installed applications associated with the workload, as used herein, may refer to a structure or group of accessible computer programs. By way of example, scanning system 101 of FIG. 1 may evaluate the reconstructed state of any workloads such as virtual machines 107A-107D, databases 109A-109D, storage 111A-111D, keystores 113A-113D of cloud infrastructure 106 to pull valuable data and information regarding a vulnerability with the workload.

In some embodiments, a scanner may be deployed at the geographical location. Deploying a scanner, as used herein, may refer to installing, activating, utilizing, or bringing a scanner into effective action. By way of example, FIG. 1 illustrates one example of a scanner, scanning system 101 of FIG. 1 that is deployed.

In some embodiments, scanning system 101 of FIG. 1 may update the reconstructed state of the workload based on at least one change to the block storage volumes. Updating the reconstructed state of the workload, as used herein, may refer to overhauling or refurbishing the reconstructed state of the workload. A change to the block storage volumes, as used herein, may refer to any shift, alteration, or modification to the block storage volumes.

Figure 3:
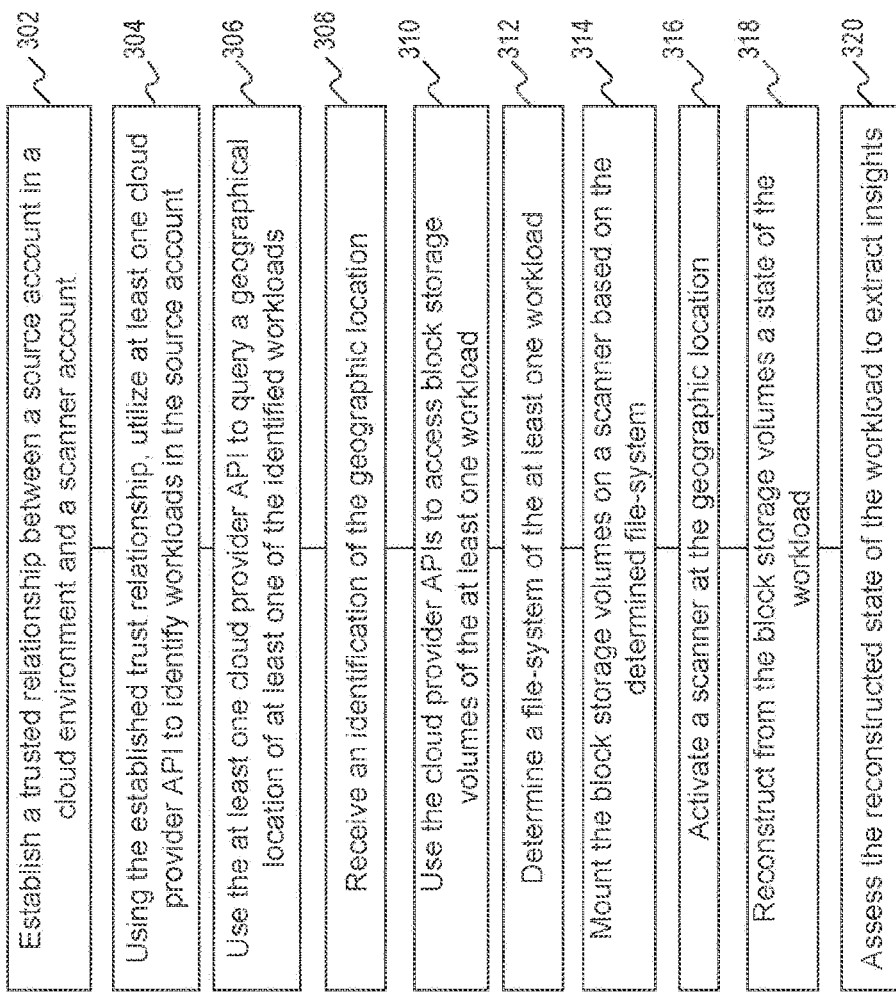
FIG. 3 is a block diagram of method for insight extraction, consistent with disclosed embodiments.

FIG. 3 illustrates a block diagram of method 300 for insight extraction, consistent with disclosed embodiments. In some embodiments, the method may include ten (or more or less) steps:

Block 302: Establish a trusted relationship between a source account in a cloud environment and a scanner account. In some embodiments, establishing a trusted relationship between a source account in a cloud environment and a scanner account may include an integration process (creating a connection between an account on scanning system 101 and an account on cloud infrastructure 106) discussed with reference to FIG. 2A. By way of one example, scanning system 101 of FIG. 1 may create a trusted relationship between a source account in a cloud environment and a scanner account.

Block 304: Using the established trust relationship, utilize at least one cloud provider API to identify workloads in the source account. In some embodiments, scanning system 101 of FIG. 1 may use an API to detect workloads such as virtual machines 107A-107D, databases 109A-109D, storage 111A-111D, keystores 113A-113D, and load balancer 115 in the source account.

Block 306: Use the at least one cloud provider API to query a geographical location of at least one of the identified workloads. In some embodiments, scanning system 101 of FIG. 1 may query any of workloads virtual machines 107A-107D, databases 109A-109D, storage 111A-111D, keystores 113A-113D of cloud infrastructure 106 for their geographical location using a cloud provider API.

Block 308: Receive an identification of the geographic location. In some embodiments, scanning system 101 may indicate in the map additional information regarding the workload (e.g., a system or device). For example, scanning system 101 may provide: an identification of a data center (e.g., a name or number associated with the data center where the workload is located), at least one of a data center name (e.g., a name or address associated with the data center where the workload is located), Internet Protocol (IP) address, name of the cloud provider, or a unique identity (e.g., any other information related to the workload that may be used).

Block 310: Use the cloud provider APIs to access block storage volumes of the at least one workload. In some embodiments, scanning system 101 of FIG. 1 may access the block storage volume of workloads such as virtual machines 107A-107D, databases 109A-109D, storage 111A-111D, keystores 113A-113D of cloud infrastructure 106. In some embodiments, accessing the block storage may include taking the mean of generating snapshots.

Block 312: Determine a file-system of the at least one workload. In some embodiments, scanning system 101 of FIG. 1 may identify the type of file-system any of workloads (virtual machines 107A-107D, databases 109A-109D, storage 111A-111D, keystores 113A-113D of cloud infrastructure 106).

Block 314: Mount the block storage volumes on a scanner based on the determined file-system. In some embodiments, to mount the block storage volumes on the scanner, may include instructing the operating system to map a directory structure logically to a physical storage device. A storage volume may be mounted after it is attached and formatted for use by a server's operating system, Mounting may include creating a snapshot of the block storage.

Block 316: Activate a scanner at the geographic location. In some embodiments, scanning system 101 of FIG. 1 may start up a scanner (a different scanner than scanning system 101) at the geographic location identified by scanning system 101.

Block 318: Reconstruct from the block storage volumes a state of the workload. In some embodiments, scanning system 101 of FIG. 1 may rebuild the block storage volumes to an earlier version of workloads such as virtual machines 107A-107D, databases 109A-109D, storage 111A-111D, keystores 113A-113D of cloud infrastructure 106.

Block 320: Assess the reconstructed state of the workload to extract insights. In some embodiments, scanning system 101 of FIG. 1 may evaluate the reconstructed state of workloads such as virtual machines 107A-107D, databases 109A-109D, storage 111A-111D, keystores 113A-113D of cloud infrastructure 106 to derive valuable data and information.

Vulnerability Management Techniques

Figure 4:
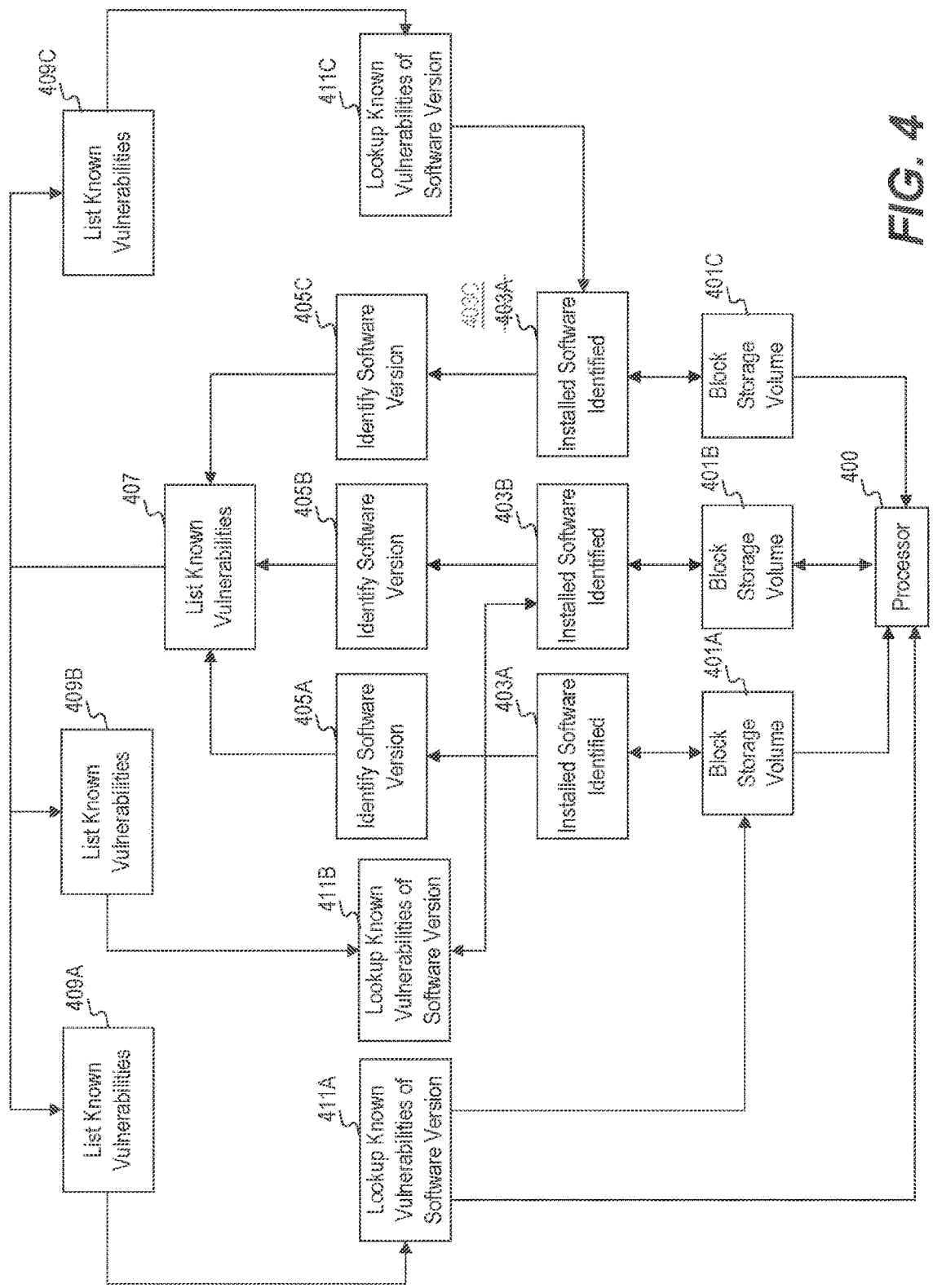
FIG. 4 depicts a cybersecurity system performing a side scanning function to protect against potential vulnerabilities, consistent with disclosed embodiments.

FIG. 4 depicts a cybersecurity system performing a side scanning function to protect against potential vulnerabilities. Referring to FIG. 4, a processor 400 configured to identify in a cloud environment one or more block storage volumes 401A-401C communicatively connected to a cloud provider API where the block storage volumes 401A-401C may be contained. When one or more block storage volumes, e.g., 401A-401C are identified, the processor 400 may be configured to perform the function of identifying the software installed 403A-403C in or relating to block storage volumes 401A-401C, respectively. Upon identifying installed software 403A-403C, the processor may be further configured to identify the version of software 405A-405C operating in the installed software 403A-403C, respectively. Based on the installed software 403A-403C and the respective version of the software 405A-405C, the processor may be configured to identify a listing of known vulnerabilities 407 that may relate to the installed software 403A-403C, and the version installed 405A-405C, respectively. When the listing of known vulnerabilities 407 is obtained, the system may list the known vulnerabilities 409A-409C for that software version 411A-411C, respectively, which can be communicated to the processor 400 of the end user. This information may be processed and displayed to an end user using processor 400.

FIG. 5 of the disclosed embodiments describes a method of operating a cybersecurity system performing a side scanning function to protect against potential vulnerabilities. Referring to FIG. 5, a processor unit 500 may be configured to perform the method. When initiated either manually or automatically, processor unit 500 may be communicatively connected with a cloud provider API 501 to initiate a cybersecurity function as disclosed above. Contained digitally on a memory device and accessed by a cloud provider API 501 is a series of block storage volumes 503. Processor unit 500 may be capable of performing a vertical and horizontal scan for network access or security information of a block storage volume 503 to detect potential vulnerabilities to the block storage volume 503 or any processing unit 500 designed to access said block storage volume 503.

Based on the accessed block storage volume 500, processor unit 500 with the disclosed embodiments of a cybersecurity system may perform an identification of the type of software installed 505 connected with block storage volume 503. Following identification of the type of software installed 505, the processing unit may then identify an installed version 507 of said installed software 505 for a version comprised of a unique identifier based on a combination of letters, numbers, or similar unique identifiers.

Upon recognition of an installed software version 507 of the installed software 505, processing unit 500 with the disclosed embodiments of the disclosed scanning system 101 may provide a list of known vulnerabilities 509 for review by said scanning system 101 and/or its end user and maintainer of said block storage volumes 503. Based on the list of known vulnerabilities 509, the disclosed scanning system 101 or its end user may identify one or more ports of accessibility to said block storage volume 503 that may be accessed by a known, associated vulnerability 513 from listed vulnerabilities 509 to determine an avenue for potential vulnerability 513 to access and infiltrate block storage volume 503.

In some embodiments, a cyber security scanning system for a cloud environment 101 may include a processor 500 to operate said system. This processor 500 may include central processing units and other similar computer-enabling equipment for processing and executing commands based on the information inputted to said system. The processor 500 may be communicatively connected to a computer network or series of networks to accomplish said cyber security function.

As an example embodiment, a processor unit 500 may be configured to use a cloud-provider API that may communicate with one or more specified computer-readable media across a digital network. This can be accomplished through internet protocols, internet control message protocols, transmission control protocol, or user datagram protocol. Cloud provider API 501 may be one of several forms of middleware, interface, middle layer, or other systems of interfacing applications. A processor 500 may be one or more computer processing units, central processing unit, server, microcomputer, mainframe, and any other manifestation of digital computing.

Further to one of several possible embodiments, a cloud-provider API 501 may be configured to access a block-storage volume 503 of a workload maintained in a cloud-storage environment. This may be accomplished through a system of computer-readable media communicatively connected. Said block-storage volume 503 may be contained on a Storage Area Network (SAN) or similar cloud-based memory storage environment. The block storage volume 503 may be contained in smaller storage volumes with an associated identifier unique to that portion of said block storage volume 503. In some embodiments, the block-storage volume 503 of a workload may have multiple paths for the storage volume to be reaggregated and retrieved quickly.

Among several embodiments, a scanning system 101 may comprise a system for identifying an installed software application in the accessed block-storage volume 503. This identification of installed software may be accomplished by accessing installed software 505 files through signature verification, root license, or authorized user lists. The installed software 505 may be located and identified within applications such as file storage, database storage, and virtual machine file system volumes. The identification of said installed software application 507 may be processed, analyzed, and communicated to the scanning system 101 for processing, cataloging, and protection through encryption and various methods of layered cyber defense.

Further, the scanning system 101 described herein may include functionality to analyze installed software applications to determine the associated software version. The software application version 507 may identify the software version based on unique version name, unique version number, and may be based on unique states of the currently installed computer software 505.

One of many embodiments disclosed above may include the scanning system 101 having the ability to access a data structure of known software vulnerabilities 509 for a plurality of versions of software applications. The known software vulnerabilities 509 may include, among others, missing data encryption, OS command injection, SQL injection, buffer overflow, missing authentication, missing authorization, unrestricted upload of dangerous file types, reliance on untrusted inputs in a security decision, cross-site scripting and forgery, download of codes without integrity checks, broken algorithms, URL redirection, path traversal, software bugs, weak passwords, and previously infected software. The scanning system 101 may be able to access and identify software vulnerabilities for mitigation, rectification, correction, and fortification.

In one embodiment, a cybersecurity system may also perform scanning according to scanning system 101 by performing a lookup of the identified installed software version 507 in the data structure to identify known vulnerabilities 509. This function can be performed by the scanning system 101 according to FIG. 1 performing a query of the installed software 505 for unique version number or designator and comparing to, amongst many things, a set of likely or potential vulnerabilities to that software version for potential deficiencies or cybersecurity threats known or suspected to similar software types and versions. This query may be performed according to a predetermined set of values, to include previously identified unique version numbers or designators that may contain the known list of previously identified vulnerabilities.

Among many embodiments, embodiments of the disclosed scanning system 101 may query the cloud provider API 501 to determine network accessibility information 511 related to the workload. In order to accomplish this query of the cloud provider API 301, the scanning system 101 may involve index of search results and display of said search results, followed by processing and grouping search results. Network accessibility information 511 may include connection quality, alternative paths between nodes in a network, and the ability to avoid blockage in said networks. The workloads associated with this query may include applications, services, capabilities, and specific processes such as virtual machines, databases, containers, or Hadoop nodes, among others.

If the system detects a vulnerable application 513, one embodiment may identify one or more port on which said vulnerable application is accessible. In one of several embodiments, the scanning system 101 may detect a vulnerable application in one or more computation process. In another embodiment, the cybersecurity system may perform a network accessibility query in a separate process. Further, a disclosed embodiment may perform these separate functions in subsequent and sequential steps of the same process. A person having skill would understand that an authorized user or an authorized scanning system 101 can perform these functions concurrently and subsequently by an authorized user or an authorized cybersecurity system while performing the same function as the disclosed embodiment.

Upon gathering network accessibility information and the identified port to identify one or more vulnerabilities susceptible to attack from outside the workload, a disclosed embodiment would have the functionality to perform processes to gather, display, and mitigate a discovered vulnerability in order to minimize the likelihood and effectiveness of a cyber threat outside of and attempting to access a workload through a known or previously encountered type of cyber threat. This functionality may include collecting and organizing the vulnerabilities according to type or category of vulnerability, displaying the gathered data for an end user or maintainer, and implementing security features automatically or manually by a user or maintainer such as security patches, password or passcode changes and suggestions for users to do the same, and malicious code eradication.

As one of several possible embodiments, the scanning system 101 may also, upon identification of one or more vulnerabilities, implement remedial actions via one or more processors. Remedial actions may include, among other things, notification to an end user of an identified threat, compensation through a revised security code to mitigate the potential threat, publication of the identified threat and vulnerability in a log or record of detected vulnerabilities, and communication of the sensed vulnerability and threat to a server operator or maintainer to fortify the protections of workloads existing on similar environments.

In a similar embodiment to above, the remedial measure may include transmission of an alert to a device associated with an administrator. The alert may be, amongst others, written, auditory, and visual for processing and use by an administrator of said scanning system 101. Said administrator may take action based on the received alert, to include eliminating the cyber threat through mitigation measures, change in cybersecurity posture, or removing the workload from the cybersecurity threat environment.

In another embodiment, a query of the cloud provider API 501 to determine network accessibility information related to the workload may be performed by at least one processor 500 configured to examine data sources associated with the workload. The data examined may include user data, system processing data, accessibility data, clock cycles, storage input/output, or similar data processors. A query of the cloud provider API 501 may be automated or manually-initiated. Based on the said query, the network accessibility information 511 related to the workload may change based on the data sources associated with said workload.

In the above processor and similar embodiments, further configuration may include a process to determine network accessibility information 511 based on the examined data sources. The examined data sources may include various cloud-based workloads, internet protocols, transmission communication protocols, or other methods and systems of memory and data storage.

As an exemplary embodiment, network accessibility information 511 includes at least one of: data from an external data source, cloud provider information, or at least one network capture log. These embodiments of an external data source may include data from the operating environment of the cloud-based environment, an external operating system for a computer processing unit 500, or other similar computer readable media. Cloud provider information may further include information that may identify the network accessibility information 511 vertically or horizontally to fully describe the associated workload. Network capture logs may be automated or manually updated to include possible vulnerabilities 513 and threats to the cloud-based storage medium.

Further, the disclosed embodiments may include an installed software application 505, with the at least one processor 500 configured to extract data from at least one of operating system packages, libraries, or program language libraries. This data may be extracted through a system query, random access algorithm, or similar automated process. Operating system packages may include systems operable on Microsoft, Apple, Linux, and similar operating systems. Libraries may consist of a series of files, folders, and databases of information stored on one of any indexed data repositories. A program language library may contain several of an exemplary program languages including but not limited to Javascript, Swift, Scala, Go, Python, Elm, Ruby, C #, C++ and other similar sources of software code.

As another exemplary embodiment, a scanning system 101 may also include a processor 500 configured to identify installed software application 505 based on the extracted data. The processor 500 may perform only this function or this function among many to accomplish the layered cybersecurity defense described herein this disclosed cloud-based security environment. The identification of installed software by said processor may include identifying the software by unique version number or designator, recognized source code, metadata associated with the installed software application files, or similar software-identifying information.

One embodiment may include an additional function wherein the installed software application 505 that has been identified includes one or more scripts. These scripts may be processed through various computer readable languages to include Javascript, C #, C++ and other forms of computer code.

One embodiment contemplated by the disclosed scanning system 101 may also include data structure includes aggregated vulnerability data 309. This aggregated vulnerability data 509 may be compiled by an end user or maintainer from within the cloud-based environment of the current data structure as well as compilation from similar data sets and aggregation of common threats to data structures likely to experience similar vulnerabilities. This aggregation of vulnerability data 509 may be contained within the data structure and it may be collectively aggregated to provide for a more robust and layered cybersecurity defense posture.

In an embodiment of the disclosed scanning system 101, the aggregated vulnerability data 509 may include data from one or more third-party vendors. These vendors may include operators of the cloud-based server environment, providers of networking and internet communication, methods of layered authentication, and other similar providers of services directly related and in communication with the cloud-based cybersecurity system.

As an additional exemplary embodiment, the aggregated vulnerability data 509 may include data collected by a scanner. This scanner may involve use of continuous or periodic monitoring of the workload. The scanner may perform security screenings of the various workloads vertically or horizontally to identify network identification information, port accessibility, and associated vulnerabilities. Any scan performed may be communicated to the scanning system 101 that may be responsible for performing and logging the results of the scan and may be able to initiate follow-on processes and protocols to protect the data contained in the workload that is the subject of scanning.

An embodiment of the disclosed scanning system 101 may also include aggregated vulnerability data 509 that may include at least one of an advisory, an exploit, a security announcement, or a known bug. An advisory may include notification to a system maintainer or user of the potential vulnerability, may log notice of the advisory, and may recommend possible user or maintainer actions to potentially address said advisory. An exploit may further consist of an automated system response designed to take advantage of the sensed vulnerability data. The exploit can be further reflected in the aggregated vulnerability data and protocols can be written into the cybersecurity infrastructure to prevent said exploit from gaining access and permissions to unauthorized areas of the workload storage environment.

A person having ordinary skill in the art would appreciate the above described embodiments are among many potential embodiments, to include a method of operating a scanning system 101 similar to the one described above. A disclosed embodiment contemplates this method to be accomplished through manual user operation, automated computer processes, or similar manners of operation. These manners of operation and those contemplated similar to them would allow the scanning system 101 described and disclosed to execute its operations as the system above describes.

One of several embodiments of the disclosed method of operating a scanning system 101 may include a cyber security scanning system for a cloud environment 101 may include a processor 500 to operate said system. This processor may include central processing units and other similar computer-enabling equipment for processing and executing commands based on the information inputted to said system. The processor may be communicatively connected to a computer network or series of networks to accomplish said cyber security function.

As an example embodiment, a processor unit 500 may be configured to use a cloud-provider API 501 that may communicate with one or more specified computer-readable media across a digital network. This can be accomplished through internet protocols, internet control message protocols, transmission control protocol, or user datagram protocol. Cloud provider API 501 may be one of several forms of middleware, interface, middle layer, or other systems of interfacing applications. A processor may be one or more computer processing units, central processing unit, server, microcomputer, mainframe, and any other manifestation of digital computing.

Further to one of several possible embodiments, a cloud-provider API 501 may be configured to access a block-storage volume 503 of a workload maintained in a cloud-storage environment. This may be accomplished through a system of computer-readable media communicatively connected. Said block-storage volume 503 may be contained on a Storage Area Network (SAN) or similar cloud-based memory storage environment. The block storage volume 503 may be contained in smaller storage volumes with an associated identifier unique to that portion of said block storage volume 503. In some embodiments, the block-storage volume 503 of a workload may have multiple paths for the storage volume to be reaggregated and retrieved quickly.

Among several embodiments, a method of operating a scanning system 101 may comprise a system for identifying an installed software application 505 in the accessed block-storage volume 503. This identification of installed software 505 may be accomplished by accessing installed software files through signature verification, root license, or authorized user lists. The installed software 505 may be located and identified within applications such as file storage, database storage, and virtual machine file system volumes. The identification of said installed software application 505 may be processed, analyzed, and communicated to the method of operating a scanning system 101 for processing, cataloging, and protection through encryption and various methods of layered cyber defense.

Further, a method of operating a scanning system 101 described herein may include functionality to analyze installed software applications 505 to determine the associated software version 507. The software application version 507 may identify the software version based on unique version name, unique version number, and may be based on unique states of the currently installed computer software.

One of many embodiments disclosed above may include the method of operating a scanning system 101 having the ability to access a data structure of known software vulnerabilities 509 for a plurality of versions of software applications 507. The known software vulnerabilities 509 may include, among others, missing data encryption, OS command injection, SQL injection, buffer overflow, missing authentication, missing authorization, unrestricted upload of dangerous file types, reliance on untrusted inputs in a security decision, cross-site scripting and forgery, download of codes without integrity checks, broken algorithms, URL redirection, path traversal, software bugs, weak passwords, and previously infected software. The cyber security system may be able to access and identify software vulnerabilities 309 for mitigation, rectification, correction, and fortification.

In one embodiment, a method of operating a scanning system 101 may also perform scanning according to scanning system 101 by performing a lookup of the identified installed software version 507 in the data structure to identify known vulnerabilities 309. This function can be performed by the scanning system 101 according to FIG. 1 performing a query of the installed software 505 for unique version number 507 or designator and comparing to, amongst many things, a set of likely or potential vulnerabilities to that software version for potential deficiencies or cybersecurity threats known or suspected to similar software types and versions. This query may be performed according to a predetermined set of values, to include previously identified unique version numbers or designators that may contain the known list of previously identified vulnerabilities.

Among many embodiments, embodiments of the disclosed method of operating a scanning system 101 may query the cloud provider API 501 to determine network accessibility information 511 related to the workload. In order to accomplish this query of the cloud provider API 501, the scanning system 101 may involve index of search results and display of said search results, followed by processing and grouping search results. Network accessibility information 511 may include connection quality, alternative paths between nodes in a network, and the ability to avoid blockage in said networks. The workloads associated with this query may include applications, services, capabilities, and specific processes such as virtual machines, databases, containers, or Hadoop nodes, among others.

If the system detects a vulnerable application, one embodiment may identify one or more port on which said vulnerable application is accessible. In one of several embodiments, the scanning system 101 may detect a vulnerable application in one or more computation process. In another embodiment, the scanning system 101 may perform a network accessibility query in a separate process. Further, a disclosed embodiment may perform these separate functions in subsequent and sequential steps of the same process. A person having skill would understand that an authorized user or an authorized cybersecurity system may perform these functions concurrently and subsequently while performing the same function as the disclosed embodiment.

Upon gathering network accessibility information 511 and the identified port 513 to identify one or more vulnerabilities susceptible to attack from outside the workload, a disclosed embodiment would have the functionality to perform processes to gather, display, and mitigate a discovered vulnerability in order to minimize the likelihood and effectiveness of a cyber threat outside of and attempting to access a workload through a known or previously encountered type of cyber threat. This functionality may include collecting and organizing the vulnerabilities according to type or category of vulnerability, displaying the gathered data for an end user or maintainer, and implementing security features automatically or manually by a user or maintainer such as security patches, password or passcode changes and suggestions for users to do the same, and malicious code eradication.

A person having ordinary skill in the art would similarly understand that the above disclosed system can be disclosed using a suitable non-transitory computer-readable medium performing each of the disclosed functions. The disclosed embodiment may include a non-transitory computer readable medium with a scanning system 101 similar to the one described above on a non-transitory computer-readable medium. A disclosed embodiment contemplates this system to be accomplished through a medium that may contain a central processing unit, virtual machine, or a similar non-transitory medium. These manners of operation and those contemplated similar to them would allow the scanning system 101 described and disclosed to execute its operations as the system above describes.

One of several embodiments of the disclosed non-transitory computer readable medium with a scanning system 101 may include a cyber security scanning system for a cloud environment 101 may include a processor 500 to operate said system. This processor 500 may include central processing units and other similar computer-enabling equipment for processing and executing commands based on the information inputted to said system. The processor 500 may be communicatively connected to a computer network or series of networks to accomplish said cyber security function.

As an example embodiment, a processor unit 300 may be configured to use a cloud-provider API 501 that may communicate with one or more specified computer-readable media across a digital network. This can be accomplished through internet protocols, internet control message protocols, transmission control protocol, or user datagram protocol. Cloud provider API 501 may be one of several forms of middleware, interface, middle layer, or other systems of interfacing applications. A processor 500 may be one or more computer processing units, central processing unit, server, microcomputer, mainframe, and any other manifestation of digital computing.

Further to one of several possible embodiments, a cloud-provider API 501 may be configured to access a block-storage volume 503 of a workload maintained in a cloud-storage environment. This may be accomplished through a system of computer-readable media communicatively connected. Said block-storage volume 503 may be contained on a Storage Area Network (SAN) or similar cloud-based memory storage environment. The block storage volume 503 may be contained in smaller storage volumes with an associated identifier unique to that portion of said block storage volume 503. In some embodiments, the block-storage volume 503 of a workload may have multiple paths for the storage volume to be reaggregated and retrieved quickly.

Among several embodiments, a non-transitory computer readable medium with a scanning system 101 may comprise a system for identifying an installed software application 505 in the accessed block-storage volume 503. This identification of installed software 505 may be accomplished by accessing installed software files through signature verification, root license, or authorized user lists. The installed software 505 may be located and identified within applications such as file storage, database storage, and virtual machine file system volumes. The identification of said installed software application 505 may be processed, analyzed, and communicated to the method of operating a scanning system 101 for processing, cataloging, and protection through encryption and various methods of layered cyber defense.

Further, a non-transitory computer readable medium with a scanning system 101 described herein may include functionality to analyze installed software applications 505 to determine the associated software version 507. The software application version 507 may identify the software version based on unique version name, unique version number, and may be based on unique states of the currently installed computer software.

One of many embodiments disclosed above may include the non-transitory computer readable medium with a scanning system 101 having the ability to access a data structure of known software vulnerabilities 509 for a plurality of versions of software applications 507. The known software vulnerabilities 509 may include, among others, missing data encryption, OS command injection, SQL injection, buffer overflow, missing authentication, missing authorization, unrestricted upload of dangerous file types, reliance on untrusted inputs in a security decision, cross-site scripting and forgery, download of codes without integrity checks, broken algorithms, URL redirection, path traversal, software bugs, weak passwords, and previously infected software. The scanning system 101 may be able to access and identify software vulnerabilities for mitigation, rectification, correction, and fortification.

In one embodiment, a non-transitory computer readable medium with a scanning system 101 may also perform scanning according to scanning system 101 by performing a lookup of the identified installed software version in the data structure to identify known vulnerabilities 509. This function can be performed by the scanning system 101 according to FIG. 1 performing a query of the installed software for unique version number 507 or designator and comparing to, amongst many things, a set of likely or potential vulnerabilities 509 to that software version 507 for potential deficiencies or cybersecurity threats known or suspected to similar software types and versions. This query may be performed according to a predetermined set of values, to include previously identified unique version numbers or designators that may contain the known list of previously identified vulnerabilities 509.

Among many embodiments, embodiments of the disclosed non-transitory computer readable medium with a scanning system 101 may query the cloud provider API 501 to determine network accessibility information 511 related to the workload. In order to accomplish this query of the cloud provider API 501, the scanning system 101 may involve index of search results and display of said search results, followed by processing and grouping search results. Network accessibility information 511 may include connection quality, alternative paths between nodes in a network, and the ability to avoid blockage in said networks. The workloads associated with this query may include applications, services, capabilities, and specific processes such as virtual machines, databases, containers, or Hadoop nodes, among others.

If the system detects a vulnerable application, one embodiment may identify one or more ports 515 on which said vulnerable application is accessible. In one of several embodiments, the scanning system 101 may detect a vulnerable application in one or more computation processes. In another embodiment, the scanning system 101 may perform a network accessibility query in a separate process. Further, a disclosed embodiment may perform these separate functions in subsequent and sequential steps of the same process. A person having skill would understand that an authorized user or an authorized cybersecurity system can perform these functions concurrently and subsequently while performing the same function as the disclosed embodiment.

Upon gathering network accessibility information 511 and the identified port 515 to identify one or more vulnerabilities susceptible to attack from outside the workload, a disclosed embodiment would have the functionality to perform processes to gather, display, and mitigate a discovered vulnerability in order to minimize the likelihood and effectiveness of a cyber threat outside of and attempting to access a workload through a known or previously encountered type of cyber threat. This functionality may include collecting and organizing the vulnerabilities according to type or category of vulnerability, displaying the gathered data for an end user or maintainer, and implementing security features automatically or manually by a user or maintainer such as security patches, password or passcode changes and suggestions for users to do the same, and malicious code eradication.

Another disclosed embodiment may include a method of using a cloud provider API 501, accessing block storage volume 503 of a workload maintained in a cloud storage environment. The method may include manual user operation, automated system operation, systematic and random operating parameters for the system to provide its cybersecurity and similar security functions. The accessed block storage volume may be contained as a collection of block units organized together, may be a series of individual blocks that can be reorganized to form a new storage volume, and may have the ability to be disaggregated and reaggregated as necessary to accomplish its storage and cybersecurity functions.

The disclosed method may further comprise a system that may analyze the identified installed software application 505 to determine an associated software version 507. In analyzing an installed software application 305, the disclosed embodiment may include a method of querying the installed software application to access a software version 507 that may include a series of letters, numbers, and other identifying characters to differentiate the version of software currently operative and its associated identifying characteristics and capabilities.

A method of the disclosed may also include accessing a data structure of known software vulnerabilities 509 for a plurality of versions of software applications 507. The disclosed method may determine a data structure of known software vulnerabilities 509 of one among many operative versions of software installed in the monitored storage system as compared to historical data of similar storage systems.

The disclosed method as described herein may further include performing a lookup of the identified installed software version 507 in the data structure to identify known vulnerabilities 509. The lookup of identified installed software 507 may be previously indexed based on unique version identifier, and the indexed information may include known vulnerability information 509, network accessibility information 511, network protocols, and administrator identifier information. Based on the said indexed known vulnerabilities 509, the scanning system 101 disclosed may take actions to mitigate a cybersecurity threat and reinforce cybersecurity defenses at the type of cybersecurity threat, as previously discussed.

Further to the above, a disclosed method may also include querying the cloud provider API 501 to determine network accessibility information 511 related to the workload. A query of the cloud provider API 501 to determine network accessibility information 511 related to the workload may be automatically or manually initiated. Network accessibility information 511 similar to the above embodiment may include connection quality, alternative paths between nodes in a network, and the ability to avoid blockage in said networks. The workloads associated with this query may include applications, services, capabilities, and specific processes such as virtual machines, databases, containers, and Hadoop nodes, among others.

A disclosed method of one embodiment also may provide a method of identifying at least one port 515 on which the vulnerable application is accessible. The identification of one port 515 on which the vulnerable application is accessible may be for the purpose of identifying a cyber weakness, and it may include the ability to change the port currently accessible to mitigate the said cyber weakness.

Yet another disclosed embodiment of a disclosed method may include using the network accessibility information 511 and the identified at least one port 515 to identify one or more vulnerabilities 513 susceptible to attack from outside the workload. The vulnerability 513 identified as susceptible to attack from outside the workload may include, among others, missing data encryption, OS command injection, SQL injection, buffer overflow, missing authentication, missing authorization, unrestricted upload of dangerous file types, reliance on untrusted inputs in a security decision, cross-site scripting and forgery, download of codes without integrity checks, broken algorithms, URL redirection, path traversal, software bugs, weak passwords, and previously infected software.

A method of the disclosed embodiment may further include implementing a remedial action in response to the identified one or more vulnerabilities 513. Said remedial action may include, among other things, notification to an end user of an identified threat, compensation through a cybersecurity patch, publish of the identified threat and vulnerability in a log or record of detected vulnerabilities, and communication of the sensed vulnerability and threat to a server operator and maintainer to fortify the protections of workloads existing on similar environments.

The disclosed method may also include wherein the remedial measure includes transmitting an alert to a device associated with an administrator. Said alert may be, amongst others, written, auditory, and visual for processing and use by an administrator of said cybersecurity system. Said alert may further be logged and catalogued for future identification of known threats and vulnerabilities to similar software application versions.

A disclosed method of the present embodiment may also provide querying the cloud provider API 501 to determine the network accessibility information 511 related to the workload and examining data sources associated with the workload. A query of the cloud provider API 501 to determine network accessibility information 511 related to the workload may be automatically or manually initiated. Network accessibility information 511 similar to the above embodiment may include connection quality, alternative paths between nodes in a network, and the ability to avoid blockage in said networks. The workloads associated with this query may include applications, services, capabilities, and specific processes such as virtual machines, databases, containers, and Hadoop nodes, among others.

The method of the above disclosed embodiment may further determine network accessibility information 511 by determining the network accessibility information 511 based on the examined data sources. The data examined may include user data, system processing data, accessibility data, clock cycles, storage input/output, and similar processes. A query of the cloud provider API 501 may be automated or manually-initiated. Based on the said query, the network accessibility information 511 related to the workload may change based on the data sources associated with said workload.

In the method of one disclosed embodiment, network accessibility information 511 may include at least one of data from an external data source, cloud provider information, or at least one network capture log. These embodiments may include data from the operating environment of the cloud-based environment, an external operating system for a computer processing unit, or other similar computer readable media. Network capture logs may be automated or manually updated to include possible vulnerabilities and threats to the cloud-based storage medium.

A method of the disclosed embodiment may also include identifying the installed software application 507 by extracting data from at least one of OS packages, libraries, or program language libraries. This data may be extracted through a system query, random access algorithm, or similar automated process. Operating system packages may include systems operable on Microsoft, Apple, Linux, and similar operating systems. Libraries may consist of a series of files, folders, and databases of information stored on one of any indexed data repositories. A program language library may contain several of an exemplary program languages including but not limited to Javascript, Swift, Scala, Go, Python, Elm, Ruby, C #, C++ and other similar sources of software code.

Another method of the disclosed embodiment may identify the installed software application 507 based on the extracted data. The method of the processor 500 may perform only this function or this function among many to accomplish the layered cybersecurity defense described herein this disclosed cloud-based security environment.

A further disclosed method of the present embodiment may include at least one processor 500 further configured to identify a version 507 of the installed software application 505. The method of the processor may perform only this function or this function among many to accomplish the layered cybersecurity defense described herein this disclosed cloud-based security environment.

Prioritization Techniques

FIG. 6 is a block diagram of method 600 for risk prioritization, consistent with disclosed embodiments.

Aspects of this disclosure may include a cloud-based cybersecurity system for assessing internet exposure of a cloud-based workload with embodiments configured to access at least one cloud provider API to determine a plurality of entities capable of routing and/or filtering traffic in a virtual cloud environment associated with a target account containing the workload. Routing traffic, as used herein, may refer to the process of selecting a path for traffic (e.g., cells, blocks, frames, packets, calls, messages, or other units of data) in a network or between or across multiple networks. The cloud-based cybersecurity system, in some embodiments, may comprise at least one processor configured to assess internet exposure as described herein.

A cloud provider API, as used herein, may refer to any application program interface that allows the end user to interact with a cloud providers service. Workloads, as used herein, may refer to devices in a network. By way of example, workloads may include systems, devices, resources in a cloud infrastructure. By way of example, FIG. 1 illustrates examples of a workload, such as virtual machines 107A-107D, databases 109A-109D, storage 111A-111D, keystores 113A-113D, or load balancer 115. In some embodiments, scanning system 101 of FIG. 1 may perform a scanning operation on any workload (e.g., systems, devices, resources, etc.) in cloud infrastructure 106.

In some embodiments, scanning system 101 of FIG. 1 may use an API to detect workloads such as virtual machines 107A-107D, databases 109A-109D, storage 111A-111D, keystores 113A-113D, and load balancer 115 in the source account. In some embodiments, workloads may exist as virtual machines, while in other embodiments, workloads may exist as discrete, physical devices. For example, in some embodiments, a layer 3 routing system could be implemented as a physical device (e.g., a router or switch) or a virtual device (e.g., a routing system instantiated as a virtual device on a computer).

Scanning system 101 may query devices and systems capable of routing and filtering traffic (e.g., load balancer 115, routers, switches, firewalls, security groups, API Gateways and proxies) using an API provided through a cloud service provider's system to determine network configurations, and may evaluate them against known problematic configurations or other configurations. These devices can be cloud native and/or unmanaged (e.g. NGINX proxy)

A cloud environment, as used herein, may refer to a platform implemented on, hosted on, and/or accessing servers that are accessed over the Internet. A scanner account, as used herein, may refer to any type of account associated with a scanner. A scanner, as used herein, may refer to a device for examining, reading, or monitoring something. By way of example, FIG. 1 illustrates one example of a scanner, scanning system 101 of FIG. 1. A target account containing the workload, as used herein, may refer to a location on a network server selected as an aim of connection, for example. In some embodiments, scanning system 101 of FIG. 1 may determine entities capable of routing traffic.

In some embodiments, the plurality of entities includes a virtual network appliance. A virtual network appliance, as used herein, may refer to a machine focused on virtualizing network functionality. In some embodiments, a typical network virtual appliance may include functionality directed to various layer four to seven. That is, such appliances may implement functionality associated with OSI model layers 4-7 (Transport, Session, Presentation, and Application). Such functionality may include, for example, a firewall, WAN optimizer, application delivery controllers, routers, load balancers, IDS/IPS, proxies, or SD-WAN edge device. In some embodiments, scanning system 101 of FIG. 1 may determine a virtual network appliance capable of routing traffic.

In some embodiments, the virtual network appliance is at least one of a load balancer, a firewall, a proxy, or a router. A load balancer, as used herein, may refer to any device that acts as a reverse proxy and distributes network or application traffic across a number of servers. In some embodiments, load balancer 115 may comprise one or more systems that balance incoming requests between the different systems and devices of cloud infrastructure 106. For example, load balancer 115 may be configured to determine usage (e.g., processor load, used storage capacity) of systems or devices in cloud infrastructure 106 to assist in determining where to route an incoming request from network 105 to store data, perform processing, or retrieve data.

Load balancer 115 may be configured to receive an incoming request from user device 102. Upon receipt of the request, load balancer 115 may consult a data store (part of or separate from load balancer 115; not pictured) to determine usage or forecasted usage of various systems or devices in cloud infrastructure 106, and may forward the request to the systems or devices having the lowest usage or forecasted usage. A firewall, as used herein, may refer to a device or system that monitors incoming and outgoing network traffic and permits or blocks data packets based on a set of security rules. A proxy, as used herein, may refer to a device or system that translates traffic between networks or protocols. In some embodiments, a proxy may be implemented as an intermediary a device or system separating end-user devices from destinations devices (e.g., web servers) by routing traffic through them. Proxies (or proxy servers) may be configured to provide varying levels of functionality, security, and privacy depending on use case, needs, or company policy. A router, as used herein, may refer to a device or system that connects a local network to the internet.

Aspects of this disclosure may include embodiments in which a cloud-based cybersecurity system is configured to query the at least one cloud provider API to determine at least one networking configuration of the entities. Querying, as used herein, may refer to a request for data or information from a resource. A cloud provider API, as used herein, may refer to any application program interface that allows an end user to interact with a cloud providers service. A cloud provider may include any entity through whom information is accessible over the Internet or other shared network. At least one networking configuration of the entities, as used herein, may refer to a manner in which components are arranged to make up an operating system, networking system, or a computer system. In some embodiments, scanning system 101 of FIG. 1 may send a request to determine at least one networking configuration of the entities.

In some embodiments, the networking configuration is at least one of a routing configuration, a proxy configuration, a load balancing configuration, a firewall configuration, or a VPN configuration.

A routing configuration, as used herein, may refer to a manner in which components are arranged to make up a routing system. For example, a routing configuration may provide for dynamic or static "routes" between devices on a network or on networks.

A proxy configuration, as used herein, may refer to a manner in which components are arranged to make up a proxy system. For example, a proxy configuration may provide for a configuration of how a client can route traffic through a central point (e.g., a proxy server), in order to relay multiple clients' requests from a single point on a network.

A load balancing configuration, as used herein, may refer to a manner in which components are arranged to make up a load balancing system. For example, a loan balancing configuration may define how resources such as uplinks or distributed applications may be utilized by devices on the same (or another) network, in order to balance usage of multiple redundant uplinks or distributed application nodes.

A firewall configuration, as used herein, may refer to a manner in which components are arranged to make up a firewall system. For example, a firewall configuration may comprise rules that determine what traffic may be forwarded, which devices are permitted to communicate with one another, or what protocols may be used for communication between devices.

A VPN (virtual private network) configuration, as used herein, may refer to a manner in which components are arranged to make up a VPN system. A VPN may refer to a type of network that extends a private network across a public network and enables users to send and receive data across shared or public networks as if their computing devices were directly connected to the private network. For example, a VPN configuration may provide rules or other information by which data is sent or received over a single, encrypted route, such that intermediate points cannot determine the content, source, or destination of the data.

In some embodiments, scanning system 101 of FIG. 1 may send a request to determine at least a routing configuration, a proxy configuration, a load balancing configuration, a firewall configuration, or a VPN configuration of the entities.

Aspects of this disclosure may include embodiments in which a cloud-based cybersecurity system is configured to build a graph connecting the plurality of entities based on the networking configuration. A graph connecting the plurality of entities, as used herein, may refer to a diagram showing the relation between variable quantities (e.g., entities). In some embodiments, the graph may include any data structures that includes the connections from one entity to another. In some embodiments, scanning system 101 of FIG. 1 may construct a graph or diagram linking the plurality of entities based on the networking configuration. In some embodiments, graph includes a data structure sequentially connecting entities. A data structure sequentially connecting entities, as used herein, may refer to an organization, management, and/or storage format that enables efficient access and modification of data such as entities.

In some embodiments, a graph may include directional vectors indicating directions of dataflow. Directional vectors, as used herein, may refer to a quantity having direction as well as magnitude (indicating, for example, what kinds of traffic are allowed to flow, what ports are open, what protocols are allowed), especially as determining the position of one point in space relative to another. Directions of dataflow, as used herein, may refer to the movement of data through a system comprised of software, hardware or a combination of both along a particular course. In some embodiments, scanning system 101 of FIG. 1 may construct a graph including a data structure connecting entities sequentially or a graph including directional vectors showing the direction of data flow.

In some embodiments, to build the graph, the at least one processor may be configured to identify individual entities as nodes and connect the nodes. Nodes, as used herein, may refer to a device in a network (e.g., devices in cloud infrastructure 100). Connecting nodes, as used herein, may refer to linking or bonding devices or data points in a larger network. In some embodiments, the graph includes port numbers associated with the workload. Port numbers, as used herein, may refer to a way to identify a specific process to which an internet or other network message is to be forwarded when it arrives at a server and/or which services are running on a server. In some embodiments, the graph includes a path from the at least one source to the workload. A path from the at least one source to the workload, as used herein, may refer to a string of characters used to uniquely identify a location in a directory structure.

Aspects of this disclosure may include embodiments in which a cloud-based cybersecurity system is configured to access a data structure identifying services publicly accessible via the Internet and capable of serving as an internet proxy. Services capable of serving as an internet proxy, as used herein, may refer to a system or router that provides a gateway between users and the internet (e.g., network 105). In some embodiments, scanning system 101 of FIG. 1 may access a configuration detecting services over the internet and capable of serving as an internet proxy.

Aspects of this disclosure may include embodiments configured to integrate the identified services into the graph. Integrating identified services into a graph, as used herein, may refer to the act of bringing together smaller components (the identified services) into a single system that functions as one (the graph). For example, scanning system 101 may integrate information on services available in each node into the data structure, associated with each node in the data structure.

Aspects of this disclosure may include embodiments in which a cloud-based cybersecurity system is configured to traverse the graph to identify at least one source originating via the Internet and reaching the workload. Traversing the graph, as used herein, may refer to a device, such as scanning system 101, accessing the systems represented by the nodes in the graph, to determine which systems are accessible and how. For example, scanning system 101 may analyze the graph to detect sources coming from the internet and reaching the workload, by accessing a first system, and traversing between systems in a depth-first, breadth-first, or other manner, until a path to an external network (e.g., the Internet) is reached.

In some embodiments, the at least one source may be a potential malicious source. In some embodiments, the source may include a code in any part of a software system or script that is intended to cause undesired effects, security breaches or damage to a system. (In some embodiments, the Internet at large may be considered to be a potentially malicious source.)

Aspects of this disclosure may include embodiments configured to output a risk notification associated with the workload. Outputting a risk notification, as used herein, may refer to sending out data such as a message indicating a possibility of danger. In some embodiments, scanning system 101 of FIG. 1 may produce a notification indicating a risk that is related with the workload. Examples of such risk notifications may include, for example, an electronic mail message, a visual alert, an audio alert, an audio-visual alert, In some embodiments, the risk notification includes one or more resolution recommendations. Resolution recommendations, as used herein, may refer to a suggestion or proposal as to the best course of action in view of the identified risk.

FIG. 6 illustrates a block diagram of method 600 performed by a processor (e.g., a processor associated with scanning system 101), consistent with disclosed embodiments. In some embodiments, the processor may operate on instructions stored in a non-transitory computer readable medium. In some embodiments, the method may include seven (or more or less) steps:

Block 602: Access at least one cloud provider API to determine a plurality of entities capable of routing traffic in a virtual cloud environment associated with a target account containing the workload. In some embodiments, scanning system 101 of FIG. 1 may determine entities capable of routing traffic, consistent with the above-disclosed embodiments.

Block 604: Query the at least one cloud provider API to determine at least one networking configuration of the entities. In some embodiments, scanning system 101 of FIG. 1 may send a request to determine at least one networking configuration of the entities, consistent with the above-disclosed embodiments.

Block 606: Build a graph connecting the plurality of entities based on the networking configuration. In some embodiments, scanning system 101 of FIG. 1 may construct a graph or diagram linking the plurality of entities based on the networking configuration, consistent with the above-disclosed embodiments.

Block 608: Access a data structure identifying services publicly accessible via the Internet and capable of serving as an internet proxy. In some embodiments, scanning system 101 of FIG. 1 may access a configuration detecting services over the Internet and capable of serving as an Internet proxy, consistent with the above-disclosed embodiments.

Block 610: Integrate the identified services into the graph. In some embodiments, scanning system 101 of FIG. 1 may incorporate the services into the graph, consistent with the above-disclosed embodiments.

Block 612: Traverse the graph to identify at least one source originating via the Internet and reaching the workload. In some embodiments, scanning system 101 of FIG. 1 may analyze the graph to detect sources coming from the internet and reaching the workload, consistent with the above-disclosed embodiments.

Block 614: Output a risk notification associated with the workload. In some embodiments, scanning system 101 of FIG. 1 may produce a notification indicating a risk that is related with the workload, consistent with the above-disclosed embodiments.

Techniques for Malware Detection Using Secondary System

Aspects of this disclosure may provide a technical solution to the challenging technical problem of malware detection on a primary system using a secondary system other than the primary system. In existing technologies, malware detection system may be run on a primary system that itself may be susceptible to malware. The malware may detect existence of the malware detection system and deceive it to avoid being detected. To resolve such a technical problem, a secondary system may be provided to host the malware detection system, which may isolate the malware detection system from potential exposure or influence from the malware that may reside on the primary system. The disclosed technical solutions may increase success rate of malware detection and thus enhance security level of the primary system.

A cyber security system, as used herein, may refer to a system including any combination of software and hardware for enhancing security of a device, a platform, or another system in a network environment. By way of example, the cyber security may be implemented as a system including scanning system 101 in FIG. 1. As another example, scanning system 101 may include the disclosed cyber security system as a subset. A cloud environment, as used herein, may refer to a computing environment running on a cloud. By way of example, the cloud environment may include or be part of cloud infrastructure 106 in FIG. 1.

Consistent with disclosed embodiments, at least one processor may be configured to utilize a cloud provider API to access a block storage volume of a workload maintained on a target account in a target system of a cloud storage environment. Utilizing, as used herein, may refer to an operation of using, deploying, enacting, enabling, activating, allocating, invoking, calling, or any operation of putting a thing into use in a computer environment. An API refers to an application programming interface herein. A cloud provider in this disclosure may refer to a cloud service provider (e.g., a service provider of cloud computing, cloud storage, or any services provided to users on demand over a network). A cloud provider API, as used herein, may refer to an API provided, prepared, enabled, activated, programmed, or written by a cloud provider. A block storage volume in this disclosure may refer to a storage volume in a block storage scheme. In some embodiments, a block storage volume may be connected, disconnected, or reconnected to a system (e.g., a physical computer, a virtual machine, a network interface, a cloud, or any combination of hardware or software modules) without interfering (e.g., shutting down, halting, rebooting, or any manner of interrupting) the operation status of the system or other running tasks on the system. For example, a block storage volume may be implemented as a virtual disk. In some embodiments, a block storage volume can be associated with an account of a user of the system, the system that it is connected to, or both.

Block storage, as used herein, may refer to a data storage scheme or model in which data is saved to storage media in fixed-sized raw data chunks (referred to as "blocks"). The raw data blocks may contain no metadata. Each block may be associated with a unique address as metadata assigned to the block. Storage blocks may be controlled by an operating system (OS) and may be accessed by a protocol (e.g., iSCSI, Fibre Channel, or Fibre Channel over Ethernet).

A storage volume, as used herein, may refer to an identifiable unit (e.g., a physical unit or a logical, virtual unit) of data storage. The storage volume may be mounted to a device via an operation system and be configured with a specific file system (e.g., New Technology File System) assigned a system-unique name or number that identifies the storage volume. The storage volume may represent a named, logical area of storage that enables users and applications to access data on the underlying device. By way of example, a storage volume may be a logical disk that represents a named, logical area of a physical storage device (e.g., a hard disk drive, solid-state drive, compact disc read-only memory, digital video disk, floppy disk, or any other type of storage device). In some embodiments, a logical storage volume may span multiple physical storage devices (e.g., hard disks) and appear as a single, contiguous storage area that works like a physical volume. Storage volumes may be flexibly configured, such as being expanded, contracted, mirrored, stripped, or adapted to support multiple disks (e.g., redundant array of independent disks).

A workload, as used herein, may refer to a specific application, service, capability, or a specific amount of work that can be run on a cloud resource, system, or infrastructure. By way of example, a workload may be a virtual machine, a database, a container, a Hadoop node, an application, a storage object, a load balancer, or an IAM (Identity and Access Management) configuration. A cloud storage environment in this disclosure may refer to a computing environment of a cloud computing model (referred to as "cloud storage") that stores data on the Internet through a cloud computing provider that manages and operates data storage as a service. A cloud storage environment may be managed and controlled by an operating system. The operation system may be susceptible to malware and security vulnerabilities, and may become a primary system (or referred to as a "target system" herein) that needs malware detection. By way of example, the cloud storage environment may include or be part of cloud infrastructure 106 in FIG. 1.

A target system of a cloud storage environment in this disclosure may refer to an operating system or a computing system with an installed operating system, which manages and controls the cloud storage environment or a subsystem of the target system. The target system may maintain one or more accounts for users of the cloud storage environment. A target account of the target system in this disclosure may refer to an account of a user of a cloud infrastructure (e.g., a cloud environment or a cloud storage environment).

By way of example, to utilize the cloud provider API to access the block storage volume (e.g., existing in storage 111A-111D in FIG. 1) of the workload, the at least one processor (e.g., a processor in scanning system 101 of FIG. 1) may communicate with the cloud storage environment (e.g., cloud infrastructure 106 in FIG. 1) via sending and receiving data (e.g., data packets) over a network (e.g., network 105 in FIG. 1), and enable one or more APIs provided by the cloud provider for accessing the block storage volume. For example, the communication and API enabling may be performed through the process of integration as described in step 201 of FIG. 2. In some embodiments, the at least one processor may create a connection (e.g., by logging in) between a first account on scanning system 101 and a second account on cloud infrastructure 106, then cause the second account to authorize access privileges to the first account via the cloud provider API for accessing storage 111A-111D in cloud infrastructure 106.

Consistent with disclosed embodiments, the at least one processor may be configured to utilize a scanner at a location of the block storage volume and on a secondary system other than the target system. A scanner, as used herein, may refer to an application, a program, a service, a process, a thread, a function, or any executable codes for performing a scanning process on a computer system to obtain information (e.g., related to structures, vulnerabilities, security issues, or any information of the computer system).

A location of the block storage volume in this disclosure may refer to a system (e.g., a physical computer, a virtual machine, a network interface, a cloud, a data center, or any combination of hardware or software modules) or an identifier associated with the system that the block storage volume is connected to. In some embodiments, the location of the block storage volume may include at least one of the target account, a secondary system account, a cloud provider account, or a third party account. By way of example, the secondary system account may be an account connected with the target account (e.g., connected by an integration process similar to step 201 in FIG. 2A). The cloud provider account may be an account connected to at least one of the target account or the secondary system account. The third party account may be an account held by a third party and connected to at least one of the target account, the secondary system account, or the cloud provider account.

In some embodiments, the at least one processor may determine the location of the block storage volume based on at least one of the target account, a secondary system account, a cloud provider account, or a third party account. By way of example, to determine the location of the block storage volume, the at least one processor may consult a lookup table, a list, or a database that stores a relationship record between an account (e.g., a target account, a secondary system account, a cloud provider account, or a third party account) and a system (e.g., a physical computer, a virtual machine, a network interface, a cloud, or any combination of hardware or software modules) that the block storage volume is connected to. Based on the relationship record, the at least one processor may identify the system as the location using the account as a key.

A secondary system, as used herein, may refer to a computer system running at an environment or conditions not affected by another system (referred to as a "primary system" or "target system" herein). In some embodiments, the secondary system may have an operating system different from an operating system of the target account. By way of example, the target account may have a WINDOWS® operating system, and the secondary system may have a LINUX® operating system.

In some embodiments, the secondary system includes at least one of a virtual machine (e.g., any of virtual machines 107A-107D in FIG. 1), a container, or a serverless function. A container, as used herein, may refer to an OS-level virtualization instance assigned with resources by a non-virtual computer operating system (OS). A non-virtual computer operating system (OS) may create multiple isolated user space instances that may function like real computers from the point of view of programs running in them. A computer program running on a non-virtual operating system can access all available resources (e.g., connected devices, files, folders, network shares, CPU power, or any other software or hardware capabilities) of the computer. In contrast, a computer program running inside of a container can only access the resources assigned to the container.

A serverless function, as used herein, may refer to a computer function hosted in a cloud environment that may allocate resources on demand to perform a function (e.g., scanning) for a user of the cloud environment. The user of the serverless function may be free from concerns of capacity planning, configuration, management, maintenance, fault tolerance, or scaling of containers, virtual machines, or physical servers. When a serverless function is not running, no computing resources may be allocated to it (e.g., using no provisioned server, thus named "serverless"). By way of example, a serverless function may be implemented as any combination of Lambda functions, event sources, and other computing resources. A serverless function may be invoked by the user of a cloud infrastructure (e.g., a cloud environment or a cloud environment).

By way of example, to utilize the scanner at the location of the block storage volume (e.g., existing in storage 111A-111D in FIG. 1), the at least one processor (e.g., a processor in scanning system 101 of FIG. 1) may communicate with the secondary system (e.g., one or more of virtual machines 107A-107D in FIG. 1) other than the target system (e.g., the main system operating and managing storage 111A-111D) and activate the secondary system for scanning. For example, to activate the secondary system, the at least one processor may transmit a scanner (e.g., in the form of a computer program or executable codes) to the secondary system, and the secondary system may allocate computing resources (e.g., CPU powers, memory space, network ports, or any other software or hardware resources) in preparation of running the scanner. The scanner may be programmed to be stored at the location of the block storage volume or to start the scanning at the location of the block storage volume. For example, the block storage volume may be connected to a particular system in cloud infrastructure 106 in FIG. 1, and the scanner may be stored at that system (e.g., on storage connected to the system). When the scanner begins scanning, the scanner may start the scanning at that system before scanning other systems.

In some embodiments, to utilize the scanner, the at least one processor may suspend an operation of the scanner after the scan of the block storage volume. Suspending, as used herein, may refer to an operation of pausing, stopping, ceasing, freezing, halting, hanging, terminating, killing, or any manner or temporarily or permanently setting aside an ongoing process or computer program. By way of example, after the scanner completes scanning the block storage volume, the at least one processor may detect the completion by an active manner (e.g., by periodically polling the secondary system for a status of the scanning) or a passive manner (e.g., by receiving a message from the secondary system indicating the completion of the scanning). The at least one process may then send data to the secondary system, the data including a signal or computer-executable codes for suspending the operation of the scanner. After receiving the data, the secondary system may suspend the scanner and release the computing resources previously allocated to the scanner.

In some embodiments, to utilize the scanner, the at least one processor may modify a pre-utilized scanner at the location of the block storage volume based on information related to the target account to obtain a modified scanner, and then utilize the modified scanner. A pre-utilized scanner in this disclosure may refer to a scanner that has been previously utilized (e.g., on the same secondary system) and not destroyed. In some embodiments, the information related to the target account may include data or parameters indicating a status or a change of the target account, such as, for example, newly created files, deleted files, changed files, or any data indicating a state of the target account. For example, the pre-utilized scanner at the block storage volume may use a configuration file. The configuration file may include data or parameters indicating a previous status (e.g., list of existing files, public network ports, Internet-accessible data channels, or any operation state parameters) of the target account. The information related to the target account may include data indicating a current status of the target system. The current status of the target system may be different from the previous status of the target system (e.g., including changed files, changed public network ports, changed Internet-accessible data channels, or any changed operation state parameters). The at least one processor may modify the pre-utilized scanner by modifying the configuration file to reflect the current status of the target system. Then, the at least one processor may utilize the modified scanner.

Consistent with disclosed embodiments, the at least one processor may be configured to scan the block storage volume for malicious code, using the secondary system. Scanning, as used herein, may refer to an operation of traversing, checking, inspecting, reading, examining, searching, or any manner of looking up. Malicious code, as used herein, may refer to an application, a computer program, a service, a process, a thread, a function, a script, or any type of executable codes that may be executed on a computer without authorization and with a malicious or harmful intent (e.g., manipulating the computer into dangerous behaviors, writing changes or add-ons to existing computer programs or files, stealing computer files, copying sensitive information without authorization, damaging the computer itself, disabling one or more functions of the computer, or attacking another computer using the computer as a disguise). For example, malicious code may include attack scripts, computer viruses, computer worms, Trojan horses, backdoors, or any other malicious executable content. In some embodiments, the malicious code may include a rootkit. A rootkit in this disclosure may refer to any type of computer software designed to enable access to a computer or an area of its software without authorization.

By way of example, to scan the block storage volume (e.g., existing in storage 111A-111D in FIG. 1) for malicious code, the secondary system (e.g., one or more of virtual machines 107A-107D in FIG. 1) may run the utilized scanner with allocated computing resources to look up databases (e.g., a blacklist) of known malicious files, look up databases storing patterns of malicious files and identify the patterns, look up databases of cryptographic hashes that identify malicious files, run potential malicious code in a sandbox (e.g., a confined and isolated environment for running programs without causing changes outside the confined and isolated environment), determine whether there are scanned files that are not in a database (e.g., a whitelist) of known good files, detect changes over time in the scanned environment, or any combination thereof.

In some embodiments, scanning the block storage volume may include scanning disk-backed memory. A disk-backed memory in this disclosure may refer to a storage space implemented on a disk (e.g., a hard disk) and functioning like a volatile memory from the perspective of a running program. By way of example, scanning the block storage volume may include scanning files stored in the disk-backed memory. In some embodiments, the disk-backed memory may include at least one of a page file or a cache file. A page file, as used herein, may refer to a file containing one or more pages (also referred to as "memory pages" or "virtual pages"), each of the one or more pages being a fixed-length contiguous block of virtual memory and described by a single entry in a page table. A page file may be stored on a disk (e.g., a hard disk) for memory management of a virtual memory used by an operating system. A cache file, as used herein, may refer to a file storing data so that future requests for the stored data can be served faster. The data stored in a cache file may be the result of a computation or a copy of the data stored elsewhere.

Consistent with disclosed embodiments, the at least one processor may be configured to identify malicious code based on the scan. By way of example, if the secondary system scans the block storage volume by consulting databases of known malicious files and finds a scanned file matches a record in the databases, the at least one processor may identify the matched scanned file as the malicious code. In another example, if the secondary system scans the block storage volume by consulting databases storing patterns of malicious files and identifies a pattern of a scanned file matches one or more of the stored patterns, the at least one processor may identify the scanned file as the malicious code. In yet another example, if the secondary system scan the block storage volume by consulting databases of cryptographic hashes that identify malicious files and finds that a cryptographic hash of a scanned file matches one or more of the cryptographic hashes that identify malicious files, the at least one processor may identify the scanned file as the malicious code.

In yet another example, if the secondary system scans the block storage volume by running potential malicious code in a sandbox and finds that running a scanned file causes malicious or harmful changes or behavior (e.g., an attempt to modify a system setting, an attempt to access files outside of a set of directories, an attempt to perform a network mapping process), the at least one processor may identify the scanned file as the malicious code. In yet another example, if the secondary system scans the block storage volume to determine whether there are scanned files that are not in a database of known good files and finds that a scanned file is not in the database of known good files, the at least one processor may identify the scanned file as the malicious code. As yet another example, if the secondary system scans the block storage volume to detect changes over time in the scanned environment and finding that a scanned file causes a malicious or harmful change in the scanned environment over time, the at least one processor may identify the scanned file as the malicious code. It should be noted that the identification of the malicious code based on the scan may be implemented in various manners and is not limited to the examples described herein.

Consistent with disclosed embodiments, the at least one processor may be configured to output from the secondary system, a notification of a presence of malicious code in the target system. In some embodiments, the notification may be a pop-up window, a pop-pup dialog, a flashing symbol, an email, a text message, a mobile application notice, a phone call, a warning sound, a tactile feedback (e.g., a vibration), or any type of communications. By way of example, the secondary system may trigger a communication channel between the secondary system and the target system and feed one or more parameters to the communication channel, in which the one or more parameters represent the presence of the malicious code. The secondary system may then send data representing the notification via the triggered communication channel including the one or more parameters to the target system. After receiving the data, the target system may parse the data and identify the one or more parameters. The target system may then display the notification (e.g., as a pop-up window on a screen) that present the presence of the malicious code.

Consistent with disclosed embodiments, the at least one processor may be further configured to identify a source of the malicious code. The notification of the presence of malicious code outputted from the secondary system in the target system may include information related to the identified source of the malicious code. In some embodiments, the source of the malicious code may include identity of a developer or distributor of the malicious code, the landing location (e.g., a network port or a vulnerable access point) where the malicious code is imported to the target system, source codes of the malicious code, or any information or data indicating the origination of the malicious code. The information related to the identified source of the malicious code may include a text, a picture, a symbol, a video, a link, a voice, or any type of data for presenting and describing the identified source of the malicious code.

By way of example, FIG. 7 is a block diagram illustrating an exemplary process 300 of cyber security scanning for a cloud environment, consistent with the disclosed embodiments. While the block diagram may be described below in connection with certain implementation embodiments presented in other figures, those implementations are provided for illustrative purposes only, and are not intended to serve as a limitation on the block diagram. For example, the steps in FIG. 7 may be executed in any order, steps may be duplicated, or steps may be omitted. In some embodiments, the process 300 may be performed by at least one processor (e.g., a CPU) of a computing device or system (e.g., scanning system 101 in FIG. 1) to perform operations or functions described herein, and may be described hereinafter with reference to FIGS. 1-2D by way of example. In some embodiments, some aspects of the process 300 may be implemented as software (e.g., program codes or instructions) that are stored in a memory or a non-transitory computer-readable medium. In some embodiments, some aspects of the process 300 may be implemented as hardware (e.g., a specific-purpose circuit). In some embodiments, the process 700 may be implemented as a combination of software and hardware.

FIG. 7 includes process blocks 702-710. At block 702, at least one processor may utilize a cloud provider API to access a block storage volume of a workload maintained on a target account in a target system of a cloud storage environment.

At block 704, the at least one processor may utilize a scanner at a location of the block storage volume and on a secondary system other than the target system. In some embodiments, the secondary system may include at least one of a virtual machine, a container, or a serverless function. In some embodiments, the secondary system may have an operating system different from an operating system of the target account.

In some embodiments, to utilize the scanner, the at least one processor may suspend an operation of the scanner after the scan of the block storage volume. In some embodiments, to utilize the scanner, the at least one processor may modify a pre-utilized scanner at the location of the block storage volume based on information related to the target account to obtain a modified scanner, and the utilize the modified scanner.

At block 706, the at least one processor may scan the block storage volume for malicious code, using the secondary system. In some embodiments, to scan the block storage volume, the at least one processor may scan disk-backed memory. For example, the disk-backed memory includes at least one of a page file or a cache file. In some embodiments, the malicious code includes a rootkit.

At block 708, the at least one processor may identify malicious code based on the scan. At block 710, the at least one processor may output from the secondary system, a notification of a presence of malicious code in the target system.

Consistent with disclosed embodiments, besides blocks 702-710, the at least one processor may further determine the location of the block storage volume based on at least one of the target account, a secondary system account, a cloud provider account, or a third party account.

Consistent with disclosed embodiments, besides blocks 302-310, the at least one processor may further identify a source of the malicious code. The notification outputted in block 710 may include information related to the identified source of the malicious code.

Forward and Rearward Facing Attack Vector Visualization Techniques

FIG. 8 is a schematic block diagram illustrating an exemplary embodiment of a system for performing visualization of forward and backward facing threats.

In one of many embodiments, the system may include a graphical user interface system for providing forward and backward facing attack vector visualizations. A graphical user interface system may include systems similar in appearance and functionality to Microsoft Windows, Mac OS, Ubuntu Unity, Gnome Shell, Android, Apple iOS, Blackberry OS, Windows 10 Mobile, PalmOS-Web OS, or Firefox OS. Forward facing attack vectors may be those external entities that may access an analyzed asset. Backward facing attack vectors may include the possible impacts to an analyzed asset and those impacts' possible effect. Visualizations provided by the above system may include graphical, sequential, or multi-dimensional displays of attack vectors.

In an embodiment, the system may comprise at least one processor configured to identify assets 801 in a cloud environment. The at least one processor may include a processor such as user device 102 of FIG. 1. The at least one processor may include a personal computer, tablet, smartphone, or virtual machine for processing threats and vulnerabilities to a cloud-based storage volume. For example, cloud infrastructure 106 may be the cloud environment consisting of virtual machines 107A-107D, databases 109A-109D, storage 111A-111D, keystores 113A-113D, and load balancer 115, and the cloud-based storage volume may be contained in storage 111A-111D. The cloud environment may include service provided by a third party such as Amazon Web Services, Microsoft Azure, Google Cloud, Alibaba Cloud, IBM Cloud, Oracle, Salesforce, SAP, or similar service.

Another embodiment contemplated may consist of at least one processor configured to identify risks 803 associated with each of the identified asset. The identified risks 803 associated with each of the identified assets may be listed sequentially based on probability of risk, severity of risk, or similar method of ordering the risks. The identified risks 803 associated with an identified asset may be scored based on the level of risk to the asset and may be categorized as a high risk, medium risk, or low risk. Once the level of risk can be determined by scanning system 101, the level of risk can be conveyed and displayed to a user device 102 with a representative graphical display.

An exemplar embodiment may additionally comprise at least one processor configured to identify relationships 805 between at least some of the identified assets, the relationships including at least one of a trust 807A, a network connectivity 807B, or a mechanism of network proxying 807C. A trust 807A may establish a relationship and may involve cryptography, digital signatures, electronic certificates, or similar method of establishing a trusting relationship. A network connectivity 807B may include wireless or wired connections and may be established once a relationship of trust 807A is established. A mechanism of network proxying 807C can be accommodated once trust 807A and network connectivity 807B are established through any number of connected servers to accomplish proxying.

A further embodiment may also comprise a processor configured to receive an identification 809 of a specific asset under investigation. The specific asset under investigation may be a physical or virtual machine that has software operating a specific version that is vulnerable to any number of associated risks. The identification 809 of a specific asset under investigation may involve an IP address, universally unique identifier, or similar system to uniquely or semi-uniquely identify the specific asset under investigation.

A system among several embodiments may include a processor configured to perform a forward analysis 811A of the specific asset under investigation to identify at least one possible attack vector reaching the specific asset via a network outside the cloud environment. A forward analysis 811A of the specific asset may involve those external entities that may access an analyzed asset. The analysis performed by scanning system 101 may determine the origin of the forward threat, the nature of the threat to the analyzed system, and the seriousness of the threat originating from the Internet. For example, scanning system 101 may identify at least one possible attack vector to the workload currently being analyzed. The network outside of the cloud environment may identify new or existing threats and attack vectors currently threatening the associated system and workload.

An exemplary embodiment may further comprise a processor configured to perform a backward analysis 811B of the specific asset to identify at least one exposure risk to one or more assets that is in a downstream of the specific asset, wherein the at least one exposure risk includes an identification of an exposed asset, an entry point to the exposed asset, and a lateral movement risk associated with the exposed asset. A backward analysis 811B of the associated machine may look downstream to related workloads and systems connected to the analyzed systems. A scan downstream may involve, among several embodiments, the downstream exposure risk including an identification of an exposed asset, an entry point to the exposed asset, and lateral movement risks associated with the exposed asset. The at least one exposure risk may include one or more entry point to access the exposed asset and any related machines potentially vulnerable to attack from the analyzed and exposed asset.

Another embodiment may comprise a processor configured to output a signal 813 to cause on a display to present a presentation of forward and backward paths associated with the specific asset, thereby enabling visualization of a plurality of entry points and lateral movement risks associated with the plurality of entry points. The display of a forward or backward path to a specific asset may be one of several visual displays such as linear, graphical, or through computer-generated images. The visualization of a plurality of entry points and lateral movement risks with the plurality of entry points may include visualization of the plurality of paths may sequence the paths based on likelihood of access via that path or the severity of potential threat in a path of access to an asset.

An example embodiment may comprise a system wherein the network outside the cloud environment includes the Internet. The network outside the cloud environment may include access to the Internet in order for the system to access a plurality of analyzed and potentially vulnerable assets.

Another embodiment may comprise a system wherein the assets in the cloud environment include at least one of a virtual machine, a network appliance, a storage appliance, a compute instance, or an engine instance. A virtual machine may include an emulated version of a computer—including an operating system, memory, storage, graphics processing—such that it can be indistinguishable from a standard (non-virtual) machine to a running program. A network appliance may include a plurality of servers connected through the Internet in order to establish a system and network of stored assets and workloads. A storage appliance may be comprised by a server designed to store workloads and assets to be analyzed. A compute instance may involve input and processing of data entries that cause the analyzed asset to be accessed and run. An engine instance may include a search algorithm run to analyze and search the analyzed workloads or virtual machines to determine the software and data stored on the said virtual machine or stored instance.

One among many embodiments may comprise a system wherein identifying the assets in a cloud environment includes identifying the assets based on at least one of an identity and access management policy, an organization policy, or an access policy. An identity and access management policy may comprise a software tool or similar method of establishing identity of users attempting to access a system to verify identities of users and control access to an associated workload or system functionality. An organization policy may include a policy applied to all users by the controlling organization of a workload. An access policy may determine the authorized users of an associated system.

One possible embodiment may comprise a system wherein the presentation of the forward and backward paths indicates alternative paths connecting between the specific asset and an upstream asset or a downstream asset. The indication will be via a visualization showing specific alternative paths connecting specific assets or it may visualize a plurality of alternative paths connecting specific assets. Alternative paths connecting between the specific asset and an upstream asset or a downstream asset may involve a direct connection, such as via the Internet, or an indirect connection via one or more series of servers acting as proxy servers between the analyzed asset and the upstream or downstream asset.

An exemplary embodiment may further comprise a system wherein the visualization includes a presentation of the alternative paths. The alternative paths may be presented visually through a graphical representation, sequential list of alternative paths, or a computer-generated image that represents the plurality of alternative paths.

Another embodiment may comprise a system wherein the presentation of the forward and backward paths indicates port numbers for each pathway. The port numbers may be indicated by a series of alphanumeric characters (e.g., "HTTP" or "80") or other identifier.

One among several exemplary embodiments may further comprise a system wherein the visualization of the entry points indicates at least one entry point of risk. The visualization may indicate one or more points of entry to a given analyzed system. An entry point of risk may involve a port of access to the workload, and may involve a one or more entry points visualized for use by user device 102.

Another exemplary embodiment may comprise a system wherein the at least one processor is further configured to monitor network activities of the assets in a cloud environment. The processor may monitor continuously, intermittently, or as directed by an authorized user to direct monitoring of the analyzed network activities of the assets. The cloud environment may be, among several embodiments, the cloud infrastructure 106.

An embodiment contemplated may comprise a system further configured to detect a potential risk associated with the specific asset based on a network activity of the specific asset. The potential risk may be associated to a specific asset based on historical threats to the specific asset or a list of possible threats to the specific asset based on its current network activities.

Another embodiment may comprise a system further configured to detect a potential risk associated with the specific asset based on a network activity of an upstream asset of the specific asset. The potential risk associated with the specific asset may be identified by scanning system 101 and determine whether a potential risk can be classified as high risk, medium risk, or low risk. The potential risk may be identified based on the specific asset, the network activity performed by the specific asset, or the specific asset type or related software of the upstream asset.

One of many embodiments may comprise a system further configured to detect a potential risk associated with the specific asset based on a network activity of a downstream asset of the specific asset. The potential risk may be identified based on the specific asset, the network activity performed by the specific asset, or the specific asset type or related software of the upstream asset. For example, scanning system 101 may perform a scan on an asset being analyzed, and based on the one or more entry points of risk, may determine if the downstream asset of the specific asset poses a potential risk to the analyzed system.

Another exemplary embodiment may comprise a method for generating a graphical user interface for providing forward and backward facing attack vector visualizations. The method may include a method of generating a graphical user interface similar in appearance and functionality to Microsoft Windows, Mac OS, Ubuntu Unity, Gnome Shell, Android, Apple iOS, Blackberry OS, Windows 10 Mobile, PalmOS-Web OS, or Firefox OS. A forward analysis 811A of the specific asset may involve those external entities that may access an analyzed asset. Backward analysis 811B may include the possible impacts to an analyzed asset and those impacts' possible effect. Visualizations provided by the above system may include graphical, sequential, or multi-dimensional displays of attack vectors.

One exemplar embodiment may further comprise a method of identifying assets 801 in a cloud environment. A method may include at least one processor that may include a personal computer, tablet, smartphone, or virtual machine for processing threats and vulnerabilities to a cloud-based storage volume. For example, cloud infrastructure 106 may be the cloud environment consisting of virtual machines 107A-107D, databases 109A-109D, storage 111A-111D, keystores 113A-113D, and load balancer 115, and the cloud-based storage volume may be contained in storage 111A-111D. The cloud environment may include service provided by a third party such as Amazon Web Services, Microsoft Azure, Google Cloud, Alibaba Cloud, IBM Cloud, Oracle, Salesforce, SAP, or similar service.

One of several embodiments may comprise a method of identifying risks 803 associated with each of the identified assets 801. The method of identifying risks 803 associated with each of the identified assets 801 may be listed sequentially based on probability of risk, severity of risk, or similar method of ordering the risks. The identified risks 803 associated with an identified asset may be scored based on the level of risk to the asset and may be categorized as a high risk, medium risk, or low risk. Once the level of risk can be determined by scanning system 101, the level of risk can be conveyed and displayed to a user device 102 with a representative graphical display.

Another embodiment contemplated may comprise a method for identifying relationships 305 between at least some of the identified assets 801, the relationships including at least one of a trust 807A, a network connectivity 807B, or a mechanism of network proxying 807C. A trust 807A may establish a relationship and may involve cryptography, digital signatures, electronic certificates, or similar method of establishing a trusting relationship. A network connectivity 807B may include wireless or wired connections and may be established once a relationship of trust 807A is established. A mechanism of network proxying 807C can be accommodated once trust 807A and network connectivity 807B are established through any number of connected servers to accomplish proxying.

An embodiment may further comprise a method of receiving an identification of a specific asset 809 under investigation. The specific asset under investigation may be a physical or virtual machine that has software operating a specific version that is vulnerable to any number of associated risks 803. The identification 809 of a specific asset under investigation may involve an IP address, universally unique identifier, or similar system to uniquely or semi-uniquely identify the specific asset under investigation.

An embodiment may also comprise a method of performing a forward analysis 811A of the specific asset under investigation to identify at least one possible attack vector reaching the specific asset via a network outside the cloud environment. A forward analysis 811A of the specific asset may involve those external entities that may access an analyzed asset. A forward analysis may involve analysis of the specific asset under identification to identify at least one possible Internet-originating attack vector to the asset. The analysis performed by scanning system 101 may determine the origin of the forward threat, the nature of the threat to the analyzed system, and the seriousness of the threat originating from the Internet. For example, scanning system 101 may identify at least one possible attack vector to the workload currently being analyzed. The network outside of the cloud environment may identify new or existing threats and attack vectors currently threatening the associated system and workload.

One embodiment may comprise a method of performing a backward analysis 811B of the specific asset to identify at least one exposure risk to one or more assets that is in a downstream of the specific asset, wherein the at least one exposure risk includes an identification of an exposed asset, an entry point to the exposed asset, and a lateral movement risk associated with the exposed asset. Backward analysis 811B may include the possible impacts to an analyzed asset and those impacts' possible effect. A scan downstream may involve, among several embodiments, the downstream exposure risk including an identification of an exposed asset, an entry point to the exposed asset, and lateral movement risks associated with the exposed asset. The at least one exposure risk may include one or more entry point to access the exposed asset and any related machines potentially vulnerable to attack from the analyzed and exposed asset.

An embodiment may comprise a method of outputting a signal 813 to cause on a display to present a presentation of forward and backward paths associated with the specific asset, thereby enabling visualization of a plurality of entry points and lateral movement risks associated with the plurality of entry points. The display of a forward or backward path to a specific asset may be one of several visual displays such as linear, graphical, or through computer-generated images. The visualization of a plurality of entry points and lateral movement risks with the plurality of entry points may include visualization of the plurality of paths may sequence the paths based on likelihood of access via that path or the severity of potential threat in a path of access to an asset.

Another embodiment may comprise a method wherein the network outside the cloud environment includes the Internet. The network outside the cloud environment may include access to the Internet in order for the system to access a plurality of analyzed and potentially vulnerable assets.

One of several embodiments may comprise a method wherein the assets in the cloud environment include at least one of a virtual machine, a network appliance, a storage appliance, a compute instance, or an engine instance. A virtual machine may include an emulated version of a computer—including an operating system, memory, storage, graphics processing—such that it can be indistinguishable from a standard (non-virtual) machine to a running program. A network appliance may include a plurality of servers connected through the Internet in order to establish a system and network of stored assets and workloads. A storage appliance may be comprised by a server designed to store workloads and assets to be analyzed. A compute instance may involve input and processing of data entries that cause the analyzed asset to be accessed and run. An engine instance may include a search algorithm run to analyze and search the analyzed workloads or virtual machines to determine the software and data stored on the said virtual machine or stored instance.

An embodiment may further comprise a method wherein identifying assets in a cloud environment includes identifying the assets based on at least one of an identity and access management policy, an organization policy, or an access policy. An identity and access management policy may comprise a software tool to verify identities of users and control access to an associated workload or system functionality. An organization policy may include a policy applied to all users by the controlling organization of a workload. An access policy may determine the authorized users of an associated system.

An embodiment may also comprise a method wherein the presentation of the forward and backward paths indicates alternative paths connecting between the specific asset and an upstream or a downstream asset. The indication may be via a visualization showing specific alternative paths connecting specific assets or it may visualize a plurality of alternative paths connecting specific assets.

Another exemplar embodiment may comprise a method wherein the visualization includes a presentation of the alternative paths. The alternative paths may be presented visually through a graphical representation, sequential list of alternative paths, or a computer-generated image that represents the plurality of alternative paths.

Another embodiment may comprise a non-transitory computer-readable medium storing instructions that, when executed by at least one processor, are configured to cause the at least one processor to perform operations.

One embodiment may comprise a non-transitory computer-readable medium storing instructions that, when executed by at least one processor 800, are configured to perform operations identifying assets 801 in a cloud environment. the instructions stored on a non-transitory computer-readable medium may include at least one processor 800 that may include a personal computer, tablet, smartphone, or virtual machine for processing threats and vulnerabilities to a cloud-based storage volume. The cloud environment may include service provided by a third party such as Amazon Web Services, Microsoft Azure, Google Cloud, Alibaba Cloud, IBM Cloud, Oracle, Salesforce, SAP, or similar service.

An embodiment may further comprise a non-transitory computer-readable medium storing instructions that, when executed by at least one processor, are configured to cause the at least one processor 300 to perform operations comprising identifying risks 803 associated with each of the identified asset. The instructions performed of identifying risks 803 associated with each of the identified assets 301 may be listed sequentially based on probability of risk, severity of risk, or similar method of ordering the risks.

Another embodiment may comprise a non-transitory computer-readable medium storing instructions that, when executed by at least one processor, are configured to cause the at least one processor to perform operations comprising identifying relationships 805 between at least some of the identified assets 301, the relationships including at least one of a trust 807A, network connectivity 807B, or a mechanism of network proxying 807C.

An exemplar embodiment may comprise a non-transitory computer-readable medium storing instructions that, when executed by at least one processor, are configured to cause the at least one processor to perform operations comprising receiving an identification of a specific asset 809 under investigation. The instructions may include receiving information identifying the specific asset 809. The specific asset 809 under investigation may be a physical or virtual machine that has software operating a specific version that is vulnerable to any number of associated risks 803.

One among many embodiments may comprise a non-transitory computer-readable medium storing instructions that, when executed by at least one processor, are configured to cause the at least one processor to perform operations comprising performing a forward analysis 811A of the specific asset under investigation to identify at least one possible attack vector reaching the specific asset via a network outside the cloud environment. A forward analysis 811A of the specific asset may involve those external entities that may access an analyzed asset. And the scanning system 101 may identify at least one possible attack vector to the workload currently being analyzed. The network outside of the cloud environment may identify new or existing threats and attack vectors currently threatening the associated system and workload.

An embodiment may further comprise a non-transitory computer-readable medium storing instructions that, when executed by at least one processor, are configured to cause the at least one processor to perform operations comprising performing a backward analysis 811B of the specific asset to identify at least one exposure risk to one or more assets that is in a downstream of the specific asset, wherein the at least one exposure risk includes an identification of an exposed asset, an entry point to the exposed asset, and a lateral movement risk associated with the exposed asset. Backward analysis 811B may include the possible impacts to an analyzed asset and those impacts' possible effect. The at least one exposure risk may include one or more entry point to access the exposed asset and any related machines potentially vulnerable to attack from the analyzed and exposed asset.

An embodiment may comprise a non-transitory computer-readable medium storing instructions that, when executed by at least one processor, are configured to cause the at least one processor to perform operations comprising outputting a signal 813 to cause on a display to present a presentation of forward and backward paths associated with the specific asset, thereby enabling visualization of a plurality of entry points and lateral movement risks associated with the plurality of entry points. The display of a forward or backward path to a specific asset may be one of several visual displays such as linear, graphical, or through computer-generated images. The visualization of a plurality of entry points and lateral movement risks with the plurality of entry points may include visualization of the plurality of paths may sequence the paths based on likelihood of access via that path or the severity of potential threat in a path of access to an asset.

Passive Key Identification Techniques

Aspects of this disclosure may provide a technical solution to the challenging technical problem of identifying access keys (e.g., passwords, Secure Shell (SSH) keys, or cloud keys) to compute resources (e.g., machines, containers, storages, or any hardware or software component) in a cloud environment without using the access keys to access the compute resources. In existing technologies, scanning systems may identify access keys to compute resources and may need to verify the identified keys by actually accessing the compute resources using the access keys. In such cases, the actual accesses may generate logs or records (e.g., for successful or failed accesses) that can constitute activity patterns similar to an attacker to the system. Such activity patterns may distract a system administrator (e.g., an individual or a computer program) to misidentify the scanning system as an attacker. Further, actual accesses may create loads on both the scanning system and the compute resources and may reduce the computing resources and power for other tasks. To resolve such a technical problem, a cryptographic analysis may be performed to identify a first set of fingerprints of the identified keys, and trust configurations of the compute resources may be analyzed to identify a second set of fingerprints of the compute resources. The first and second set of fingerprints may be compared to match keys with the compute resources without using the keys to access the compute resources. By doing so, the scanning system may perform its function without raising false alarms to the system administrator, while reducing computing costs to the cloud environment.

A cyber security system, as used herein, may refer to a system including any combination of software and hardware for enhancing security of a device, a platform, or another system in a network environment. By way of example, the cyber security may be implemented as a system including scanning system 101 in FIG. 1. As another example, scanning system 101 may include the disclosed cyber security system as a subset. A compute resource, as used herein, may refer to a database, a virtual machine, a storage, a keystore, a scanning system, a load balancer, a server, a computer, a container, or any physical or virtual component integrated in or communicatively connected to a cloud infrastructure. By way of example, the compute resource may be scanning system 101, any of databases 103A-103D, any of virtual machines 107A-107D, any of databases 109A-109D, any of storage 111A-111D, any of keystores 113A-113D, or load balancer 115 in cloud infrastructure 106 in FIG. 1.

A key to access a compute resource, as used herein, may refer to computerized data that includes a credential for granting permission to an accessor to access the compute resource, or a service or function provided by the compute resource. By way of example, the key may include at least one of a password, a remote access key, a script containing a password, a cloud key (e.g., a credential file for accessing a cloud service, such as an AWS credential file), an Secure Shell (SSH) key, an AWS key, a private component of a private-public key pair, or any type of credential that provide checked or unchecked access to the compute resource. Matching a key to a compute resource, as used herein, may refer to confirming, verifying, validating, or any operation or process of determining that the key is valid for an accessor (e.g., another compute resource) to access the compute resource. For example, to match a key to a compute resource, an accessor may test by using the key to access the compute resource and determines that the key is matched to the compute resource if such access is successful. As another example, to match a key to a compute resource, an accessor may perform methods or algorithms to verify that the key is matched to the compute resource without using the key to access the compute resource.

Consistent with disclosed embodiments, at least one processor may be configured to analyze a cloud environment to identify a plurality of keys to the compute resources in the cloud environment. In some embodiments, the at least one processor may analyze the cloud environment to identify the plurality of keys to the compute resources in the cloud environment in any of steps 231, 237, or 239 in FIG. 2D. In some embodiments, the at least one processor may analyze the cloud environment to identify the plurality of keys to the compute resources in the cloud environment in any step described in association with FIGS. 2A-2D. In some embodiments, at least one of the plurality of keys may include at least one of a password (e.g., a combination of alphanumeric characters and symbols), a script (e.g., a PYTHON® script or a shell script) containing a password, a cloud key, or an Secure Shell (SSH) key. For example, a cloud key may be a key for accessing a cloud resource.

A cloud environment, as used herein, may refer to a computing environment running on a cloud. By way of example, the cloud environment may include or be part of cloud infrastructure 106 in FIG. 1. Analyzing a cloud environment, as used herein, may refer to an operation or a process of separating or dividing the cloud environment into parts or components (e.g., physical components or logic components), then determining nature and relationship of the parts or components based on data associated with the parts or components.

By way of example, if the cloud environment is cloud infrastructure 106 in FIG. 1, to analyze cloud infrastructure 106, the at least one processor may access cloud infrastructure 106 (e.g., via network 105 or via internal connections in cloud infrastructure 106) and obtain a list of compute resources in cloud infrastructure 106 (e.g., scanning system 101, any of databases 103A-103D, any of virtual machines 107A-107D, any of databases 109A-109D, any of storage 111A-111D, any of keystores 113A-113D, or load balancer 115). For example, the at least one processor may obtain the list of compute resources by reading a configuration file from a database (e.g., one of databases 109A-109D), or visit available compute resources one after another through communicative connections between the compute resources to generate the list of compute resources. After obtaining the list of compute resources in cloud infrastructure 106, the at least one processor may determine the nature of the compute resources, such as their types, numbers, functions, or any other characteristics or features. The at least one processor may further determine the relationship between the compute resources, such as communicative connections, access privileges, data input/output directions, or controls between the compute resources.

Identifying a key to a compute resource, as used herein, may refer to an operation or a process of locating, recognizing, or any operation or process or analyzing computerized data or information to determine that the computerized data or information is a key to the compute resources. By way of example, the at least one processor may analyze cloud infrastructure 106 in FIG. 1 to recognize a list of compute resources in cloud infrastructure 106 (e.g., scanning system 101, any of databases 103A-103D, any of virtual machines 107A-107D, any of databases 109A-109D, any of storage 111A-111D, any of keystores 113A-113D, or load balancer 115). Then, the at least one processor may read computerized data stored in a compute resource and identify that some of the computerized data are one or more keys to other compute resources in cloud infrastructure 106. For example, to recognize the keys, the at least one processor may read and compare the computerized data with records stored in keystores 113A-113D, and determine that the computerized data is a key if it matches a record in any of keystores 113A-113D. As another example, the at least one processor may read the computerized data and check its syntaxes, text string patterns, file formats, file properties, encryption manners, library versions, software versions, or any other characteristics or features of the computerized data, and determine that the computerized data is a key if its checked characteristics or features fit a predetermined pattern of a key or fit an entry in a dictionary of keys. For example, the dictionary of keys may be stored in a keystore (e.g., any of keystores 113A-113D).

In some embodiments, the plurality of keys may be stored in at least one workload. A workload, for example, may refer to a specific application, service, capability, or a specific amount of work that can be run on a cloud resource, system, or infrastructure. By way of example, a workload may be a virtual machine, a database server, a container, a Hadoop node, an application, a storage server, a load balancer, or an IAM (Identity and Access Management) configuration. By way of example, with reference to FIG. 1, cloud infrastructure 106 may include workloads such as scanning system

101, databases 103A-103D, virtual machines 107A-107D, databases 109A-109D, storage 111A-111D, keystores 113A-113D, and load balancer 115.

Consistent with disclosed embodiments, at least one processor may be configured to perform a cryptographic analysis on the plurality of keys to identify a first set of fingerprints that uniquely identify each of the plurality of keys. The first set of fingerprints may be non-functional. In some embodiments, the at least one processor may perform the cryptographic analysis in step 237 of FIG. 2D. In some embodiments, the at least one processor may perform the cryptographic analysis in any step described in association with FIGS. 2A-2D.

A cryptographic analysis on data, as used herein, may refer to an operation or process of identifying ciphertext, ciphers and cryptosystems contained in the data to discover hidden aspects of the data that may improve or weaken security of the data or compute resources associated with the data. In some embodiments, to perform the cryptographic analysis on the plurality of keys, the at least one processor may perform an algorithm on the plurality of keys to convert the plurality of keys into another form of data. For example, the at least one processor may perform a hashing process on the plurality of keys (e.g., by inputting values of the keys to a hash function) to obtain corresponding hash values of respective keys.

A fingerprint of a key, as used herein, may refer to non-functional data (e.g., a numeric value, an alphanumeric string, or any combination of letters, numbers, or symbols) generated based on the key and may uniquely identify the key. By way of example, a fingerprint may be generated by performing a hashing process on a key or a part of the key. The hashing process may include, for example, an MD5 algorithm, an SHA-1 algorithm, an SHA-2 algorithm, an SHA-3 algorithm, a RIPEMD-160 algorithm, a BLAKE2 algorithm, a BLAKE3 algorithm, or any type of cryptographic hash algorithms. In such cases, the fingerprint may be a hash value of the key, a part (e.g., a truncated part) of the hash value of the key, a hash value of a part of the key, or a part (e.g., a truncated part) of the hash value of the part of the key. The hash value may be unique (e.g., non-overlap with any hash value of any other key) and non-functional (e.g., unable to be used as a key to access a compute resource). To identify the first set of fingerprints, the at least one processor may perform the hashing process on the plurality of keys to obtain a plurality of hash values, and search the cloud environment to check whether there exists any compute resource that stores the plurality of hash values.

In some embodiments, at least one of the first set of fingerprints may be non-identical to any key of the plurality of keys. For example, if the first set of fingerprints are hash values, they may be non-identical to the plurality of keys.

Consistent with disclosed embodiments, at least one processor may be configured to analyze trust configurations of the compute resources to identify a second set of fingerprints for each of the compute resources. In some embodiments, the at least one processor may analyze the trust configurations in step 233 of FIG. 2D. In some embodiments, the at least one processor may analyze the trust configurations in any step described in association with FIGS. 2A-2D.

A trust configuration, as used herein, may refer to data (e.g., a stored file, a database entry, a value stored in a data structure, or any computerized information) that stores a pre-established trust relationship between at least two compute resources. For example, a trust configuration may be a file storing a trust policy (e.g., a public key infrastructure (PKI), a digital signature system, or an AWS trust policy).

Analyzing a trust configuration, as used herein, may refer to an operation or a process of separating or dividing compute resources associated with the trust configuration into units or groups, then determining nature and relationship of the units or groups based on relationship data associated with the units or groups. For example, the relationship data may include flags, indicators, or any type of value that indicates a first compute resource has an access privilege to a second compute resource.

A fingerprint for a compute resource, as used herein, may refer to non-functional data (e.g., a numeric value, an alphanumeric string, or any combination of letters, numbers, or symbols) generated based on a key for accessing the compute resource and may uniquely identify the key. By way of example, a fingerprint for a compute resource may be generated by applying a cryptographic hash function (e.g., an SHA-1 or SHA-2 function) to a key for accessing the compute resource to obtain a sequence of bytes (e.g., a hash value or a modified hash value), and the sequence of bytes may be the fingerprint for the compute resource. The key may be uniquely associated with the compute resource.

For example, to identify the second set of fingerprints, the at least one processor may analyze a trust configuration file (e.g., a file storing fingerprints and their associated data) by reading the byte stream of the trust configuration file to determine whether any sequence of bytes that fits to a predetermined pattern (e.g., an alphanumeric string pattern). The sequences of bytes that fit to the predetermined pattern may be determined as the second set of fingerprints.

Consistent with disclosed embodiments, at least one processor may be configured to compare the first set of fingerprints with the second set of fingerprints to match keys with the compute resources without using the keys to access the compute resources. In some embodiments, the at least one processor may compare the first set of fingerprints with the second set of fingerprints in any step described in association with FIGS. 2A-2D. Comparing a first fingerprint and a second fingerprint, as used herein, may refer to performing a textual, numerical, or semantic comparison of the first fingerprint and the second fingerprint, or performing an algorithmic conversion of at least one of the first fingerprint or the second fingerprint to further perform a textual, numerical, or semantic comparison of the conversion results. By way of example, a first compute resource may store a key (e.g., a public key) for accessing a second compute resource. The at least one processor may analyze the cloud environment to identify the key from the first compute resource, then may perform the cryptographic analysis described herein to identify a first fingerprint of the key. A third compute resource (e.g., may be the same as or different from the second compute resource) may store in its trust configurations a second fingerprint of the key. The second fingerprint may be generated by a different processor at a different time. The at least one processor may then analyze the trust configurations of the third compute resource to identify the second fingerprint. The at least one processor may then compare the first fingerprint and the second fingerprint to determine whether they match each other. If the first fingerprint matches with the second fingerprint, the at least one processor may determine that the key identified from the first compute resource is a key for accessing the second compute resource. As can be seen, after comparison, if the first set of fingerprints are matched with the second set of fingerprints, keys may be matched with the compute resources, and the at least one processor needs not use the keys to access the compute resources to confirm that the keys are matched to the compute resources.

Consistent with disclosed embodiments, the at least one processor may further analyze a multi-machine interaction in the cloud environment using the first set of fingerprints. A multi-machine interaction, as used herein, may refer to data input/output, operation control, status polling, scanning, or any type of an interaction between a plurality of machines in a cloud environment. Analyzing a multi-machine interaction, as used herein, may refer to an operation or a process of separating or dividing machines in the cloud environment into units or groups, then determining nature and relationship of the units or groups based on relationship data associated with the units or groups. For example, the relationship data may be the first set of fingerprints.

By way of example, to analyze the multi-machine interaction, the at least one processor may compare the first set of fingerprints with the second set of fingerprints. If a first fingerprint of the first set of fingerprints matches with a second fingerprint of the second set of fingerprints, the at least one processor may determine that a first compute resource associated with the first fingerprint may have an inter-machine interaction (e.g., having an ability to access the other) with a second compute resource associated with the second fingerprint. By way of example, a first compute resource may store a key (e.g., a private key) for accessing a second compute resource. The at least one processor may analyze the cloud environment to identify the key from the first compute resource, then may perform the cryptographic analysis described herein to identify a first fingerprint of the key. A third compute resource (e.g., may be the same as or different from the second compute resource) may store in its trust configurations a second fingerprint of the key. The at least one processor may then analyze the trust configurations of the third compute resource to identify the second fingerprint. The at least one processor may then compare the first fingerprint and the second fingerprint to determine whether they match each other (e.g., being the same). If the first fingerprint matches with the second fingerprint, the at least one processor may determine that the key identified from the first compute resource is a key for accessing the second compute resource, and may further determine an inter-machine interaction in which the first compute resource has ability to access the second compute resource.

Consistent with disclosed embodiments, the at least one processor may further analyze a multi-machine interaction in the cloud environment using the plurality of keys. For example, the at least one processor may use the plurality of keys as the relationship data for determining nature and relationship of compute resources in the cloud environment. By way of example, to analyze the multi-machine interaction, the at least one processor may compare a first key for accessing a first one of the compute resources and a second key for accessing a second one of the compute resources. If the first key matches with (e.g., is identical to) the second key, the at least one processor may determine that the first one of the compute resources may have an interaction (e.g., having an ability to access the other) with the second one of the compute resources.

By way of example, FIG. 9 is a block diagram illustrating an exemplary process 900 of matching keys with compute resources in a cloud environment, consistent with the disclosed embodiments. While the block diagram may be described below in connection with certain implementation embodiments presented in other figures, those implementations are provided for illustrative purposes only, and are not intended to serve as a limitation on the block diagram. For example, the steps in FIG. 9 may be executed in any order, steps may be duplicated, or steps may be omitted. In some embodiments, the process 900 may be performed by at least one processor (e.g., a CPU) of a computing device or system (e.g., scanning system 101 in FIG. 1) to perform operations or functions described herein, and may be described hereinafter with reference to FIGS. 1-2D by way of example. In some embodiments, some aspects of the process 900 may be implemented as software (e.g., program codes or instructions) that are stored in a memory or a non-transitory computer-readable medium. In some embodiments, some aspects of the process 300 may be implemented as hardware (e.g., a specific-purpose circuit). In some embodiments, the process 300 may be implemented as a combination of software and hardware.

FIG. 9 includes process blocks 902-908. At block 902, at least one processor may analyze a cloud environment to identify a plurality of keys to the compute resources in the cloud environment. In some embodiments, the plurality of keys may be stored in at least one workload. In some embodiments, at least one of the plurality of keys may include at least one of a password (e.g., a combination of alphanumeric characters and symbols), a script (e.g., a PYTHON® script or a shell script) containing a password, a cloud key, or an Secure Shell (SSH) key.

At block 904, the at least one processor may perform a cryptographic analysis on the plurality of keys to identify a first set of fingerprints that uniquely identify each of the plurality of keys. The first set of fingerprints may, in some embodiments, be non-functional. In some embodiments, at least one of the first set of fingerprints may be non-identical to the key.

At block 906, the at least one processor may analyze trust configurations of the compute resources to identify a second set of fingerprints for each of the compute resources. As discussed above, to identify the second set of fingerprints, in some embodiments, the at least one processor may analyze a trust configuration file (e.g., a file storing fingerprints and their associated compute resources) by reading the byte stream of the trust configuration file to determine whether any sequence of bytes that fits to a predetermined pattern (e.g., an alphanumeric string pattern). The sequences of bytes that fit to the predetermined pattern may be determined as the second set of fingerprints.

At block 908, the at least one processor may compare the first set of fingerprints with the second set of fingerprints to match keys with the compute resources without using the keys to access the compute resources. As discussed above, in some embodiments, a first compute resource may store a key (e.g., a private component of a private-public key pair) to a second compute resource, and the second compute resource may store in its trust configurations a second fingerprint of the key. The at least one processor may analyze the cloud environment to identify the key from the first compute resource, then may perform the cryptographic analysis described herein to identify a first fingerprint of the key. The at least one processor may then analyze the trust configurations of the second compute resource to identify the second fingerprint. The at least one processor may then compare the first fingerprint and the second fingerprint to determine whether they match each other (e.g., being identical). If the first fingerprint matches with the second fingerprint, the at least one processor may determine that the key identified from the first compute resource is a key for accessing the second compute resource.

Consistent with disclosed embodiments, besides blocks 902-908, the at least one processor may further analyze a multi-machine interaction in the cloud environment using the first set of fingerprints. By way of example, to analyze the multi-machine interaction, the at least one processor may compare the first set of fingerprints with the second set of fingerprints. As discussed above, in some embodiments, a first compute resource may store a key (e.g., a private key) for accessing a second compute resource. The at least one processor may analyze the cloud environment to identify the private component from the first compute resource, then may perform the cryptographic analysis described herein to identify a first fingerprint of the key. A third compute resource (e.g., may be the same as or different from the second compute resource) may store in its trust configurations a second fingerprint of the key. The at least one processor may then analyze the trust configurations of the third compute resource to identify the second fingerprint. The at least one processor may then compare the first fingerprint and the second fingerprint to determine whether they match each other (e.g., being the same). If the first fingerprint matches with the second fingerprint, the at least one processor may determine that the key identified from the first compute resource is a key for accessing the second compute resource, and may further determine an inter-machine interaction in which the first compute resource has ability to access the second compute resource.

Consistent with disclosed embodiments, besides blocks 902-908, the at least one processor may further analyze a multi-machine interaction in the cloud environment using the plurality of keys. By way of example, to analyze the multi-machine interaction, the at least one processor may compare a first key for accessing a first one of the compute resources and a second key for accessing a second one of the compute resources.

Hybrid Ephemeral Scanner Techniques

Aspects of this disclosure may include accessing a primary account maintained in a cloud environment. A primary account as used herein, may refer to a principal or main identity created for a person in a computer or computing system. A primary account may also be created for machine entities, such as service accounts for running programs, system accounts for storing system files and processes, and root and administrator accounts for system administration. A cloud environment, as used herein, may refer to a platform implemented on, hosted on, and/or accessing servers that are accessed over the Internet. An example of a cloud environment is cloud infrastructure 106 in FIG. 1. In some embodiments, scanning system 101 of FIG. 1 may gain access to an account within cloud infrastructure 106.

Aspects of this disclosure may include receiving information defining a structure of the primary account, wherein the structure includes a plurality of assets.

Information as used herein, may refer to data received. Structure of the primary account as used herein, may refer to a set up or of the primary account. A plurality of assets as used herein, may refer to one or more data, devices, or components within an organization's system. For example, the plurality of assets may include any of virtual machines 107A-107D, databases 109A-109D, storage 111A-111D, keystores 113A-113D, load balancer 115, log files or databases, API gateway resources, API gateway REST APIs, Autoscaling groups, CloudTrail logs, CloudFront services, volumes, snapshots, VPCs, subnets, route tables, network ACLs, VPC endpoints, NAT gateways, ELB and ALB, ECR repositories, ECS clusters, services, and tasks, EKS, S3 bucket and Glacier storage, SNS topics, IAM roles, policies, groups, users, KMS keys, and Lambda functions.

In some embodiments, scanning system 101 of FIG. 1 may receive information relating to the structure of an account. In such an embodiment, the structure of the account may include virtual machines 107A-D and databases 109A-109D, for example. In some embodiments, the information may be acquired from another device, received via a one way communication, received in response to a request, retrieved from a storage device, or generated.

In some embodiments, the information may exclude raw data of the primary account. Raw data as used herein, may refer to a collection of data as gathered before it has been processed, cleaned, or analyzed. For example, raw data may include usage data, passwords, and cache.

Aspects of this disclosure may include deploying, inside the primary account, at least one ephemeral scanner configured to scan at least one block storage volume and to output metadata defining the at least one block storage volume. In some embodiments, the output may exclude raw data of the primary account. In some embodiments, the ephemeral scanner may be deployed inside a secondary account for which trust has been established with a primary account. For example, a secondary account on another system may have an existing trust relationship (such as a cloud trust policy) with a first account. The ephemeral scanner may be operated inside of that secondary account to scan block storage associated with the first account. Each account may be hosted on the same system or on different systems.

Further, in some embodiments, the at least one ephemeral scanner may be configured to periodically scan at least one block storage volume. For example, the scanner may be configured to scan at least one block storage volume once per hour, once per day, once per week, or more or less often.

Further, in some embodiments, the at least one ephemeral scanner may be periodically deployed to scan at least one block storage volume. For example, the scanner may be deployed for scanning at least one block storage volume once per hour, once per day, once per week, or more or less often.

Outputting metadata as used herein, may refer to producing a set of data that describes and gives information about other data. In some embodiments, scanning system 101 of FIG. 1 may scan a block storage volume and output data related to it (e.g., vulnerability information, configuration information, malware information, risk analysis information, and sensitive information). Periodically scanning as used herein, may refer to conducting a scan occurring or recurring at regular intervals. In some embodiments, the ephemeral scanner is configured to perform vulnerability scanning of the at least one block storage volume. In such an embodiment the ephemeral scanner may scan the block storage volume to check for security vulnerabilities on the device. In some embodiments, the ephemeral scanner is configured to perform configuration scanning of the at least one block storage volume. In such an embodiment the ephemeral scanner may scan the block storage volume to check for configuration information related to the device. In some embodiments, the ephemeral scanner may scan the block storage volume in order to look for security issues. In some embodiments, the ephemeral scanner is configured to perform malware scanning of the at least one block storage volume. In such an embodiment the ephemeral scanner may scan the block storage volume to check for malware information related to the device. As discussed above with respect to FIG. 2D, in step 235, scanning system 101 may perform a step of malware scanning. In some embodiments, scanning system 101 may perform malware scanning across all filesystems in the snapshot (e.g., gathered from virtual machines 107A-107D or storage 111A-111D). Scanning system 101 may use multiple malware scanning software solutions to perform a malware scan against the filesystems, including one sourced from another vendor, such as bucketAV, Trend Micro Cloud One, Sophos Cloud Optix, Crowdstrike Falcon CWP, or others. In some embodiments, malware scanning in step 235 comprises utilizing signatures, heuristics, or sandboxing capabilities to deduce whether there is an infection on the machine.

In some embodiments, the ephemeral scanner is configured to perform lateral-movement risk analysis of the at least one block storage volume. In such an embodiment the ephemeral scanner may scan the block storage volume to check for lateral-movement risk information related to the device. For example, in some embodiments, scanning system 101 may perform a "backward" analysis of the specific asset to identify exposure risk to assets downstream of the specific asset, wherein the downstream exposure risk includes an identification of an exposed asset, an entry point to the exposed asset, and lateral movement risks associated with the exposed asset.

Further, as discussed above with respect to FIG. 2D, in step 237, scanning system 101 may perform a step of lateral movement scanning. An attacker who establishes a network foothold usually attempts to move laterally from one resource to another in search of rich targets such as valuable data. Stolen passwords and keys unlock access to servers, files, and privileged accounts. In some embodiments, scanning system 101 may gather keys from each scanned system or device (e.g., virtual machines 107A-107D or storage 111A-111D). In some embodiments, scanning system 101 searches for passwords, scripts, shell history, repositories, or other data that may contain passwords, cloud access keys, SSH keys, or other key/password/access information that provide unchecked access to important resources. In some embodiments, scanning system 101 searches for such keys/passwords/access information and calculates a "hash" (a mathematical fingerprint) of each string. Scanning system 101 then attempts to match the hashed strings to hashes of strings that that are stored on different systems or devices. This will be used to detect the potential lateral movement between assets.

In some embodiments, the ephemeral scanner is configured to perform sensitive information scanning of the at least one block storage volume. In such an embodiment the ephemeral scanner may scan the block storage volume to check for sensitive information related to the device. As discussed above with respect to FIG. 2D, in step 241, scanning system 101 may perform a step of sensitive information scanning. In some embodiments, scanning system 101 may search the snapshot for sensitive information, such as personally identifiable information (PII), Social Security numbers, healthcare information, or credit card numbers. In some embodiments, scanning system 101 may search data repository history as well. This is because it is not uncommon for an entire production environment repository to be cloned, with no one remembering the copy contains sensitive information. In some situations, detecting sensitive data not secured is critical in adherence to data privacy regulations.

In some embodiments, the ephemeral scanner is configured to perform container scanning of the at least one block storage volume. In such an embodiment the ephemeral scanner may scan the block storage volume to check for container information related to the device. As discussed with respect to FIG. 2D, in step 243, scanning system 101 may perform a step of container scanning. In some embodiments, scanning system 101 may apply one or more of the preceding steps of FIG. 2D against containerized environments. In some embodiments, in order to do so, scanning system 101 reconstructs a container runtime layered file system (LFS) before recursively running one or more of steps 231-241 on the reconstructed file system.

In some embodiments, the ephemeral scanner is configured to perform keys and password scanning of the at least one block storage volume. In such an embodiment the ephemeral scanner may scan the block storage volume to check for keys and password information related to the device. As discussed above with respect to FIG. 2D, in step 239, scanning system 101 may perform a step of key/password scanning. As one example situation, suppose there is a weak or unprotected password stored (in plain text) in storage 111A. For example, if a personal email account has been compromised, the passwords may be known about in advance. Scanning system 101 may search the snapshot for similar usernames or login names, and, either using known dictionaries or the account owner's previously leaked passwords (stored in, e.g., database 103A), may attempt to login to one or more systems or devices in cloud infrastructure 106, and may record the result thereof.

In some embodiments, defining the at least one block storage volume includes presenting risk data without sharing consumer data or data that was used to identify the risk data. Risk data as used herein, may refer to information relating to causing harm. Consumer data as used herein, may refer to a user's personal information or any information trail user's leave behind as a result of their computer or Internet use. Data used to identify the risk as used herein, may refer to information for determining possible issues. In some embodiments, scanning system 101 of FIG. 1 may present information without sharing a user's personal information or any information trail user's leave behind as a result of their computer or Internet use.

In some embodiments, the metadata defining the at least one block storage volume includes at least one of: an indication of an installed application, a version of an installed application, an operating system configuration, an application configuration, or a profile configuration. An indication of an installed application as used herein, may refer to a sign or signal of a stored program. A version of an installed application as used herein, may refer to an older or newer form of a stored program. An operating system configuration as used herein, may refer to one or more computer system settings that have been set by default automatically or manually by a given program or the user. An application configuration as used herein, may refer to one or more computer program settings that have been set by default automatically or manually by a given program or the user. A profile configuration as used herein, may refer to one or more computer program file settings that have been set by default automatically or manually by a given program or the user.

Aspects of this disclosure may include receiving a transmission of the metadata from the at least one ephemeral scanner. In some embodiments, the transmission may exclude raw data of the primary account. A transmission of metadata as used herein, may refer to movement of a set of data that describes and gives information about other data. In some embodiments, scanning system 101 of FIG. 1 may receive data excluding any raw data (e.g., data as gathered before it has been processed, cleaned or analyzed).

Aspects of this disclosure may include analyzing the received metadata to identify a plurality of cybersecurity vulnerabilities. A plurality of cybersecurity vulnerabilities as used herein, may refer to a weakness in a system. For example, a cybersecurity vulnerability may be exploited by cybercriminals to gain unauthorized access to a computer system. In some embodiments, scanning system 101 of FIG. 1 may analyze the received data in order to identify any weakness in a system (e.g., to avoid cybercriminals gaining unauthorized access to a computer system). In some embodiments, vulnerability information may include information stored in a system.

Aspects of this disclosure may include correlating each of the identified plurality of cybersecurity vulnerabilities with one of the plurality of assets. In some embodiments, scanning system 101 of FIG. 1 may connect a security risk with an asset in the cloud environment. In such embodiments, the connection or correlation of vulnerability to asset may allow the system to address the vulnerability.

Aspects of this disclosure may include generating a report correlating the plurality of cybersecurity vulnerabilities with the plurality of assets. A report as used herein, may refer to a document containing information. For example, a report may notify the administrator of a website or application about a problem such as a security issue or vulnerability in the system that should be addressed. In some embodiments, scanning system 101 of FIG. 1 may create a report providing information related to the vulnerability and asset. In such an embodiment, the report may allow for the vulnerability to be addressed and resolved.

In such embodiments, the system may allow scanners (e.g., ephemeral scanners, scanning system 101) to run inside an account, including an Amazon Web Services, Azure, or GCP account. In this mode, a cloud cybersecurity service may generate ephemeral scanners inside an account that performs the same actions as a SAAS node but are logically hosted inside the account.

In some embodiments, the at least one processor is further configured to receive a transmission of updated metadata defining the at least one block storage volume in response to at least one change to the at least one block storage volumes. Updated metadata as used herein, may refer to a renewed set of data that describes and gives information about other data.

FIG. 10 is a block diagram of a method 1000 for deployment of ephemeral scanners, consistent with disclosed embodiments. In some embodiments, the method may include seven (or more or less) steps:

Block 1002: Access a primary account maintained in a cloud environment. In some embodiments, scanning system 101 of FIG. 1 may gain access to an account within cloud infrastructure 106 using a password stored in a database, for example.

Block 1004: Receiving information defining a structure of the primary account, wherein the structure includes a plurality of assets. In some embodiments, the information may exclude raw data of the primary account. In some embodiments, scanning system 101 of FIG. 1 may receive data relating to the structure of an account. In such an embodiment, the structure of the account may include virtual machines 107A-D and databases 109A-109D, for example.

Block 1006: Deploying, inside the primary account, at least one ephemeral scanner configured to periodically scan at least one block storage volume and to output metadata defining the at least one block storage volume. In some embodiments, the output may exclude raw data of the primary account. In some embodiments, scanning system 101 of FIG. 1 may scan a block storage volume and output data related to it (e.g., vulnerability information, configuration information, malware information, risk analysis information, and sensitive information).

Block 1008: Receiving a transmission of the metadata from the at least one ephemeral scanner. In some embodiments, the transmission may exclude raw data of the primary account. In some embodiments, scanning system 101 of FIG. 1 may receive data excluding any raw data (e.g., data as gathered before it has been processed, cleaned or analyzed).

Block 1010: Analyzing the received metadata to identify a plurality of cybersecurity vulnerabilities. For example, a cybersecurity vulnerability may be exploited by cybercriminals to gain unauthorized access to a computer system. In some embodiments, scanning system 101 of FIG. 1 may analyze the received data in order to identify any weakness in a system (e.g., to avoid cybercriminals gaining unauthorized access to a computer system).

Block 1012: Correlating each of the identified plurality of cybersecurity vulnerabilities with one of the plurality of assets. In some embodiments, scanning system 101 of FIG. 1 may connect a security risk with an asset in the cloud environment. In such embodiments, the connection or correlation of vulnerability to asset may allow the system to address the vulnerability.

Block 1014: Generating a report correlating the plurality of cybersecurity vulnerabilities with the plurality of assets. For example, a report may notify the administrator of a website or application about a problem such as a security issue or vulnerability in the system that should be addressed. In some embodiments, scanning system 101 of FIG. 1 may create a report providing information related to the vulnerability and asset. In such an embodiment, the report may allow for the vulnerability to be addressed and resolved.

Risk Information Aggregation Techniques

FIG. 11 represents a schematic block diagram 1100 illustrating an exemplary embodiment of a method for providing a dashboard aggregating risk information.

Assets operating in a cloud environment face myriad cybersecurity risks that vary in type and nature of threat with increasing regularity. In order to combine the varied and multiple cybersecurity risks an asset may encounter in a cloud environment into a single view to allow for faster and more flexible processing, prioritization and mitigation, a system and method of aggregating cybersecurity risks into a single dashboard is needed. Aggregation of multiple cybersecurity risks into a single view for an administrator is needed. In one of many embodiments, an exemplary embodiment may include a graphical user interface system for providing comprehensive cloud environment risk inventory visualization. A graphical user interface system may include systems similar in appearance and functionality to Microsoft Windows, Mac OS, Ubuntu Unity, Gnome Shell, Android, Apple iOS, Blackberry OS, Windows 10 Mobile, PalmOS-Web OS, or Firefox OS. For example, cloud infrastructure 106 may be the cloud environment consisting of virtual machines 107A-107D, databases 109A-109D, storage 111A-111D, keystores 113A-113D, and load balancer 115, and the cloud-based storage volume may be contained in storage 111A-111D. The cloud environment may include service provided by a third party such as Amazon Web Services, Microsoft Azure, Google Cloud, Alibaba Cloud, IBM Cloud, Oracle, Salesforce, SAP, or similar service. Visualizations provided by the above system may include graphical, sequential, or multi-dimensional displays of risk inventories. For example, cloud infrastructure 106 may be the cloud environment consisting of virtual machines 107A-107D, databases 109A-109D, storage 111A-111D, keystores 113A-113D, and load balancer 115, and the cloud-based storage volume may be contained in storage 111A-111D.

An exemplary embodiment may also include at least one processor. The at least one processor may be part of a personal computer, tablet, smartphone, or virtual machine for processing threats and vulnerabilities to a cloud-based storage volume. A processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations.

In an embodiment may include a processor configured to cause a display to present a plurality of asset categories (step 1101). A display may be graphical, sequential, or multi-dimensional. A plurality may include at least one asset category to be displayed. Asset categories may include at least one of an account category, a container category, a database category, an image category, a container category, a managed service category, a messaging service category, a monitoring category, a network category, a storage category, a user category, a access category, a virtual machine category, or a serverless category.

An account category may further include listing of assets based on type of account associated with that user. A type of account may include active user account, passive user account, administrator account, maintainer account, a system account, superuser account, or a guest user account.

A container category may include one or more containers currently listed in the system. A container may involve specific versions of programming language runtimes, libraries required to run software, or another method of packaging applications abstracted from the cloud environment.

A database category may include one or more databases managed and maintained in relation to the system. Databases may include a NoSQL database, a relational database, a cloud database, a columnar database, a wide column database, a key-value database, an object-oriented database, a hierarchical database, or any other kind of database. Databases may be implemented using ElasticCache, ElasticSearch, DocumentDb, DynamoDB, Neptune, RDS, Aurora, Redshift clusters, Kafka clusters, or EC2 instances.

An image category may contain one or more images based on image type, size, and content. Images may include images of one or more virtual machines.

A managed service category may include one or more managed services listed in the above system, to include at least client or customer-owned systems being managed by a third party entity.

A messaging service category may include systems/programs communicating with other systems/programs using services such as Google Cloud Pub and Sub communications, AWS SQS, or similar queues found in Information Systems.

A monitoring category may include centralized or decentralized methods of security monitoring systems.

A network category may include one or more systems of establishing a form of communicative connectivity between systems, e.g., TCP-IP services.

A storage category may list one or more methods of data storage, to include Direct Attached Storage, Network Attached Storage, SSD Flash Drive Arrays, Hybrid Flash Arrays, Hybrid Cloud Storage, Backup Software, Backup Appliances, Cloud Storage, or similar. Storage may include data structures, instructions, or any other data to be contained in a storage medium.

A user category may include one or more users of a given system along with identifying information relating to its unique or semi-unique identifier, level of authorized access and permissions, and storage volumes accessible by said user.

An access category may include one or more levels of access permission and a listing of users or devices granted access at a given level of access permission to a system.

A virtual machine category may list one or more virtual machines accessible to a system and the levels and types of access granted to a given virtual machine.

A serverless category may list one or more storage volumes stored on a serverless computing system such as Kubeless, Fission, Google App Engine, AWS Lambda, Google Cloud Functions, IBM Cloud Function, IBM Cloud Code Engine, Microsoft Azure Functions, Cloudflare Workers, and Compute@Edge.

In an embodiment, an exemplar may include a processor configured to receive, via an input device, a selection of a particular asset category (step 1103). An input device may include a personal computer, tablet, smartphone, or virtual machine. A processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. A selection of one or more asset categories may be received and updated as new visualizations are developed based on the current threats to an asset in that category. Asset categories may be selected or deselected by an end user. Once a particular asset category is selected, it may be added to a list of selected asset categories with a list for deselected categories as well. The list of selected asset categories may organized per category or may be compiled to include all current threats in a comprehensive selected asset threat list.

One exemplary embodiment may further include a processor configured to cause the display to present a list of assets in the selected category that have cyber security risks (step 1105). When an asset in a selected category has a cyber security risk associated with it, the asset may appear in a list of all listed categories having a cyber security risk associated with it, and may be organized by individual category, type of cyber security risk, or some combination or sequential ordering methods based on the information available to the processor and its end user.

In one of many exemplary embodiments a processor may be configured to retrieve workload component cybersecurity risk information (step 1107A) for each listed asset. When a category of assets is selected, a processor may be configured to order those assets according to available cybersecurity risk information available to said processor, and may organize by type of risk, type of asset, or similar type of sequentialization. Cybersecurity risk information may be determined from historical threats to the workload component, the current active cybersecurity threats to workload components of certain types, or some combination of the same.

In an embodiment, a processor may be configured to retrieve cloud component cybersecurity risk information (step 1107B) for each listed asset. Cloud component cybersecurity risk information may include identification of the risk based on a semi-unique identifier, the nature of the risk, the likelihood of the risk, or the severity of the risk to each listed asset. Cybersecurity risk information to a cloud component may be determined from historical threats within the cloud environment 106, current active cybersecurity threats to similar workload components in the cloud environment 106 or the level of risk to assets within the cloud environment 106, as outlined below.

An exemplary embodiment may include a system configured to cause the display to present a common interface (step 1109) providing access to the workload component cybersecurity risk information and cloud component cybersecurity risk information. The common interface may be configured to access component cybersecurity risk information based on the nature of the risk, the likelihood of the risk, or the severity of the risk to the component, including recursive risk—risk that can happen from an attacker getting access to a system and using it as a mean to reach other system. On the same interface, a different interface, or a similar and related interface, a display may present cloud component cybersecurity risk information based on a semi-unique identifier, the nature of the risk, the likelihood of the risk, or the severity of the risk to each listed asset.

As an exemplary embodiment, the system may be configured to cause the display to present, in the common interface, an interconnection between the workload component cybersecurity risk information and the cloud component cybersecurity risk information (step 1111). With this display presented, an exemplary embodiment may allow for a user to prioritize data from additional sources. The interconnection between workload component cybersecurity risk information and cloud component cybersecurity risk information may generate an interface between them and may be presented as an interconnection between them. The common interface presented may include direct interconnections between the component cybersecurity risk information and the cloud component cybersecurity risk information or links from one set of cybersecurity risk information. For instance, the component cybersecurity risk information may include a link to access the cloud component cybersecurity risk information. Conversely, the cloud component cybersecurity risk information may include a link to access the component cybersecurity risk information.

In one embodiment, a system may be configured to provide the plurality of asset categories include at least one of an account category, a container category, a database category, an image category, a container category, a managed service category, a messaging service category, a monitoring category, a network category, a storage category, a user category, a access category, a virtual machine category, or a serverless category. A category may list the currently identified entities of that category type as described below. An account category may include one or more listed accounts of users of the system. An account category may further include listing of assets based on type of account associated with that user. A type of account may include active user account, passive user account, administrator account, maintainer account, a system account, superuser account, or a guest user account.

A container category may include one or more containers currently listed in the system. A container may involve specific versions of programming language runtimes, libraries required to run software, or another method of packaging applications abstracted from the cloud environment.

A database category may include one or more databases managed and maintained in relation to the system. Databases may include a NoSQL database, a relational database, a cloud database, a columnar database, a wide column database, a key-value database, an object-oriented database, a hierarchical database, or any other kind of database. Databases may be implemented using ElasticCache, ElasticSearch, DocumentDb, DynamoDB, Neptune, RDS, Aurora, Redshift clusters, Kafka clusters, or EC2 instances.

An image category may contain one or more images based on image type, size, and content. Images may include images of one or more virtual machines displayed. A managed service category may include one or more managed services listed in the above system, to include at least client or customer-owned systems being managed by a third party entity.

A messaging service category may include services of users communicating with at least one other user such as Google Cloud Pub and Sub communications, AWS SQS, or similar queues found in Information Systems.

A monitoring category may include centralized or decentralized methods of security monitoring systems.

A network category may include one or more systems of establishing a form of communicative connectivity between systems, e.g., TCP-IP services.

A storage category may list one or more methods of data storage, to include Direct Attached Storage, Network Attached Storage, SSD Flash Drive Arrays, Hybrid Flash Arrays, Hybrid Cloud Storage, Backup Software, Backup Appliances, Cloud Storage, or similar. Storage may include data structures, instructions, or any other data to be contained in a storage medium.

A user category may include one or more users of a given system along with identifying information relating to its unique or semi-unique identifier, level of authorized access and permissions, and storage volumes accessible by said user.

An access category may include one or more levels of access permission and a listing of users or devices granted access at a given level of access permission to a system.

A virtual machine category may list one or more virtual machines accessible to a system and the levels and types of access granted to a given virtual machine.

A serverless category may list one or more storage volumes stored on a serverless computing system such as Kubeless, Fission, Google App Engine, AWS Lambda, Google Cloud Functions, IBM Cloud Function, IBM Cloud Code Engine, Microsoft Azure Functions, Cloudflare Workers, and Compute@Edge.

In one of many exemplary embodiments, a system may further include the common interface configured to display information relating to at least one of an asset type, a risk, a region, or an account. A common interface may include the ability to configure and reconfigure the asset type, risk, region, or account to appear in any order and at multiple formats for displaying the information relating to those categories.

In another embodiment, a system may provide the common interface configured to display description for each listed asset. The display of a description for each listed asset may be listed vertically or horizontally. The display may be displayed as written text, representative graphical figures, or similar method of displaying the aforementioned types of information for an asset.

In another embodiment, a system may further provide the common interface is configured to display at least one of a vulnerability, an insecure configuration, an indication of a presence of malware, a neglected asset, a data at risk, a lateral movement, or an authentication. A vulnerability may include vulnerability data from a vulnerability database such as NVD, WPVulnDB, US-CERT, Node.js Security Working Group, OVAL— Red Hat, Oracle Linux, Debian, Ubuntu, SUSE, Ruby Advisory Database, JVN, Safety DB(Python), Alpine secdb, PHP Security Advisories Database, Amazon ALAS, RustSec Advisory Database, Red Hat Security Advisories, Microsoft MSRC, KB, Debian Security Bug Tracker, Kubernetes security announcements, Exploit Database, Drupal security advisories, JPCERT. An insecure configuration may include software flaws or misconfigurations, non-encrypted files, improper file or directory permissions, unpatched security flaws in server software, enabled or accessible administrative and debugging functions, administrative account vulnerabilities, SSL certificates and encryption settings not properly configured, or a similar misconfiguration. These misconfigurations may be discovered by performing a scan, e.g., may query devices and systems capable of routing traffic (e.g., load balancer 115, routers, switches, firewalls, and proxies) using an API provided through a cloud service provider's system to determine network configurations, and may evaluate them against known problematic configurations or other configurations. Malware indicated may include Adware, Botnets, Cryptojacking, Malvertising, Ransomware, Remote Administration Tools (RATs), Rootkits, Spyware, Trojans, Virus Malware, Worm Malware, or similar attack vehicles. A neglected asset may include an asset that has been improperly maintained, patched, or similar cybersecurity security measure. A data at risk may include any packet of data that may be exposed to a cybersecurity threat. A lateral movement may include any pathway between assets where a cybersecurity risk can travel from one affected asset to another affected asset. An authentication may include a username, password, one-time password, two-factor authentication, or any other authentication mechanism to gain access to a cloud service provider's system. A common interface may display more than one of a vulnerability, an insecure configuration, an indication of a presence of malware, a neglected asset, a data at risk, a lateral movement, and an authentication separately or concurrently for an asset. A display of said information may be ordered and listed in any order depending on user preference and input.

An exemplary embodiment may further include a system wherein the common interface is configured to display one or more possible attack vectors reaching the each listed asset. Generating this common interface display may include generating a map of an asset to include recording information such as a region identifier, site identifier, datacenter identifier, physical address, network address, workload name, or any other identifier which may be acquired via an API provided through a cloud service provider's system and demonstrating via a display the myriad attack vectors currently available to an analyzed asset. Display of the one or more possible attack vectors reaching the each listed asset may be displayed as written text, representative graphical figures, or similar method of displaying the one or more possible attack vectors.

Another exemplary embodiment may further include a system wherein the common interface is configured to display a recommended mitigation tactic for the each listed asset. A recommended mitigation tactic may be generated based on historical data of the cybersecurity risk, the vulnerability attributed to the listed asset, or the data contained on the each listed asset. Mitigation tactics may be selected based on user input or may be implemented automatically based on the mitigation tactics likelihood of a successful mitigation of the cybersecurity risk. A mitigation tactic may include increased frequency of scanning, heightened access control measures, firewalls and antivirus software patches, increased patch management scheduling, continuous workload monitoring, or similar tactics.

In another exemplary embodiment is a system wherein the common interface is configured to display one or more workload metrics associated with the each listed asset. Workload metrics may be a statistical representation of the current performance of the workload, the capacity for additional processing of the workload, and the historical performance of the workload based on statistical trend.

Another exemplary embodiment may include a system wherein the at least one processor is further configured to provide a cybersecurity report for the each listed asset. A cybersecurity report may be generated by scanning system 101 following a complete scan of an analyzed asset, and may include a snapshot of one or more of the number of total cybersecurity threats to a listed asset, number of cybersecurity threats mitigated by recent performance, methods of cybersecurity risk mitigation in the listed asset, rate of cybersecurity threats detected in the listed asset, and possibility of failed cybersecurity mitigation tactics based on the frequency and nature of the historical cybersecurity threats. Data collected to generate a cybersecurity report may include, among many things, operating system packages, installed software applications, libraries, and program language libraries such as Java archives, Python packages, Go modules, Ruby gems, PHP packages, and Node.js modules, other software applications, library versions, software versions, and other identifying characteristics of software and operating systems, lists of users of each system or device (e.g., virtual machines 107A-D), each system's or device's services, password hashes, and application-specific configurations for software/services such as Apache, Nginx, SSH, and other services, bugs or other configuration risks, malware scan results, passwords, scripts, shell history, repositories, or other data that may contain passwords, cloud access keys, SSH keys, or other key/password/access information that provide unchecked access to important resources.

In another embodiment, a system may include the at least one processor is configured to identify a risk level distribution among the listed assets. The at least one processor may be configured to list risk level distribution by highest level of risk, lowest level of risk, or largest number of cybersecurity risks attributed among the listed assets. A risk level may be high if the web service is connected to the Internet (e.g., has at least one public port forwarded through a firewall to the web service, is able to be accessed through a load balancer, is able to be accessed via reverse proxy). A risk level may be medium risk if the web service is only accessible internally (e.g., because of firewall configuration). A risk level may be low risk if access to the web server is blocked by a configuration of cloud infrastructure 106.

Another exemplary embodiment may include a system wherein the at least one processor is configured to receive a search query for a specific risk. A search query may be input by type of risk, name of a risk, or another semi-unique manner of identifying a specific cybersecurity risk. A search may be initiated by end user operating user device 102, by a maintainer or administrator of an analyzed asset, or by a virtual machine associated with operating scanning system 101, A search may be initiated by inputting a number of inputs, to include keywords, phrases, file type, or similar identifiers unique or semi-unique to a given cybersecurity risk. Upon initiating a search, the results generated by the search may be stored in the analyzed asset, transmitted to the operator of a processor running side scanning system 101, or generated for review by an end user operating user device 102. The search and display of a specific risk may be based on historical trends of cybersecurity risks in the listed asset, severity of cybersecurity risk to a listed asset, or a historical search for past cybersecurity threats to a listed asset.

Another embodiment may include a system wherein the at least one processor is configured to identify one or more assets vulnerable to the specific risk. For instance, a processor operating scanning system 101 may be configured to perform a scan of a set of one or more assets with potential exposure to a given risk, and upon identifying vulnerable pathways for an attack vector to reach a set of identified assets, may generate a list of assets that are potentially or currently exposed to one or more specific risk. Assets vulnerable to a specific risk may be determined to be vulnerable based on the type of the specific risk, the existence of specific risks in adjacent or similar workloads, and related risks that may also cause an asset to be vulnerable based on the specific risk determined.

In another embodiment is a method for providing comprehensive cloud environment risk inventory visualization in a graphical user interface comprising causing a display to present a plurality of asset categories (step 1101). The method may include the use of a graphical user interface system and may include systems similar in appearance and functionality to Microsoft Windows, Mac OS, Ubuntu Unity, Gnome Shell, Android, Apple iOS, Blackberry OS, Windows 10 Mobile, PalmOS-Web OS, or Firefox OS. For example, cloud infrastructure 106 may be the cloud environment consisting of virtual machines 107A-107D, databases 109A-109D, storage 111A-111D, keystores 113A-113D, and load balancer 115, and the cloud-based storage volume may be contained in storage 111A-111D. The cloud environment may include service provided by a third party such as Amazon Web Services, Microsoft Azure, Google Cloud, Alibaba Cloud, IBM Cloud, Oracle, Salesforce, SAP, or similar service. Visualizations provided by the above system may include graphical, sequential, or multi-dimensional displays of risk inventories. For example, cloud infrastructure 106 may be the cloud environment consisting of virtual machines 107A-107D, databases 109A-109D, storage 111A-111D, keystores 113A-113D, and load balancer 115, and the cloud-based storage volume may be contained in storage 111A-111D.

One of several embodiments may include a method for providing comprehensive cloud environment risk inventory visualization in a graphical user interface comprising receiving, via an input device, a selection of a particular asset category. A method may include a personal computer, tablet, smartphone, or virtual machine. A processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. A selection of one or more asset categories may be received and updated as new visualizations are developed based on the current threats to an asset in that category. Asset categories may be selected or deselected by an end user. Once a particular asset category is selected, it may be added to a list of selected asset categories with a list for deselected categories as well. The list of selected asset categories may organized per category or may be compiled to include all current threats in a comprehensive selected asset threat list.

Another embodiment may include a method for providing comprehensive cloud environment risk inventory visualization in a graphical user interface comprising causing the display to present a list of assets in the selected category that have cybersecurity risks (step 1105). A display may be graphical, sequential, or multi-dimensional. A list of selected categories may include at least one of an account category, a container category, a database category, an image category, a container category, a managed service category, a messaging service category, a monitoring category, a network category, a storage category, a user category, a access category, a virtual machine category, or a serverless category. When an asset in a selected category has a cyber security risk associated with it, the asset may appear in a list of all listed categories having a cyber security risk associated with it, and may be organized by individual category, type of cyber security risk, or some combination or sequential ordering methods based on the information available to the processor and its end user.

Another embodiment may include a method for providing comprehensive cloud environment risk inventory visualization in a graphical user interface comprising retrieving workload component cybersecurity risk information 307A for each listed asset. When a category of assets is selected, a processor may be configured to order those assets according to available cybersecurity risk information available to said processor, and may organize by type of risk, type of asset, or similar type of sequentialization. Cybersecurity risk information may be determined from historical threats to the workload component, the current active cybersecurity threats to workload components of certain types, or some combination of the same.

Another embodiment may include a method for providing comprehensive cloud environment risk inventory visualization in a graphical user interface comprising retrieving cloud component cybersecurity risk information 307B. Cloud component cybersecurity risk information may include identification of the risk based on a semi-unique identifier, the nature of the risk, the likelihood of the risk, or the severity of the risk to each listed asset. Cybersecurity risk information to a cloud component may be determined from historical threats within the cloud environment 106, current active cybersecurity threats to similar workload components in the cloud environment 106 or the level of risk to assets within the cloud environment 106, as outlined above.

Another embodiment may include a method for providing comprehensive cloud environment risk inventory visualization in a graphical user interface comprising causing the display to present a common interface 309 providing access to the workload component cybersecurity risk information and cloud component cybersecurity risk information. The common interface may be configured to access component cybersecurity risk information based on the nature of the risk, the likelihood of the risk, or the severity of the risk to the component. On the same or a similar and related interface, a display may present cloud component cybersecurity risk information based on a semi-unique identifier, the nature of the risk, the likelihood of the risk, or the severity of the risk to each listed asset.

Another embodiment may include a method for providing comprehensive cloud environment risk inventory visualization in a graphical user interface comprising causing the display to present, in the common interface, an interconnection between the workload component cybersecurity risk information and the cloud component cybersecurity risk information. The interconnection between workload component cybersecurity risk information 307A and cloud component cybersecurity risk information 307B may generate an interface between them 309 and may be presented as an interconnection between them 311. The common interface presented may include direct interconnections between the component cybersecurity risk information and the cloud component cybersecurity risk information or links from one set of cybersecurity risk information. For instance, the component cybersecurity risk information may include a link to access the cloud component cybersecurity risk information. Conversely, the cloud component cybersecurity risk information may include a link to access the component cybersecurity risk information.

In another embodiment, a method may include wherein the plurality of asset categories include at least one of an account category, an authentication category, a container category, a database category, an image category, a container category, a managed service category, a messaging service category, a monitoring category, a network category, a storage category, a user category, a access category, a virtual machine category, or a serverless category. A category may list the currently identified entities of that category type as described below. An account category may include one or more listed accounts of users of the system. An account category may further include listing of assets based on type of account associated with that user. A type of account may include active user account, passive user account, administrator account, maintainer account, a system account, superuser account, or a guest user account.

A container category may include one or more containers currently listed in the system. A container may involve specific versions of programming language runtimes, libraries required to run software, or another method of packaging applications abstracted from the cloud environment.

A database category may include one or more databases managed and maintained in relation to the system. Databases may include a NoSQL database, a relational database, a cloud database, a columnar database, a wide column database, a key-value database, an object-oriented database, a hierarchical database, or any other kind of database. Databases may be implemented using ElasticCache, ElasticSearch, DocumentDb, DynamoDB, Neptune, RDS, Aurora, Redshift clusters, Kafka clusters, or EC2 instances.

An image category may contain one or more images based on image type, size, and content. Images may include images of one or more virtual machines displayed.

A managed service category may include one or more managed services listed in the above system, to include at least client or customer-owned systems being managed by a third party entity.

A messaging service category may include services of users communicating with at least one other user such as Google Cloud Pub and Sub communications, AWS SQS, or similar queues found in Information Systems.

A monitoring category may include centralized or decentralized methods of security monitoring systems.

A network category may include one or more systems of establishing a form of communicative connectivity between systems, e.g., TCP-IP services.

A storage category may list one or more methods of data storage, to include Direct Attached Storage, Network Attached Storage, SSD Flash Drive Arrays, Hybrid Flash Arrays, Hybrid Cloud Storage, Backup Software, Backup Appliances, Cloud Storage, or similar. Storage may include data structures, instructions, or any other data to be contained in a storage medium.

A user category may include one or more users of a given system along with identifying information relating to its unique or semi-unique identifier, level of authorized access and permissions, and storage volumes accessible by said user.

An access category may include one or more levels of access permission and a listing of users or devices granted access at a given level of access permission to a system.

A virtual machine category may list one or more virtual machines accessible to a system and the levels and types of access granted to a given virtual machine.

Another embodiment may include a method wherein the common interface is configured to display information relating to at least one of an asset type, a risk, a region, or an account. A common interface may include the ability to configure and reconfigure the asset type, risk, region, or account to appear in any order and at multiple formats for displaying the information relating to those categories.

Another embodiment may include a method wherein the common interface is configured to display description for each listed asset. The display of a description for each listed asset may be listed vertically or horizontally. The display may be displayed as written text, representative graphical figures, or similar method of displaying the aforementioned types of information for an asset.

Another embodiment may include a method wherein the common interface is configured to display at least one of a vulnerability, an insecure configuration, an indication of a presence of malware, a neglected asset, a data at risk, a lateral movement, or an authentication. A vulnerability may include vulnerability data from a vulnerability database such as NVD, WPVulnDB, US-CERT, Node.js Security Working Group, OVAL— Red Hat, Oracle Linux, Debian, Ubuntu, SUSE, Ruby Advisory Database, JVN, Safety DB(Python), Alpine secdb, PHP Security Advisories Database, Amazon ALAS, RustSec Advisory Database, Red Hat Security Advisories, Microsoft MSRC, KB, Debian Security Bug Tracker, Kubernetes security announcements, Exploit Database, Drupal security advisories, JPCERT. An insecure configuration may include software flaws or misconfigurations, non-encrypted files, improper file or directory permissions, unpatched security flaws in server software, enabled or accessible administrative and debugging functions, administrative account vulnerabilities, SSL certificates and encryption settings not properly configured, or a similar misconfiguration. These misconfigurations may be discovered by performing a scan, e.g., may query devices and systems capable of routing traffic (e.g., load balancer 115, routers, switches, firewalls, and proxies) using an API provided through a cloud service provider's system to determine network configurations, and may evaluate them against known problematic configurations or other configurations. Malware indicated may include Adware, Botnets, Cryptojacking, Malvertising, Ransomware, Remote Administration Tools (RATs), Rootkits, Spyware, Trojans, Virus Malware, Worm Malware, or similar attack vehicles. A neglected asset may include an asset that has been improperly maintained, patched, or similar cybersecurity security measure. A data at risk may include any packet of data that may be exposed to a cybersecurity threat. A lateral movement may include any pathway between assets where a cybersecurity risk can travel from one affected asset to another affected asset. An authentication may include a username, password, one-time password, two-factor authentication, or any other authentication mechanism to gain access to a cloud service provider's system. A common interface may display more than one of a vulnerability, an insecure configuration, an indication of a presence of malware, a neglected asset, a data at risk, a lateral movement, and an authentication separately or concurrently for an asset. A display of said information may be ordered and listed in any order depending on user preference and input.

Another embodiment may include a method wherein the common interface is configured to display one or more possible attack vectors reaching the each listed asset. Generating this common interface display may include generating a map of an asset to include recording information such as a region identifier, site identifier, datacenter identifier, physical address, network address, workload name, or any other identifier which may be acquired via an API provided through a cloud service provider's system and demonstrating via a display the myriad attack vectors currently available to an analyzed asset. Display of the one or more possible attack vectors reaching the each listed asset may be displayed as written text, representative graphical figures, or similar method of displaying the one or more possible attack vectors.

Another embodiment may include a method wherein the common interface is configured to display a recommended mitigation tactic for the each listed asset. A recommended mitigation tactic may be generated based on historical data of the cybersecurity risk, the vulnerability attributed to the listed asset, or the data contained on the each listed asset. Mitigation tactics may be selected based on user input or may be implemented automatically based on the mitigation tactics likelihood of a successful mitigation of the cybersecurity risk. A mitigation tactic may include increased frequency of scanning, heightened access control measures, firewalls and antivirus software patches, increased patch management scheduling, continuous workload monitoring, or similar tactics.

Another embodiment may include a method wherein the common interface is configured to display one or more workload metrics associated with the each listed asset. Workload metrics may be a statistical representation of the current performance of the workload, the capacity for additional processing of the workload, and the historical performance of the workload based on statistical trend.

Another embodiment may include a non-transitory computer readable medium storing instructions that, when executed by at least one processor, are configured to cause the at least one processor to perform operations for matching keys with compute resources, the operations comprising causing a display to present a plurality of asset categories 301. A plurality may include at least one asset category to be displayed. Asset categories may include at least one of an account category, a container category, a database category, an image category, a container category, a managed service category, a messaging service category, a monitoring category, a network category, a storage category, a user category, a access category, a virtual machine category, or a serverless category.

Another embodiment may include a non-transitory computer readable medium storing instructions that, when executed by at least one processor, are configured to cause the at least one processor to perform operations for matching keys with compute resources, the operations comprising receiving, via an input device, a selection of a particular asset category (step 1103). An input device may include a personal computer, tablet, smartphone, or virtual machine. A processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. A selection of one or more asset categories may be received and updated as new visualizations are developed based on the current threats to an asset in that category. Asset categories may be selected or deselected by an end user. Once a particular asset category is selected, it may be added to a list of selected asset categories with a list for deselected categories as well. The list of selected asset categories may organized per category or may be compiled to include all current threats in a comprehensive selected asset threat list.

Another embodiment may include a non-transitory computer readable medium storing instructions that, when executed by at least one processor, are configured to cause the at least one processor to perform operations for matching keys with compute resources, the operations comprising causing the display to present a list of assets in the selected category that have cybersecurity risks (step 1105). A display may be graphical, sequential, or multi-dimensional. A list of selected categories may include at least one of an account category, a container category, a database category, an image category, a container category, a managed service category, a messaging service category, a monitoring category, a network category, a storage category, a user category, a access category, a virtual machine category, or a serverless category. When an asset in a selected category has a cyber security risk associated with it, the asset may appear in a list of all listed categories having a cyber security risk associated with it, and may be organized by individual category, type of cyber security risk, or some combination or sequential ordering methods based on the information available to the processor and its end user.

Another embodiment may include a non-transitory computer readable medium storing instructions that, when executed by at least one processor, are configured to cause the at least one processor to perform operations for matching keys with compute resources, the operations comprising retrieving workload component cybersecurity risk information for each listed asset (step 1107A). When a category of assets is selected, a processor may be configured to order those assets according to available cybersecurity risk information available to said processor, and may organize by type of risk, type of asset, or similar type of sequentialization. Cybersecurity risk information may be determined from historical threats to the workload component, the current active cybersecurity threats to workload components of certain types, or some combination of the same.

Another embodiment may include a non-transitory computer readable medium storing instructions that, when executed by at least one processor, are configured to cause the at least one processor to perform operations for matching keys with compute resources, the operations comprising retrieving cloud component cybersecurity risk information for each listed asset (step 1107B). Cloud component cybersecurity risk information may include identification of the risk based on a semi-unique identifier, the nature of the risk, the likelihood of the risk, or the severity of the risk to each listed asset. Cybersecurity risk information to a cloud component may be determined from historical threats within the cloud environment 106, current active cybersecurity threats to similar workload components in the cloud environment 106 or the level of risk to assets within the cloud environment 106, as outlined above.

Another embodiment may include a non-transitory computer readable medium storing instructions that, when executed by at least one processor, are configured to cause the at least one processor to perform operations for matching keys with compute resources, the operations comprising causing the display to present a common interface providing access to the workload component cybersecurity risk information and cloud component cybersecurity risk information for each listed asset (step 1109). The common interface may be configured to access component cybersecurity risk information based on the nature of the risk, the likelihood of the risk, or the severity of the risk to the component. On the same or a similar and related interface, a display may present cloud component cybersecurity risk information based on a semi-unique identifier, the nature of the risk, the likelihood of the risk, or the severity of the risk to each listed asset.

Another embodiment may include a non-transitory computer readable medium storing instructions that, when executed by at least one processor, are configured to cause the at least one processor to perform operations for matching keys with compute resources, the operations comprising causing the display to present, in the common interface, an interconnection between the workload component cybersecurity risk information and the cloud component cybersecurity risk information (step 1111). The interconnection between workload component cybersecurity risk information (step 1107A) and cloud component cybersecurity risk information (step 1107B) may generate an interface between them (step 1109) and may be presented as an interconnection between them (step 1111). The common interface presented may include direct interconnections between the component cybersecurity risk information and the cloud component cybersecurity risk information or links from one set of cybersecurity risk information. For instance, the component cybersecurity risk information may include a link to access the cloud component cybersecurity risk information. Conversely, the cloud component cybersecurity risk information may include a link to access the component cybersecurity risk information.

In some embodiments, a processor may cause a display of one or more risks aggregated in the same visualization. FIG. 12 is a schematic block diagram illustrating an exemplary embodiment of a visual representation of displaying aggregated cybersecurity risk information, consistent with disclosed embodiments. A visualization may be generated from one or more sources based on scanning system 101. For example, a visual display may include a cloud provider visualization 1201, displaying where the multiple sources of data may be derived from. A cloud service provider may include services such as Cloudflare, Amazon Web Services, Google Cloud, IBM Cloud, Oracle Cloud, Microsoft Azure, or similar. This is further displayed via a communicative connection through an access port 1203 to a data server 1205.

Data server 1205 may include servers such as 109A-D. Data server 1205 may then display risk information that may be communicatively passed through web server 1207, demonstrating one or more possible sources of the one or more cybersecurity risk information. Data server 1205 may be communicatively connected to a web server 1207 (through access port 1203, which may be the same or a different port from port 1203 between cloud service provider 1201 and data server 1205), which can then be communicatively connected to one or more users via user access points 1209. This may include, among other things, user access that may be verified or validated via a credential 1211. Each of these connections may demonstrate one or more risk paths that may be exploited in a single view to allow for prioritization of threats and analysis of possible users who may exploit those risks and vulnerabilities, as discussed above. This may allow an administrator to prioritize risks to a given storage volume as well as assess lateral storage volumes that may be similarly risked based on the assessed threats in a single image.

FIG. 13 is a schematic block diagram illustrating an exemplary embodiment of a visual representation of a flow path for aggregated risk information, consistent with disclosed embodiments. In another embodiment, a processor may be configured to display a flow path of aggregated risk information. In one view, a displayed visualization may include user access 1301, which displays risk information such as service vulnerability 1303 and an insecure private key 1305. These vulnerabilities or risks may be displayed to an administrator via developer server 1307 to an administrator through administrator access 1309. As previously discussed, this will allow an administrator to visualize myriad risks to a storage volume in a single view that will allow an administrator to prioritize risks and analyze possible exploiters of this risk information on lateral systems and storage volumes.

In another embodiment, risk information may be shown in one or more views. This may involve a risk path similar to the exemplary embodiment of FIG. 13. In an exemplary embodiment, in a single visualization data from multiple sources may be displayed. This may involve identifying risk information such as the origin of the risk and potential exploiters of a risk. In some embodiments, this visualization may be done for a specific risk. In another embodiment, this visualization may be done for a combination of risks.

Disclosed embodiments may include any one of the following bullet-pointed features alone or in combination with one or more other bullet-pointed features, whether implemented as a method, by at least one processor, and/or stored as executable instructions on non transitory computer readable media:

- establishing a trusted relationship between a source account in a cloud environment and a scanner account;
- using the established trust relationship, utilize at least one cloud provider API to identify workloads in the source account;
- using the at least one cloud provider API to query a geographical location of at least one of the identified workloads;
- receiving an identification of the geographic location;
- using the cloud provider APIs to access block storage volumes of the at least one workload;
- determining a file-system of the at least one workload;
- mounting the block storage volumes on a scanner based on the determined file-system;
- activating a scanner at the geographic location;
- reconstructing from the block storage volumes a state of the workload; and
- assessing the reconstructed state of the workload to extract insights.
- wherein the geographic location includes an identifier of a physical site.
- wherein mounting includes selecting a driver corresponding to the determined file system.
- wherein the at least one processor is further configured to deploy a scanner at the geographical location.
- wherein the identification of the geographic location comprises an identification of a data center, at least one of a data center name, Internet Protocol (IP) address, name of the cloud provider, or a unique identity.
- wherein the reconstructed state of the workload includes at least two of an indication of an installed application, a version of an installed application, an operating system configuration, an application configuration, a profile configuration, a log, or a database content;

wherein the at least one processor is further configured to update the reconstructed state of the workload based on at least one change to the block storage volumes.

wherein the insights comprise at least one of a vulnerability associated with the workload or a composition of installed applications associated with the workload.

wherein to mount the block storage volumes on the scanner, the at least one processor is configured to create a snapshot of the block storage volumes;

wherein to mount the block storage volumes on the scanner, the at least one processor is configured to mount the snapshot of the block storage volumes on the scanner wherein the at least one processor is further configured to encrypt the snapshot of the block storage volumes;

wherein the at least one processor is further configured to mount the encrypted snapshot of the block storage volumes on the scanner;

using a cloud provider API, access a block storage volume of a workload maintained in a cloud storage environment;

identifying an installed software application in the accessed block storage volume;

analyzing the identified installed software application to determine an associated software version;

accessing a data structure of known software vulnerabilities for a plurality of versions of software applications;

performing a lookup of the identified installed software version in the data structure to identify known vulnerabilities; and performing at least one of query the cloud provider API to determine network accessibility information related to the workload, identify at least one port on which the vulnerable application is accessible, use network accessibility information and at least one port to identify one or more vulnerabilities susceptible to attack from outside the workload.

implementing a remedial action in response to the identified one or more vulnerabilities.

wherein the remedial measure includes transmitting an alert to a device associated with an administrator.

wherein querying the cloud provider API to determine network accessibility information related to the workload further comprises examining data sources associated with the workload wherein querying the cloud provider API to determine network accessibility information related to the workload further comprises determining the network accessibility information based on the examined data sources.

wherein querying the cloud provider API to determine network accessibility information related to the workload further comprises: wherein the network accessibility information includes at least one of: data from an external data source, cloud provider information, or at least one network capture log.

identifying the installed software application comprises extracting data from at least one of operating system packages, libraries, or program language libraries;

identifying the installed software application comprises identifying the installed software application based on the extracted data;

identifying a version of the installed software application;

wherein the identified installed software application includes one or more scripts;

wherein the data structure includes aggregated vulnerability data;

wherein the aggregated vulnerability data includes data from one or more third-party vendors;

wherein the aggregated vulnerability data includes data collected by a scanner;

wherein the aggregated vulnerability data includes at least one of an advisory, an exploit, a security announcement, or a known bug.

querying the cloud provider API to determine network accessibility information related to the workload further comprises: wherein the network accessibility information includes at least one of: data from an external data source, cloud provider information, or at least one network capture log.

accessing at least one cloud provider API to determine a plurality of entities capable of routing traffic in a virtual cloud environment associated with a target account containing the workload;

querying the at least one cloud provider API to determine at least one networking configuration of the entities;

building a graph connecting the plurality of entities based on the networking configuration;

accessing a data structure identifying services publicly accessible via the internet and capable of serving as an internet proxy;

integrating the identified services into the graph;

traversing the graph to identify at least one source originating via the internet and reaching the workload; and outputting a risk notification associated with the workload.

wherein the plurality of entities includes a virtual network appliance.

wherein the virtual network appliance is at least one of a load balancer, a firewall, a proxy, or a router.

wherein the networking configuration is at least one of a routing configuration, a proxy configuration, a load balancing configuration, a firewall configuration, or a VPN configuration.

wherein the graph includes a data structure sequentially connecting entities.

wherein the graph includes directional vectors indicating directions of dataflow.

wherein building the graph comprises identifying individual entities as nodes wherein building the graph comprises connecting the nodes.

wherein the graph includes port numbers associated with the workload.

wherein the graph includes a path from the at least one source to the workload.

utilizing a cloud provider API to access a block storage volume of a workload maintained on a target account in a target system of a cloud storage environment;

utilizing a scanner at a location of the block storage volume and on a secondary system other than the target system;

scanning the block storage volume for malicious code, using the secondary system;

identifying malicious code based on the scan; and outputting from the secondary system, a notification of a presence of malicious code in the target system.

wherein the location of the block storage volume includes at least one of: the target account, a secondary system account, a cloud provider account, or a third party account.

wherein scanning the block storage volume includes scanning disk-backed memory.

wherein the disk-backed memory includes at least one of a page file or a cache file.

wherein the secondary system includes at least one of a virtual machine, a container, or a serverless function.

wherein the secondary system has an operating system different from an operating system of the target account.

wherein the malicious code includes a rootkit.

wherein utilizing a scanner includes suspending an operation of the scanner after the scan of the block storage volume.

wherein utilizing a scanner includes modifying a pre-utilized scanner at the location of the block storage volume based on information related to the target account to obtain a modified scanner;

wherein utilizing a scanner includes utilizing the modified scanner.

identifying assets in a cloud environment;

identifying risks associated with each of the identified asset;

identifying relationships between at least some of the identified assets, the relationships including at least one of a trust, a network connectivity, or a mechanism of network proxying;

receiving an identification of a specific asset under investigation;

performing a forward analysis of the specific asset under investigation to identify at least one possible attack vector reaching the specific asset via a network outside the cloud environment;

performing a backward analysis of the specific asset to identify at least one exposure risk to one or more assets that is in a downstream of the specific asset, wherein the at least one exposure risk includes an identification of an exposed asset, an entry point to the exposed asset, and a lateral movement risk associated with the exposed asset; and outputting a signal to cause on a display to present a presentation of forward and backward paths associated with the specific asset, thereby enabling visualization of a plurality of entry points and lateral movement risks associated with the plurality of entry points.

wherein the network outside the cloud environment includes the Internet.

wherein the assets in the cloud environment include at least one of: a virtual machine, a network appliance, a storage appliance, a compute instances, or an engine instance.

wherein identifying the assets in a cloud environment includes identifying the assets based on at least one of: an identity and access management policy, an organization policy, or an access policy.

wherein the presentation of the forward and backward paths indicates alternative paths connecting between the specific asset and an upstream asset or a downstream asset.

wherein the visualization includes a presentation of the alternative paths.

wherein the presentation of the forward and backward paths indicates port numbers for each pathway.

wherein the visualization of the entry points indicates at least one entry point at risk.

monitoring network activities of the assets in a cloud environment.

detecting detect a potential risk associated with the specific asset based on the monitored network activities.

detecting a potential risk associated with the specific asset based on a network activity of the specific asset.

detecting a potential risk associated with the specific asset based on a network activity of an upstream asset of the specific asset.

detecting a potential risk associated with the specific asset based on a network activity of a downstream asset of the specific asset.

analyzing a cloud environment to identify a plurality of keys to the compute resources in the cloud environment;

performing a cryptographic analysis on the plurality of keys to identify a first set of fingerprints that uniquely identify each of the plurality of keys, the first set of fingerprints being non-functional;

analyzing trust configurations of the compute resources to identify a second set of fingerprints for each of the compute resources; and comparing the first set of fingerprints with the second set of fingerprints to match keys with the compute resources without using the keys to access the compute resources.

wherein the plurality of keys are stored in at least one workload.

wherein at least one of the first set of fingerprints is not identical to any key of the plurality of keys.

wherein at least one of the plurality of keys includes at least one of a password, a script containing a password, a private component of a private-public key pair, a cloud key, or an Secure Shell (SSH) key.

testing validity of at least one of the plurality of keys.

analyzing a multi-machine interaction in the cloud environment using the first set of fingerprints.

analyzing the multi-machine interaction includes comparing the first set of fingerprints with the second set of fingerprints.

analyzing a multi-machine interaction in the cloud environment using the plurality of keys.

accessing a primary account maintained in a cloud environment;

receiving information defining a structure of the primary account, wherein the structure includes a plurality of assets, and wherein the information excludes raw data of the primary account;

deploying, inside the primary account or inside a secondary account for which trust has been established with the primary account, at least one ephemeral scanner configured to scan at least one block storage volume and to output metadata defining the at least one block storage volume, the output excluding raw data of the primary account;

receiving a transmission of the metadata from the at least one ephemeral scanner, wherein the transmission excludes raw data of the primary account;

analyzing the received metadata to identify a plurality of cybersecurity vulnerabilities;

correlating each of the identified plurality of cybersecurity vulnerabilities with one of the plurality of assets; and generating a report correlating the plurality of cybersecurity vulnerabilities with the plurality of assets.

wherein defining the at least one block storage volume includes presenting risk data without sharing consumer data or data that was used to identify the risk data.

wherein the metadata defining the at least one block storage volume includes at least one of: an indication of an installed application, a version of an installed application, an operating system configuration, an application configuration, or a profile configuration.

receiving a transmission of updated metadata defining the at least one block storage volume in response to at least one change to the at least one block storage volumes.

wherein the ephemeral scanner is configured to perform vulnerability scanning of the at least one block storage volume.

wherein the ephemeral scanner is configured to perform configuration scanning of the at least one block storage volume.

wherein the ephemeral scanner is configured to perform malware scanning of the at least one block storage volume.

wherein the ephemeral scanner is configured to perform lateral-movement risk analysis of the at least one block storage volume.

wherein the ephemeral scanner is configured to perform sensitive information scanning of the at least one block storage volume.

wherein the ephemeral scanner is configured to perform container scanning of the at least one block storage volume.

wherein the ephemeral scanner is configured to perform keys and password scanning of the at least one block storage volume.

causing a display to present a plurality of asset categories;

receiving, via an input device, a selection of a particular asset category;

causing the display to present a list of assets in the selected category that have cyber security risks;

for each listed asset, retrieving workload component cybersecurity risk information, and for each listed asset. retrieving cloud component cybersecurity risk information;

for each listed asset, causing the display to present a common interface providing access to the workload component cybersecurity risk information and cloud component cybersecurity risk information; and for each listed asset, causing the display to present, in the common interface, an interconnection between the workload component cybersecurity risk information and the cloud component cybersecurity risk information.

wherein the plurality of asset categories include at least one of an account category, an authentication category, a container category, a database category, an image category, a container category, a managed service category, a messaging service category, a monitoring category, a network category, a storage category, a user category, a access category, a virtual machine category, or a serverless category.

wherein the common interface is configured to display information relating to at least one of an asset type, a risk, a region, or an account.

wherein the common interface is configured to display description for each listed asset.

wherein the common interface is configured to display at least one of a vulnerability, an insecure configuration, an indication of a presence of malware, a neglected asset, a data at risk, a lateral movement, or an authentication.

wherein the common interface is configured to display one or more possible attack vectors reaching the each listed asset.

wherein the common interface is configured to display a recommended mitigation tactic for the each listed asset.

wherein the common interface is configured to display one or more workload metrics associated with the each listed asset.

wherein the at least one processor is further configured to provide a cybersecurity report for the each listed asset.

wherein the at least one processor is configured to identify a risk level distribution among the listed assets.

receiving a search query for a specific risk; or identifying one or more assets vulnerable to the specific risk.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A cybersecurity scanner deployment system, comprising:

at least one processor configured to:

access a primary account maintained in a cloud environment;

receive information defining a structure of the primary account, wherein the structure includes a plurality of assets, and wherein the information excludes raw data of the primary account;

deploy, inside the primary account or inside a secondary account for which trust has been established with the primary account, at least one ephemeral scanner configured to scan at least one block storage volume and to output metadata defining the at least one block storage volume, the output excluding raw data of the primary account;

receive a transmission of the metadata from the at least one ephemeral scanner, wherein the transmission excludes raw data of the primary account;

analyze the received metadata to identify a plurality of cybersecurity vulnerabilities;

correlate each of the identified plurality of cybersecurity vulnerabilities with one of the plurality of assets; and generate a report correlating the plurality of cybersecurity vulnerabilities with the plurality of assets.

2. The system of claim 1, wherein defining the at least one block storage volume includes presenting risk data without sharing consumer data or data that was used to identify the risk data.

3. The system of claim 1, wherein the metadata defining the at least one block storage volume includes at least one of: an indication of an installed application, a version of an installed application, an operating system configuration, an application configuration, or a profile configuration.

4. The system of claim 1, wherein the at least one processor is further configured to receive a transmission of updated metadata defining the at least one block storage volume in response to at least one change to the at least one block storage volumes.

5. The system of claim 1, wherein the ephemeral scanner is configured to perform vulnerability scanning of the at least one block storage volume.

6. The system of claim 1, wherein the ephemeral scanner is configured to perform configuration scanning of the at least one block storage volume.

7. The system of claim 1, wherein the ephemeral scanner is configured to perform malware scanning of the at least one block storage volume.

8. The system of claim 1, wherein the ephemeral scanner is configured to perform lateral-movement risk analysis of the at least one block storage volume.

9. The system of claim 1, wherein the ephemeral scanner is configured to perform sensitive information scanning of the at least one block storage volume.

10. The system of claim 1, wherein the ephemeral scanner is configured to perform container scanning of the at least one block storage volume.

11. The system of claim 1, wherein the ephemeral scanner is configured to perform keys and password scanning of the at least one block storage volume.

12. A method for cybersecurity scanner deployment, comprising:
- accessing a primary account maintained in a cloud environment;
- receiving information defining a structure of the primary account, wherein the structure includes a plurality of assets, and wherein the information excludes raw data of the primary account;
- deploying, inside the primary account or inside a secondary account for which trust has been established with the primary account, at least one ephemeral scanner configured to scan at least one block storage volume and to output metadata defining the at least one block storage volume, the output excluding raw data of the primary account;
- receiving a transmission of the metadata from the at least one ephemeral scanner, wherein the transmission excludes raw data of the primary account;
- analyzing the received metadata to identify a plurality of cybersecurity vulnerabilities;
- correlating each of the identified plurality of cybersecurity vulnerabilities with one of the plurality of assets; and
- generating a report correlating the plurality of cybersecurity vulnerabilities with the plurality of assets.

13. The method of claim 12, wherein defining the at least one block storage volume includes presenting risk data without sharing consumer data or data that was used to identify the risk data.

14. The method of claim 12, wherein the metadata defining the at least one block storage volume includes at least one of: an indication of an installed application, a version of an installed application, an operating system configuration, an application configuration, or a profile configuration.

15. The method of claim 12, further comprising receiving a transmission of updated metadata defining the at least one block storage volume in response to at least one change to the at least one block storage volumes.

16. The method of claim 12, wherein the ephemeral scanner is configured to perform vulnerability scanning of the at least one block storage volume.

17. The method of claim 12, wherein the ephemeral scanner is configured to perform configuration scanning of the at least one block storage volume.

18. The method of claim 12, wherein the ephemeral scanner is configured to perform malware scanning of the at least one block storage volume.

19. The method of claim 12, wherein the ephemeral scanner is configured to perform lateral-movement risk analysis of the at least one block storage volume.

20. A non-transitory computer-readable medium storing instructions that, when executed by at least one processor, are configured to cause the at least one processor to perform operations comprising:
- accessing a primary account maintained in a cloud environment;
- receiving information defining a structure of the primary account, wherein the structure includes a plurality of assets, and wherein the information excludes raw data of the primary account;
- deploying, inside the primary account or inside a secondary account for which trust has been established with the primary account, at least one ephemeral scanner configured to scan at least one block storage volume and to output metadata defining the at least one block storage volume, the output excluding raw data of the primary account;
- receiving a transmission of the metadata from the at least one ephemeral scanner, wherein the transmission excludes raw data of the primary account;
- analyzing the received metadata to identify a plurality of cybersecurity vulnerabilities;
- correlating each of the identified plurality of cybersecurity vulnerabilities with one of the plurality of assets; and
- generating a report correlating the plurality of cybersecurity vulnerabilities with the plurality of assets.

* * * * *